(12) United States Patent
Rasmussen et al.

(10) Patent No.: US 6,317,803 B1
(45) Date of Patent: *Nov. 13, 2001

(54) HIGH-THROUGHPUT INTERCONNECT HAVING PIPELINED AND NON-PIPELINED BUS TRANSACTION MODES

(75) Inventors: Norman J. Rasmussen; Gary A. Solomon, both of Hillsboro; David G. Carson, Portland, all of OR (US); George R. Hayek, Cameron Park, CA (US); Brent S. Baxter, Hillsboro, OR (US); Colyn Case, Grass Valley, CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/721,893

(22) Filed: Sep. 27, 1996

Related U.S. Application Data

(60) Provisional application No. 60/014,422, filed on Mar. 29, 1996.

(51) Int. Cl.[7] ....................................................... G06F 13/00
(52) U.S. Cl. ............................... 710/107; 710/22; 710/29; 710/48; 710/49; 710/50; 710/100; 710/110; 710/112; 710/126; 710/129; 712/41; 712/200; 712/224; 712/228; 712/248
(58) Field of Search ............................ 364/200; 395/280, 395/287, 306, 309, 842, 292, 290, 575; 370/85.6; 710/100, 29, 107, 48, 126, 49, 129, 50, 112, 22, 110; 712/41, 200, 228, 224, 248; 345/520; 717/11

(56) References Cited

U.S. PATENT DOCUMENTS

| 4,805,098 | 2/1989 | Mills, Jr. et al. |
|---|---|---|
| 4,851,990 | * 7/1989 | Johnson et al. ......................... 364/200 |
| 4,916,652 | * 4/1990 | Schwarz et al. ......................... 364/748 |

(List continued on next page.)

OTHER PUBLICATIONS

*80386 Hardware Reference Manual*, pp. 3–5 to 3–8, Intel Corporation, 1986.

"Bus Functional Description," *Pentium™Processor User's Manual, vol. 1:Pentium Processor Data Book*, pp. 6–30 to 6–34, Intel Corporation, 1993.

–Tom Shanley et al., MindShare, Inc., *PCI System Architecture*, Third Edition, Chapter 6, Addison–Wesley Publishing Company, Massachusetts, pp. 97–105 (1995).

*Primary Examiner*—Ayaz Sheikh
*Assistant Examiner*—Frantz B. Jean
(74) *Attorney, Agent, or Firm*—Blakely, Sokoloff, Taylor & Zafman LLP

(57) ABSTRACT

A high throughput memory access port is provided. The port includes features which provide higher data transfer rates between system memory and video/graphics or audio adapters than is possible using standard local bus architectures, such as PCI or ISA. The port allows memory read and write requests to be pipelined in order to hide the effects of memory access latency. In particular, the port allows bus transactions to be performed in either a non-pipelined mode, such as provided by PCI, or in a pipelined mode. In the pipelined mode, one or more additional memory access requests are permitted to be inserted between a first memory access request and its corresponding data transfer. In contrast, in the non-pipelined mode, an additional memory access request cannot be inserted between a first memory access request and its corresponding data transfer.

35 Claims, 46 Drawing Sheets

U.S. PATENT DOCUMENTS

| | | | |
|---|---|---|---|
| 4,943,915 | * | 7/1990 | Wilhelm et al. .................... 364/200 |
| 5,003,465 | * | 3/1991 | Chisholm et al. .................. 364/200 |
| 5,023,776 | | 6/1991 | Gregor . |
| 5,136,584 | | 8/1992 | Hedlund ............................ 370/94.1 |
| 5,146,569 | * | 9/1992 | Yamaguchi et al. ................ 712/228 |
| 5,193,181 | * | 3/1993 | Barlow et al. ..................... 395/575 |
| 5,203,003 | * | 4/1993 | Donner .............................. 713/322 |
| 5,283,883 | | 2/1994 | Mishler ............................... 395/425 |
| 5,287,486 | * | 2/1994 | Yamasaki et al. .................. 710/22 |
| 5,381,538 | | 1/1995 | Amini et al. ....................... 395/425 |
| 5,398,244 | * | 3/1995 | Mathews et al. .................. 370/85.6 |
| 5,440,698 | | 8/1995 | Sindhu et al. ................. 395/200.08 |
| 5,442,389 | | 8/1995 | Blahut et al. ........................ 348/7 |
| 5,446,888 | | 8/1995 | Pyne . |
| 5,448,558 | | 9/1995 | Gildea et al. ........................ 370/60 |
| 5,450,551 | | 9/1995 | Amini et al. ....................... 395/299 |
| 5,469,544 | * | 11/1995 | Aatresh et al. ..................... 395/290 |
| 5,499,385 | | 3/1996 | Farmwald et al. .................. 395/823 |
| 5,517,626 | * | 5/1996 | Archer et al. ....................... 395/290 |
| 5,574,872 | * | 11/1996 | Rotem et al. ....................... 712/200 |
| 5,604,865 | | 2/1997 | Lentz et al. . |
| 5,613,133 | * | 3/1997 | Bell et al. ........................... 717/11 |
| 5,678,061 | * | 10/1997 | Mourad ............................... 710/21 |
| 5,691,915 | | 11/1997 | Funahashi et al. . |
| 5,694,141 | | 12/1997 | Chee . |
| 5,696,910 | * | 12/1997 | Pawloski ............................. 395/280 |
| 5,704,034 | * | 12/1997 | Circello .......................... 395/183.14 |
| 5,911,051 | * | 6/1999 | Carson et al. ...................... 710/107 |
| 5,911,083 | * | 6/1999 | Kuslak ................................. 712/41 |
| 6,040,845 | * | 3/2000 | Melo et al. ......................... 345/520 |
| 6,157,967 | * | 12/2000 | Horst et al. ......................... 710/19 |

* cited by examiner

REQUEST ORDER: 1 2 3 4 5 6 7 8 9
| W0 c | R2 c | R2 t | R2 z | W1 c | R3 c | R3 t | R3 z | W2 c |

FIG. 3-4B

REQUEST ORDER: 1 2 3 4 5 6 7 8 9
| W0 c | R2 c | R2 t | R2 z | W1 c | R3 c | R3 t | R3 z | W2 c |

FIG. 3-4C

REQUEST ORDER: 1 2 3 4 5 6 7 8 9
| W0 c | R2 c | R2 t | R2 z | W1 c | R3 c | R3 t | R3 z | W2 c |

FIG. 3-4D

REQUEST ORDER: 1 2 3 4 5 6 7 8 9
| W0 c | R2 c | R2 t | R2 z | W1 c | R3 c | R3 t | R3 z | W2 c |

HIGH-THROUGHPUT INTERCONNECT HAVING PIPELINED AND NON-PIPELINED BUS TRANSACTION MODES

The present application claims, the benefit of U.S. Provisional Application No. 60/014,422, filed on Mar. 29, 1996.

FIELD OF THE INVENTION

The present invention pertains to the field of computer bus architectures. More particularly, the present invention relates to a high throughput interface between system memory and a peripheral device in a computer system.

BACKGROUND OF THE INVENTION

Personal computer systems generally include one or more local buses that permit peripheral devices to be connected to the computer system's microprocessor. One such local bus is the PCI (Peripheral Component Interconnect) bus. A design concern associated with virtually any local bus architecture is the maximum rate of data transfer, or throughput, that can be achieved on the bus. The PCI bus provides substantial improvements over its predecessors in terms of data throughput. However, certain applications require even greater throughput than PCI can provide, particularly audio, video, and 3-D graphics applications.

Audio, video, and graphics applications are typically supported by peripheral devices known as "adapters" or "accelerators", that can be coupled to a local bus in a computer system. One way to reduce throughput requirements is to provide more local memory on the adapter. This solution reduces the amount of data that must be communicated over the bus and thus enhances the performance of the device. A disadvantage of this solution, however, is that many of these adapters use a type of memory that is expensive or difficult to obtain. Also, increasing the amount of local memory tends to increase the overall cost of the device. In addition, it may be impossible in some instances to increase the amount of local memory without purchasing a new adapter card.

In contrast, the system memory in a computer system generally includes much more memory than these adapters can provide and tends to be easier to upgrade. Hence, what is needed is a solution which will enable audio, video, or graphics adapters to more effectively make use of system memory and thereby reduce the amount of local memory that is required. In particular, what is needed is a high-throughput, component-level interconnect through which peripheral devices such as audio, video, or graphics adapters can access system memory.

SUMMARY OF THE INVENTION

A method of performing bus transactions in a computer system is provided. Each bus transaction includes an access request and a corresponding data transfer. In the method, a first bus transaction, which includes a first access request and a corresponding first data transfer, is performed on a bus by using a first transfer mode. In the first transfer mode, an access request that does not correspond to the first data transfer is prohibited from occurring between the first access request and the first data transfer. A second bus transaction, which includes including a second access request and a corresponding second data transfer, is also performed on the bus by using a second transfer mode. In the second transfer mode, an access request that does not correspond to the second data transfer is permitted to occur between the second access request and the second data transfer.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIG. 2-2 illustrates an AGP access queuing model.

FIG. 3-1A illustrates an AGP compliant bus agent having both pipelining and non-pipelining transaction logic.

FIG. 3-1B illustrates AGP pipelining of access requests.

FIG. 3-2 illustrates relationships between AGP and PCI bus states.

FIG. 3-3 illustrates the format of an AGP access request.

FIG. 3-4A illustrates an AGP compliant bus agent including AD request enqueuing logic and sideband request enqueuing logic.

FIG. 3-4B illustrates implications of allowing AGP writes to pass AGP reads.

FIG. 3-4C illustrates implications of allowing AGP writes to pass AGP reads.

FIG. 3-4D illustrates implications of allowing AGP writes to pass AGP reads.

FIG. 3-4E illustrates implications of allowing AGP writes to pass AGP reads.

FIG. 3-4F illustrates the enqueuing of two grant signals before the arbiter detects that a RBF# signal is asserted.

FIG. 3-5 illustrates the maximum delay which an AGP master can take when providing write data, according to one embodiment.

FIG. 3-6 illustrates the transfer of write data with one throttle point.

FIG. 3-7 illustrates a single address being enqueued by the master.

FIG. 3-8 illustrates the enqueuing of five requests, where the first request is delayed by the maximum allowed delay.

FIG. 3-9 illustrates sideband addressing in the 1× transfer mode.

FIG. 3-10 illustrates sideband addressing in the 2× transfer mode.

FIG. 3-11 illustrates the returning of read data previously requested by an AGP master.

FIG. 3-12 illustrates a stream of 8 byte read operations being returned to the master.

FIG. 3-13 illustrates a basic write data transfer.

FIG. 3-14 illustrates an example of back-to-back write data transfers.

FIG. 3-15 illustrates the returning of read data previously requested by an AGP master during 2× transfer mode.

FIG. 3-16 illustrates back-to-back read transactions in 2× transfer mode.

FIG. 3-17 illustrates a basic write transaction in the 2× transfer mode.

FIG. 3-18 illustrates multiple 8-byte write operations in the 2x transfer mode.

FIG. 3-19 illustrates an example in which an AGP master indicates to an AGP target that it has no buffer available for additional transactions.

FIG. 3-20 illustrates a case in which an arbiter returns high priority read data.

FIG. 3-21 shows a case in which an AGP master indicates to an AGP target that the master's read data buffer is full.

FIG. 3-22 illustrates a throttle point for a subsequent data block.

FIG. 3-23 illustrates a case in which an AGP master delays a subsequent data block.

FIG. 3-24 illustrates a write transaction with a subsequent block and with no delay.

FIG. 3-25 illustrates a case in which an AGP target delays a subsequent write data block.

FIG. 3-26 illustrates the earliest read data that is returned to an AGP master following the enqueuing of an address.

FIG. 3-27 shows a request followed by a read and a write.

FIG. 3-28 shows read data being returned following a request being enqueued.

FIG. 3-29 illustrates how a turnaround cycle can be eliminated.

FIG. 3-30 illustrates a basic PCI transaction on the AGP interface.

FIG. 3-31 illustrates an access request followed by a PCI transaction and then the return of read data.

FIG. 3-32 shows a 32-byte write followed by a read.

FIG. 3-33 illustrates a sequence of 2x read data transactions.

FIG. 3-34 illustrates a 40-byte read transaction followed by another read transaction in 2x data transfer mode.

FIG. 3-35 illustrates back-to-back 8-byte write data transactions in 2x data transfer mode.

FIG. 3-36 shows a sequence of 16-byte write data transactions in 2x data transfer mode.

FIG. 3-37 shows the first half of a sequence of write data transactions mixed with read data transactions.

FIG. 3-38 shows the second half of the sequence of FIG. 3-37.

FIG. 3-39 illustrates an AGP master indicating that it can't accept further low priority read data.

FIG. 4-1 is a logical view of an AGP compliant target device.

FIG. 4-2 illustrates the location of certain AGP capabilities.

DETAILED DESCRIPTION

A high-throughput interconnect which has both pipelined and non-pipelined bus transaction modes is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form for purposes of clarity.

1. Overview

The present invention pertains to a high performance, component-level interconnect targeted at three-dimensional (3D) graphical display applications. The interconnect is therefore referred to as Accelerated Graphics Port (AGP). The AGP is based on a set of improvements over the Peripheral Component Interconnect (PCI) bus. The AGP is described in detail in the Accelerated Graphics Port Interface Specification, Revision 1.0, published on Jul. 31, 1996, by Intel Corporation of Santa Clara, Calif. (hereinafter the "AGP Specification").

The AGP interface uses the 66 MHz PCI (Revision 2.1) specification as an operational baseline. The AGP includes three significant improvements over PCI which are intended to tailor the AGP for high performance 3D graphics applications. These improvements include the following features:

1) Deeply pipelined memory read and write operations to hide memory access latency;
2) Demultiplexing of address and data on the bus, which allows almost 100% bus efficiency; and
3) AC timing for 133 MHz data transfer rates.

These improvements are realized, in part, through the use of certain "sideband" signals. The PCI Specification has not been modified in any way, and the AGP interface does not require the use of any of the "reserved" fields, encodings, pins, etc. in the PCI Specification.

In the description which follows, numerous rules and conditions of operation are set forth for certain embodiments of the AGP. For example, such rules and conditions might define the required behavior of an AGP master or target device. However, it must be recognized that some of these rules and conditions may not apply to other embodiments of the present invention, which may not be specifically described herein. Hence, these rules and conditions are not to be construed as limitations on the scope of the present invention.

Figure 1A:
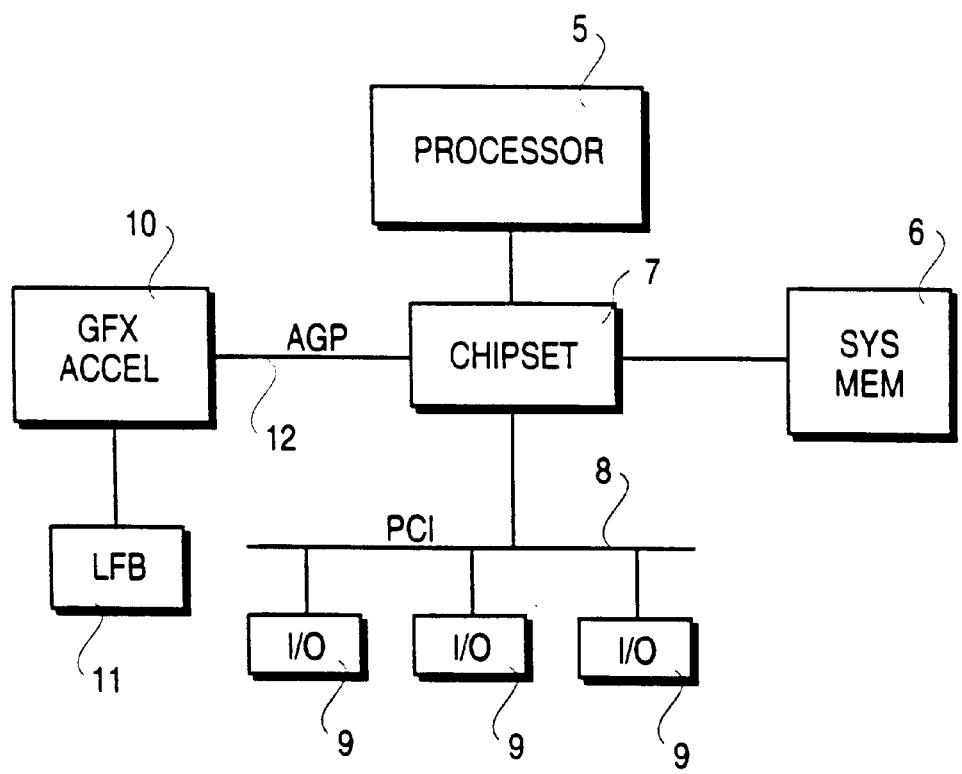
FIG. 1A illustrates a computer system in which an Accelerated Graphics Port (AGP) is implemented.

FIG. 1A illustrates a computer system in which AGP is implemented. The computer system includes a microprocessor (i.e., central processing unit, or "CPU") 5, which is coupled to chipset 7 containing a system memory controller, or "core logic". The chipset 7 provides an interface between the microprocessor 5 and system memory 6, and between the microprocessor 5 and a PCI bus 8. Coupled to the PCI bus 8 are a number of input/output (I/O) devices 9. The computer system also includes a graphics accelerator 10 coupled to a local frame buffer (LFB) 11, which is the local memory associated with the accelerator 10. The AGP 12 provides an interface between the graphics accelerator 10 and the chipset 7 to allow the graphics accelerator 10 to efficiently access system memory 6.

Figure 1B:
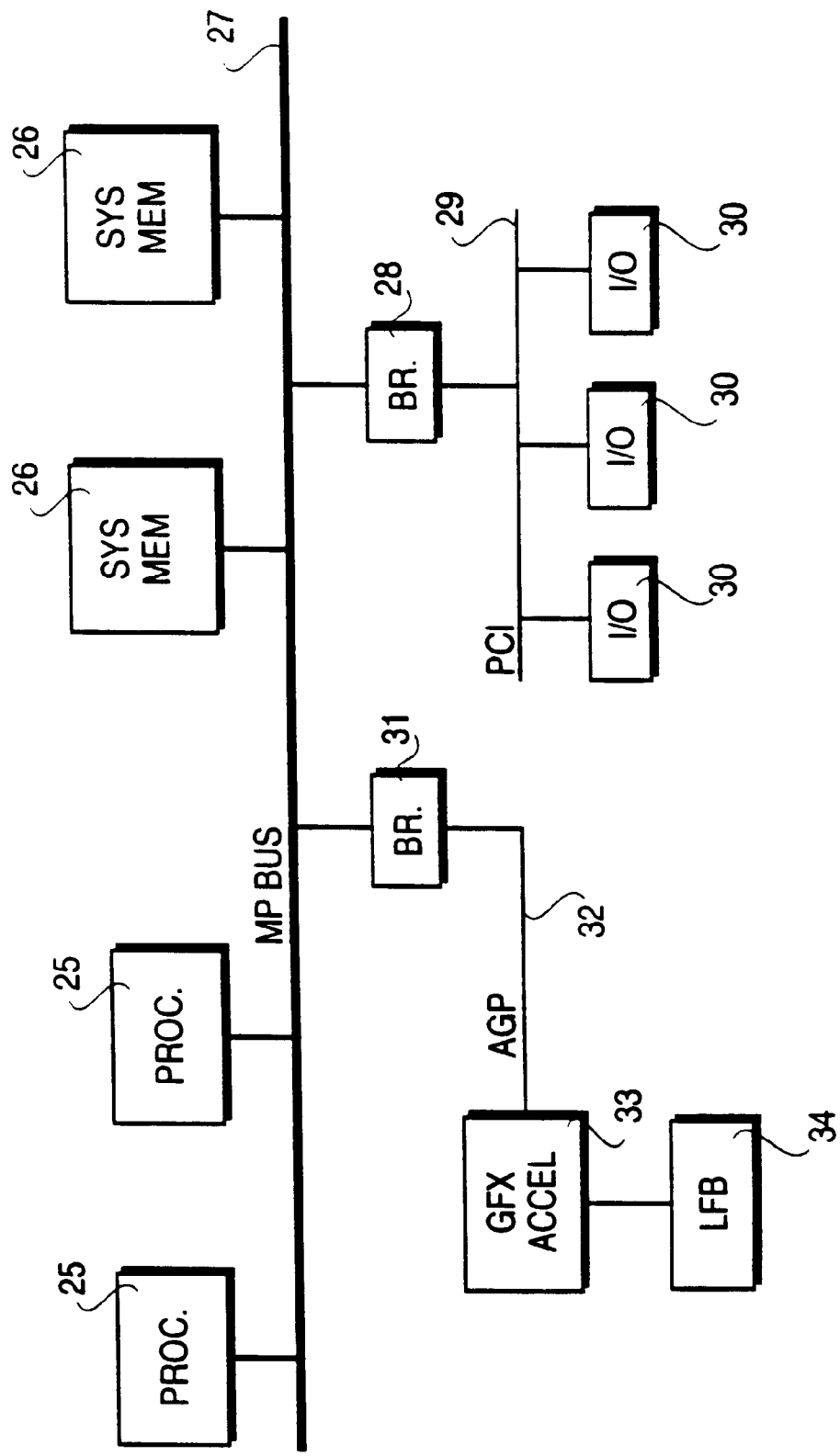
FIG. 1B illustrates an alternative embodiment of a computer system in which an Accelerated Graphics Port (AGP) can be implemented.

FIG. 1A shows an integrated approach, typical of many desktop and volume computer systems. In contrast, FIG. 1B shows an alternative embodiment using symmetric multi-processor (MP) partitioning, which is typical of MP servers. The architecture of FIG. 1B includes multiple microprocessors 25, which are coupled to system memories 26 by an MP bus 27. A PCI bus 29 supporting a number of I/O devices 30 is coupled to the MP bus 27 through a bridge 28. A second bridge 31 couples the AGP 32 to the MP bus. A graphics accelerator 33 is coupled to the AGP 32 and to LFB 34.

AGP neither replaces nor diminishes the necessity of PCI in a computer system. AGP is physically, logically, and electrically independent of the PCI bus. It is an additional connection point in the system, as illustrated by FIGS. 1A and 1B.

2. Architectural Context and Scope
2.1 Two Usage Models: "Execute" & "DMA"

There are two primary AGP usage models for 3D rendering, that have to do with how data are partitioned and accessed, and the resultant interface data flow characteristics. In the "Direct Memory Access (DMA) model, the primary graphics memory is the local memory (i.e., the LFB). 3D structures are stored in system memory, but are not used (or "executed") directly from this memory; rather, they are copied to primary (local) memory, to which the rendering engine's address generator makes it's references. This implies that the traffic on the AGP tends to be long, sequential transfers, serving the purpose of bulk data transport from system memory to primary graphics (local) memory. This sort of access model is amenable to a linked list of physical addresses provided by software (similar to operation of a disk or network I/O device), and is generally not sensitive to a non-contiguous view of the memory space.

In the "execute" model, the accelerator uses both the local memory and the system memory as primary graphics memory. From the accelerator's perspective, the two memory systems are logically equivalent; any data structure may be allocated in either memory, with performance optimization as the only criteria for selection. In general, structures in system memory space are not copied into the local memory prior to use by the accelerator, but are "executed" in place. This implies that the traffic on the AGP tends to be short, random accesses, which are not amenable to an access model based on software resolved lists of physical addresses. Since the accelerator generates direct references into system memory, a contiguous view of that space is essential. But, since system memory is dynamically allocated in random 4K-byte pages, it is necessary in the "execute" model to provide an address mapping mechanism that maps random 4K pages into a single contiguous, physical address space.

The AGP supports both the "DMA" and "execute" models. However, since a primary motivation of the AGP is to reduce growth pressure on local memory, emphasis is placed on the "execute" model. Consistent with that emphasis, this description specifies a physical-to-physical address remapping mechanism which ensures the graphics accelerator (AGP master) will have a contiguous view of graphics data structures dynamically allocated in system memory.

Figures 1, 2:
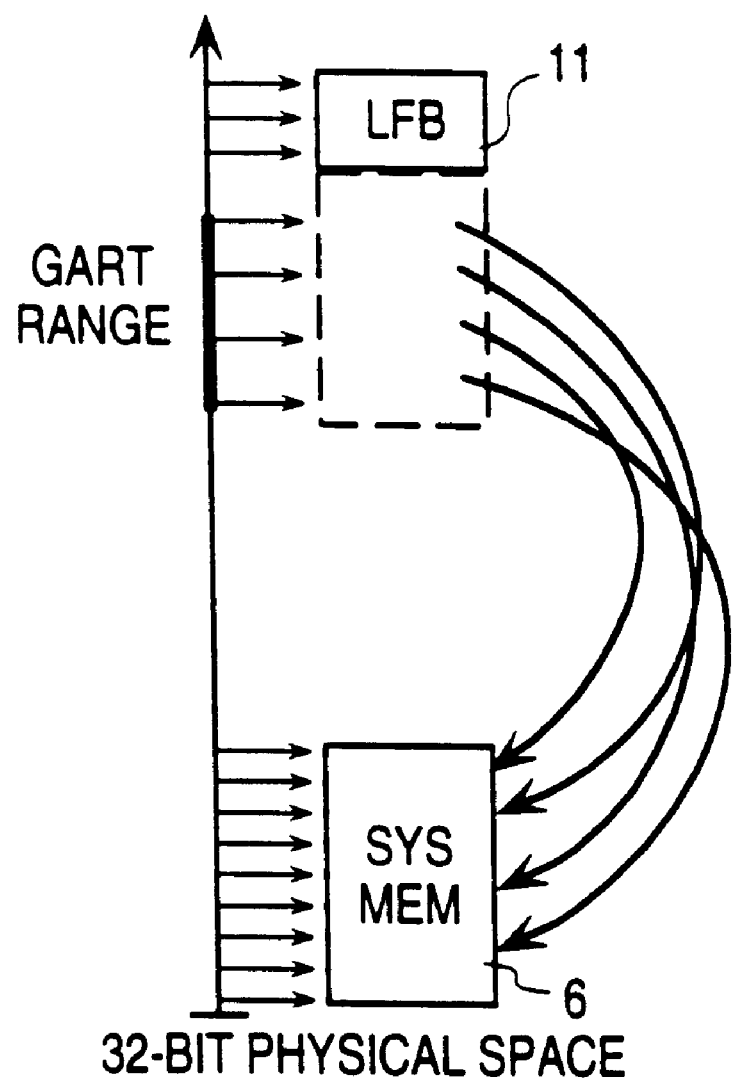
FIG. 2-1 illustrates a graphics address re-mapping function.
Figure 2:
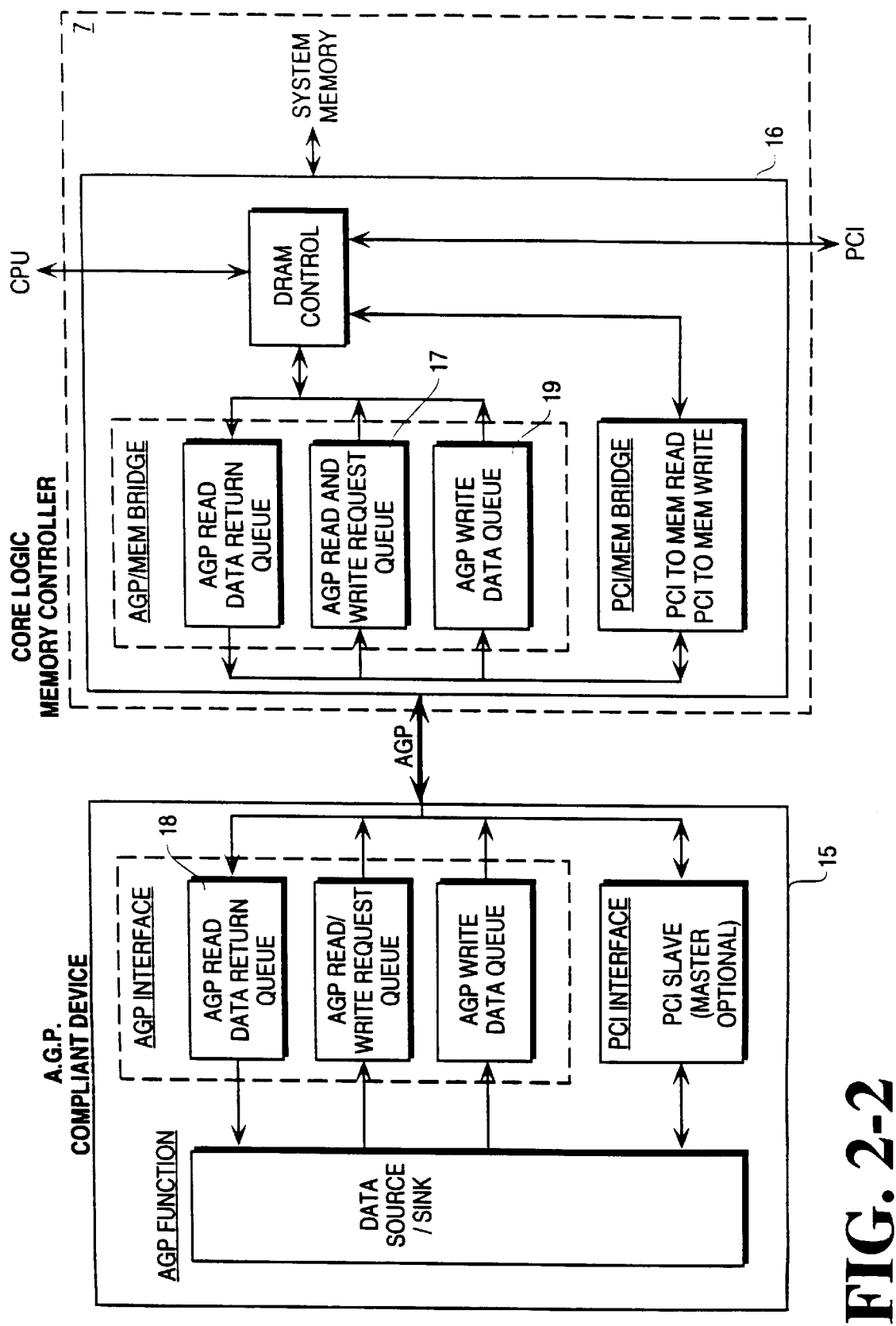

This address re-mapping applies only to a single, programmable range of the system physical address space, as shown in FIG. 2-1. The 32-bit physical address space shown is common to all system agents. Addresses falling in this range are re-mapped to non-contiguous pages of physical system memory 6. All addresses not in this range are passed through without modification, and map directly to main system memory 6, or to device specific ranges, such as the graphics local frame buffer memory 11 shown in FIG. 2-1.

Re-mapping is accomplished via a memory-based table called the Graphics Address Re-mapping Table (GART), which is set up and maintained by the mapping application Program Interface (API) described below, and used ("walked") by the core logic to perform the remapping. In order to avoid compatibility issues and allow future implementation flexibility, this mechanism is specified at a software (API) level. In other words, the actual GART format is not specified; rather, it is abstracted to the API by a hardware abstraction layer (HAL) or mini-port driver that must be provided with the core logic. While this API does not constrain the future partitioning of re-mapping hardware, the re-mapping function will initially be implemented in the chipset or core logic. Note: this re-mapping function should not be confused with the system address translation table mechanism. While some of the concepts are similar, these are completely separate mechanisms which operate independently, under control of the operating system.

2.2 AGP Queuing Models

Both AGP bus transactions and PCI bus transactions may be run over the AGP interface. An AGP compliant device may transfer data to system memory 6 using either AGP transactions or PCI transactions. The core logic can access the AGP compliant master (graphics) device only with PCI transactions. Traffic on the AGP interface may consist of a mixture of interleaved AGP and PCI transactions.

The access request and data queue structures are illustrated in FIG. 2-2. AGP transactions are run in a split transaction fashion where the request for data transfer is disconnected in time from the data transfer itself. An AGP compliant device 15 (bus master) initiates an AGP transaction with an "access request." The core logic 16 (target) responds to the access request by directing the corresponding data transfer at a later time. The fact that the access requests are separated from the data transfers allows the AGP compliant device to issue several access requests in a pipelined fashion while waiting for the data transfers to occur. Pipelining access requests results in having several read and/or write requests outstanding in the core logic's request queue 17 at any point in time. The request queue 17 is divided into high priority and low priority sub-queues, each of which deal with respective accesses according to separate priority and ordering rules. The AGP compliant device 15 tracks the state of the request queue 17 in order to limit the number of outstanding requests and identify data transactions.

The core logic 16 processes the access requests present in its request queue 17. Read data will be obtained from system memory and returned at the core chipset's initiative via the AGP's read data return queue 18. write data will be provided by the AGP compliant device 15 at the direction of the core logic 16 when space is available in the core logic's write data queue 19. Therefore, AGP transaction traffic will generally consist of interleaved access requests and data transfers.

All PCI transactions on the AGP also have their own queues, separate from the AGP transaction queues. Each queue has its own access and ordering rules. Note that the core logic also includes a core logic queue (not shown), which handles processor accesses directly to the AGP compliant device 15, all of which are executed as non-pipelined PCI bus transactions.

2.3 Performance Considerations

On PCI, memory read throughput is about half of memory write throughput, since memory read access time is visible as wait states on this unpipelined bus. In contrast, deep pipelining capability allows the AGP to achieve a total memory read throughput equal to that possible for memory writes. This capability, coupled with optional higher transfer rates and address de-multiplexing allows a full order of magnitude increase in memory read throughput over current PCI implementations.

The following are the basic parameters that each core logic set and/or system implementation should provide:

1) Guaranteed Latency: a usable worst case AGP memory access latency via the HIGH PRIORITY QUEUE, as measured from the clock on which the request (REQ#) signal is asserted until the first clock of data transfer. Assumptions: no outstanding AGP requests (pipeline empty); no wait states or control flow asserted by the graphics master—master is ready to transfer data on any clock (inserting n clocks of control flow may delay response by more than n clocks);

2) Typical Latency: the typical AGP memory access latency via the LOW PRIORITY QUEUE, as measured from the clock on which the request (REQ#) signal is asserted until the first clock of data transfer. Assumptions: no outstanding AGP requests (pipeline empty); no wait states or control flow asserted by the graphics master—master is ready to transfer data on any clock (inserting n clocks of control flow may delay response by more than n clocks);

3) Mean bandwidth: deliverable AGP memory bandwidth via the LOW PRIORITY QUEUE, averaged across ~10 mS (one frame display time). Assumptions: no accesses to the high priority queue; graphics master maintains optimal pipeline depth of x; average access length of y; no wait states or control flow asserted by the graphics master.

2.4 Platform Dependencies

Due to the close coupling of the AGP and main memory subsystem, there are some behaviors of the AGP that may be platform-dependent. As one example of potential variation in platform, note the differences between FIGS. 1A and 1B. FIG. 1A shows an integrated approach, typical of many desktop and volume computer systems. In contrast, FIG. 1B shows a symmetric multiprocessor partitioning, typical of MP servers.

3. Signals and Protocol 3.1 AGP Operation Overview

In contrast with PCI, AGP provides memory access pipelining, as mentioned above. AGP pipelined bus transactions share most of the PCI signal set, and are actually interleaved with PCI transactions on the bus. Only memory read and write bus operations targeted at main memory can be pipelined; all other bus operations, including those targeted at device-local memories (e.g., frame buffers), are executed as PCI transactions, as defined in the PCI Rev. 2.1 Specification.

AGP pipelined operation allows for a single AGP compliant target, which is the system memory controller, referred to in this description as "core logic". In addition to AGP compliant Target functions, the core logic also implements a complete PCI sequencer, both master and target. Note that the AGP target behaves as a PCI 2.1 compliant Master and Target with one exception: the AGP target is not required to adhere to the target initial latency requirements stated in the PCI 2.1 specification. The AGP is defined as a point-to-point connection; therefore there is also a single AGP compliant master, which, in addition to implementing the AGP compliant master functions, also provides full PCI compliant target functionality—PCI compliant master functionality is optional. Note that the AGP Master functions as a PCI 2.1 compliant target.

3.1.1 Pipeline Operation

The AGP interface is comprised of a few newly defined "sideband" control signals which are used in conjunction with the PCI signal set. AGP-defined protocols (e.g., pipelining) are overlaid on the PCI bus at a time and in a manner that a PCI bus agent (non-AGP) would view the bus as idle. Both pipelined access requests (read or write) and resultant data transfers are handled in this manner. The AGP interface uses both PCI bus transactions without change, as well as AGP pipelined transactions as described herein. Both of these classes of transactions are interleaved on the same physical connection.

The access request portion of an AGP transaction (i.e., the bus command, address, and length) is signaled differently than is a PCI phase. The access request portion of an AGP transaction (bus command, address, and length) is signaled differently than is a PCI address phase. The information is still transferred on the AD and C/BE# signals of the bus, as is the case with PCI, but is identified or framed with a new control signal, PIPE#, in a similar way to which PCI address phases are identified with the FRAME# signal. Note that in this description, the symbol "#" in any signal name indicates that the signal is an active-low signal (i.e., considered to be asserted when in the low logic level).

Figures 1A, 3:
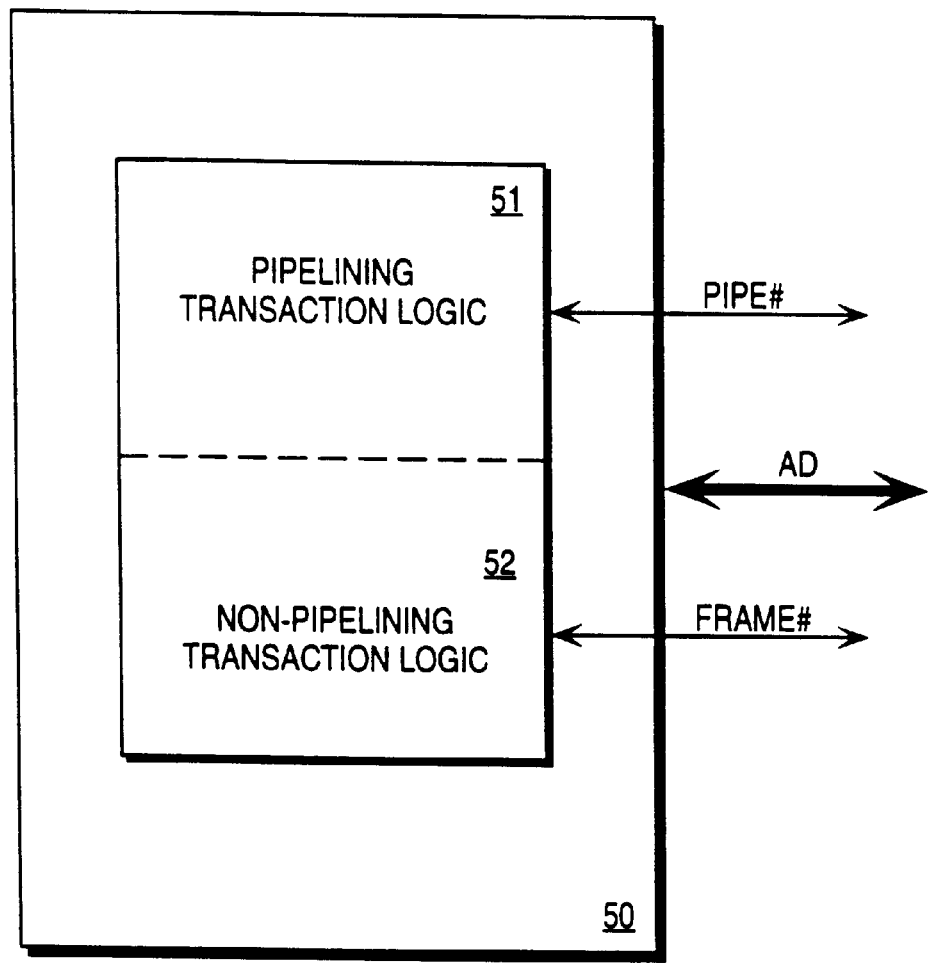
Figures 1B, 3:
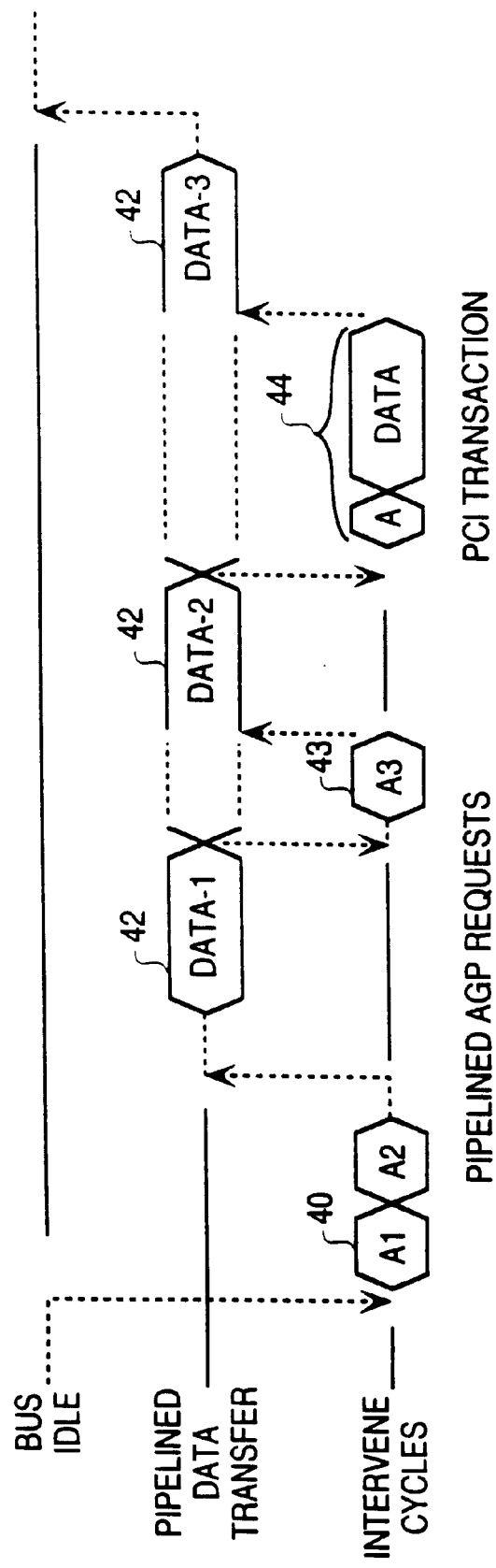
Figures 2, 3:
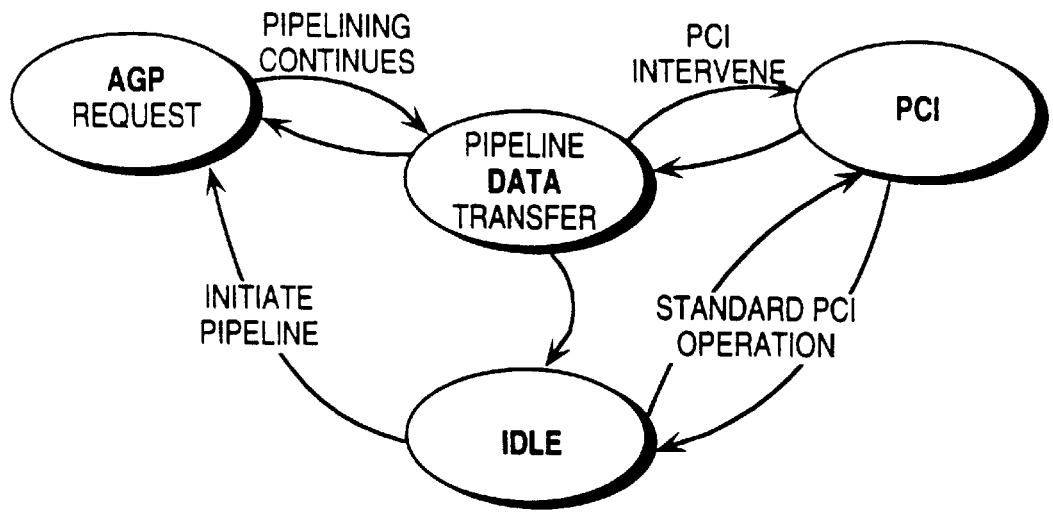
Figure 3:
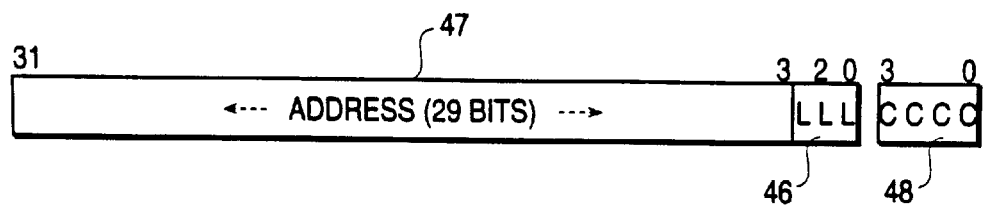

As illustrated in FIG. 3-1A, an AGP compliant bus agent 50 includes both logic 51 for pipelining AGP transactions and logic 52 for performing standard (non-pipelined) PCI transactions. Note also that there are mechanisms that allow address demultiplexing (i.e., using an alternate non-AD bus mechanism for transferring address) which is described below.

The maximum depth of the AGP pipeline is not architecturally constrained. However, the maximum AGP pipeline depth may be reduced further by the capabilities of both master and target. The target provides an implementation dependent number of pipe slots, which is identified at configuration time and made known to the bus master (see section 4.3). The pipeline is then source throttled, since a master is never allowed to have more outstanding requests than the number of pipe slots it has been allocated.

The notion of "intervening" in a pipelined transfer enables the bus master to maintain the pipe depth by inserting new requests between data replies. This bus sequencing is illustrated in FIG. 3-1B.

When the bus is in an idle condition, the pipe can be started by inserting one or more AGP access requests consecutively. Once the data reply to those accesses starts, that stream can be broken (or intervened) by the bus master (e.g., graphics controller) to:

1) insert one or more additional AGP access requests; or
2) insert a PCI transaction.

This intervene is accomplished with the bus ownership signals, REQ# and GNT#. In FIG. 3-1B, for example, the data reply 41 to access request 40 is intervened to insert an additional AGP access request 43 and a PCI transaction 44.

Operation of the bus can also be understood in terms of four bus states, which are shown in FIG. 3-2. The operation of the PCI bus can be described by the two states "PCI" and "IDLE", and the transition lines directly connecting them. The AGP pipeline is initiated from the IDLE state by arbitrating for the bus, and delivering one or more AGP access requests (AGP state). These requests are transmitted much like a PCI address phase, except that they are timed with PIPE# rather than FRAME#. When one or more addresses has been transmitted, and PIPE# is de-asserted, the bus enters the "DATA" state, in which the core logic (the AGP compliant target) controls the AD lines and transfers data. If a bus master then requests the bus (using the REQ# signal), the AGP compliant arbiter (located in AGP compliant target/core logic) suspends pipelined data transfer and, using the GNT# signals, allows the bus master to initiate a bus transaction, by driving the bus to either the "AGP" or the "PCI" state, depending on whether the master asserts PIPE# or FRAME#.

After the transaction is complete, the bus returns to the "DATA" state and resumes the pipelined transfer. Pipelined data flow may be suspended only at transaction boundaries, never in the middle of a single transaction. While the return of data is pending (a request for data has not been completed), the state machine remains in the "DATA" state. If a new request needs to be enqueued while data is pending, the machine transitions from "DATA" state to "AGP" or "PCI" state, depending on what type of request is initiated. The machine return to the "IDLE" condition only when all data has been transferred that was previously requested. For mobile designs, the clock is not allowed to be stopped or changed except when the bus has returned to the "IDLE" state, which means that there are no outstanding requests pending.

3.1.2 Addressing Modes and Bus Operations

AGP transactions differ from PCI transactions in several important ways.

1) The data transfer in AGP transactions (both reads and writes) is "disconnected" from its associated access request. That is, a request and the corresponding data may be separated by other AGP operations, whereas a PCI data phase is connected to its associated address phase with no possibility of intervening operations. This separation not only allows the pipe depth to be maintained, but also allows the core logic to ensure that a sufficiently large buffer is available for receiving the write data before controlling the bus on a data transfer that otherwise could be blocked awaiting buffer space. Note that all of the access ordering rules on AGP are based on the arrival order of the access requests, and not the order of actual data transfer.

2) AGP transactions use a completely different set of bus commands (defined below) than do PCI transactions. AGP bus commands provide for access only to main system memory. In contrast, PCI bus commands provide for access to multiple address spaces: memory, I/O, configuration. The address space used by AGP commands is the same 32-bit, linear physical space also used by PCI memory space commands, as well as on the processor bus. This physical memory space may contain a GART range, within which addresses are translated per the description in section 2.1.

3) Memory addresses used in AGP transactions are always aligned on 8-byte boundaries; 8 bytes is the minimum access size, and all accesses are integer multiples of 8 bytes in length. Note that it is possible to use smaller access within the scope of the present invention. However, because memories used with 64-bit processors will generally be 64 bits wide, smaller accesses will not provide any performance savings at the memory. In contrast, memory accesses for PCI transactions have 4-byte granularity, aligned on 4-byte boundaries. Smaller or odd size reads are accomplished with PCI read transactions. Smaller or odd size writes are accomplished via the C/BE# signals, which enable the actual writing of individual bytes within an eight byte field.

4) AGP access requests have an explicitly defined access length or size. In contrast, PCI transfer lengths are defined by the duration of FRAME#.

5) AGP accesses do not guarantee memory coherency. That is, AGP accesses are not required to be snooped in the processor cache. In contrast, PCI memory accesses always ensure a coherent view of memory and must be used on accesses where coherency is required.

The format of a complete AGP bus request is shown in FIG. 3-3. An AGP access request includes a length field 46, an address field 47, and a command field 48. In one embodiment, the address field 47, length field 46, and command field 48 contain The length field 46 contains the access length in units of quadruple words ("Q-words", or 8 bytes), and displaces the low order 3 bits of address. A length field of "000" indicates that a single Q-word (8 bytes) of data is being requested, while "111" indicates 8 Q-words (64 bytes) are being requested. The command field 48 contains the bus operation or command, as described in Table 3-1.

TABLE 3-1

AGP Bus Commands

| Command | A.G.P. Operation |
|---------|------------------|
| 0000 | Read |
| 0001 | Read (hi-priority) |
| 0010 | reserved |
| 0011 | reserved |
| 0100 | Write |
| 0101 | Write (hi-priority) |
| 0110 | reserved |
| 0111 | reserved |
| 1000 | Long Read |
| 1001 | Long Read (hi-priority) |
| 1010 | Flush |
| 1011 | reserved |
| 1100 | Fence |
| 1110 | reserved |
| 1110 | reserved |
| 1111 | reserved |

The commands of Table 3-1 are defined as follows:

Read: starting at the specified address, n sequential Q-words, where n=(length_field+1).

Read (hi-priority): same as Read, but the request is queued in the high priority queue. The reply data is returned out of order and within the maximum latency window established for high priority accesses (see section 2.3). High priority accesses only follow AGP ordering rules with respect to other high priority read accesses.

Write: starting at the specified address, write n sequential Q-words, as enabled by the C/BE# bits,
  where n=(length _field+1). writes obey the bus ordering rules (they may be retired ahead of previously issued reads).

Write (hi-priority): same as Write, but indicates that the write data must be transferred from the master within the maximum latency window established for high priority accesses (see section 2.3). (This implies that if the target write queue is full, some access priority must be raised in order to accommodate this access within the latency requirement.). High priority write accesses only follow AGP ordering rules with respect to other high write priority accesses.

Long Read: same as Read except for access size; in this case n=4* (length_field+1), allowing for up to 256 byte transfers.

Long Read (hi-priority): same as Read (hi-priority) except for access size, which is the same as for Long Read.

Flush: similar to Read. This command drives all low priority write accesses ahead of it to the point that all the results are fully visible to all other system agents, and then returns a single Q-Word of random data as an indication of its completion (see section 3.2.3). The address and length fields are meaningless for this command.

Fence: creates a boundary in a single master's access stream, around which writes may not pass reads (see section 3.2.3). This command is the only one which does not occupy a slot in the AGP pipeline.

Reserved: Must not be issued by a master and may be defined in the future.

3.1.3 Address Demultiplexing

Figures 3, 4, 4A:
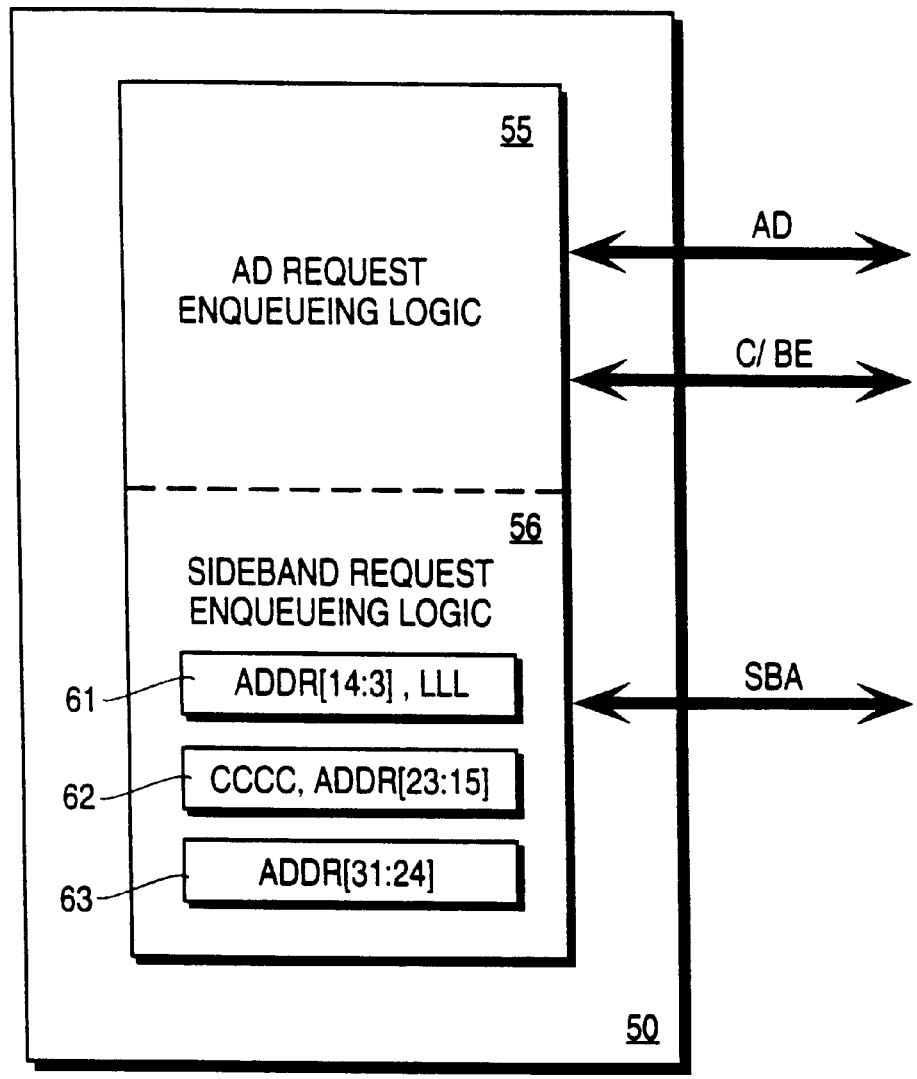

To increase efficiency and throughput, the address can be demultiplexed (provided on separate pins) from the data pins. A sideband signal set to do this (SBA[7::0]), referred to as the "sideband address port", as illustrated in FIG. 3-4A. In order to reduce pin costs, the sideband address port is only an 8-bit wide interface in the currently preferred embodiment.

Software queries the master to determine whether the SBA port will be used by the master. When used by the master, software enables the target to accept access requests using the SBA port. See section 4.1 for a description of the SBA status and enable bits.

The sideband address port is used exclusively to transmit AGP access requests (all PCI transactions use the AD pins for both data and address), and therefore it is always driven in one direction—from master to target. The semantics of an AGP request transmitted via AD pins or SBA pins are identical; only the actual syntax of transmission varies.

The SBA and AD pins are not used in combination to transmit requests; all AGP access requests are transmitted either on AD pins or SBA pins. A master which uses the sideband address port, has no need of the PIPE# signal, which is used only to frame requests on the AD pins. Nonetheless, as shown in FIG. 3-4A, an AGP compliant bus agent, particularly an AGP target, may include both AD enqueuing logic 55 for handling standard PCI requests and sideband enqueuing logic 56 for handling demultiplexed AGP requests.

In the currently preferred embodiment, in order to transmit the complete AGP access request across the eight-wire SBA port, the request is broken into three parts: low order address bits and length, mid-order address bits and command, and high order address bits; these three parts are referred as Type 1, Type 2 and Type 3, respectively. Once an access request is parsed by the master, the three parts are stored in three separate registers in both the AGP master and the AGP target. As shown in FIG. 3-4A, the sideband enqueuing logic 56 includes registers 61, 62, and 63 for storing the Type 1, Type 2, and Type 3 segments, respectively. The registers for Type 2 and Type 3 (in the sideband enqueuing logic 56) are "sticky". The term "sticky" refers to the attribute by which the registers retain what was last loaded into them. Hence, Type 2 and Type 3 need only be transmitted if they have changed since the previous request. This property exploits the potential locality in the access request stream to minimize the address traffic over the eight SBA signal lines.

The transmission of each of these three Types is accomplished by a separate SBA operation. Each operation on the sideband address port delivers a total of 16 logical bits, in two phases or transfer ticks of eight bits each. Each SBA operation requires two AGP clocks in 1× (66 MHz) transfer mode. In the 2× (133 MHz) transfer mode (source clocked option is active), the entire transfer completes in one AGP clock (See 3.5.1.2.) The SBA pins always operate at the same transfer rate as the AD pins; either 1× or 2× transfer mode as initialized in the AGP command register (see section 0.) This relationship keeps the eight-bit sideband address port well matched in speed with data transfer on the AD pins, since the minimum data transfer size is eight bytes (two AD ticks), and most AGP access requests will only involve the low order address bits and length, requiring a single SBA operation (two SBA ticks).

Table 3-2 below shows the definition and encoding of each of the sideband address port operations. In Table 3-2, underlines in the encoding column indicate operation (op) codes. Each op code requires two data transfers to move the entire 16 bits to the AGP compliant target. Note that the first piece of data transferred includes the op code. For example, the Length and Lower Address Bits encoding has an op code of 0. In this encoding, the first data transferred is the op code (0) and address bits 14-08. The second piece of data transferred is address bits 7-3 and the three length encoded bits.

TABLE 3-2

Sideband Address Port Encoding

| Encoding | | Description |
|---|---|---|
| $S_7 \ldots S_0$ | | Shows alignment of messages on physical sideband wires. |
| 1111 1111 [1111 1111] | | Bus Idle: used to indicate the bus is idle, also referred to as a NOP. When running at 1x transfer mode, this command is limited to a single clock tick of 8 bits (all ones) while 2x transfer mode requires the full 16 bits as shown here. |
| <u>0</u>AAA 14 AAAA 07 | AAAA 08 ALLL 03 | Length & Lower Address Bits: the AGP access length field (LLL), and lower 12 address bits (A[14::03]) are transferred across the sideband address port, and a memory access is initiated. This encoding is also referred to as a Type 1 sideband command. The remainder of the AGP access request (A[31::15] and bus command) is defined by what was last transmitted using the other two sideband address port commands (Type 2 and Type 3). Note that AD[2::0] are assumed to be zero when using this encoding and these bits are not transferred. |
| <u>10</u>CC AAAA 23 | CC-A 15 AAAA 16 | Command & Mid Address Bits: the AGP bus command (CCCC) and mid-order 9 address bits (A[23::15]) are transferred across the sideband address port; no memory access is initiated. This encoding is also referred to as a Type 2 sideband command. This command, when followed by the previous command (Type 1) provides for memory access anywhere within a naturally aligned 16 MB 'page'. |
| <u>110</u>- AAAA 31 | AAAA 35 32 AAAA 24 | Upper Address Bits: the upper 12 address bits (A[35::24]) are transferred across the sideband address port; no memory access is initiated. This encoding is also referred to as a Type 3 sideband command. This command, when followed by the two previous commands (Type 2 and Type 1) provides for memory access anywhere within a 32-bit physical address space. The extra four bits (A[35::32]) are place holders to avoid aliasing problems in the face of possible address expansion. |
| <u>1110</u> **** | **** **** | reserved: must not be issued by an AGP compliant master and maybe defined in the future. |

Note that only the Type 1 sideband address port command actually initiates a memory cycle; the Type 2 and Type 3 commands simply update respective 'sticky' bits in their respective registers. There is no restriction on the relative ordering in which Type 1, 2 or 3 commands can be issued by the AGP master. If a memory cycle is initiated prior to the initial setting of all access request 'sticky' bits, those bits are treated as indeterminate. For example, if the first command issued after the port is enabled is a Type 1 command (Type 2 or Type 3 have not occurred yet), the AGP compliant target may use an indeterminate address bits (A15-A31) and command (C3-C0) to access memory. The master is allowed to issue Type 1, 2 or 3 commands in any order and memory accesses are queued anytime a Type 1 is issued. The AGP compliant target receives a Type 1 command it takes the Type 1 information and combines it with previously stored Type 2 and Type 3 information to reconstruct a full address, command and length information to initiate a memory access.

In the currently preferred embodiment, the sideband address port has no associated control or framing signals; command framing is content sensitive (similar to serial interconnects). That is, the port encoding signifies whether there is valid information on the port. A NOP encoding (all 1's) indicates the port is idle and no action is initiated by the master. NOP must be continually transmitted when the port is not in use. The Type 2 and 3 target registers are not affected while NOPs appear on the SBA interface. Since all SBA operations must start with the rising edge of the AGP clock, the port idle encoding is 8-bits long in 1× transfer mode, and 16-bits long in 2× transfer mode.

3.2 Access Ordering Rules & Flow Control

3.2.1 Ordering Rules and Implications

This section discusses the ordering relationships between AGP and non-AGP transactions initiated on the AGP interface, between different streams of AGP transactions, between AGP transactions and other system operations (CPU and PCI). These rules apply to operations generated by an AGP compliant Master (and completed by an AGP compliant target). Note that the following rules do not apply to High Priority operations.

AGP Compliant System Ordering Rule:

There is no ordering relationship between an AGP Compliant Master's operation and any other system operation, including operations generated by host CPU(s), PCI agents, or expansion bus agents.

This rule means that AGP transactions are only required to follow AGP ordering rules, even when AGP transactions cross into other domains. For example, an AGP compliant master read to a location in memory that is currently locked by the processor is not required to adhere to the processor's lock. It is allowed to complete in the face of the lock and a programming error has occurred if this causes an incorrect operation. AGP compliant hardware is not required to ensure consistent data when AGP transactions interact with the rest of the system. For a read this means that the AGP compliant hardware is allowed to get a copy from main memory and is not required to obtain a more recent copy (if available) from the CPU cache. For a write, the AGP compliant hardware can simply write the data to main memory without snooping the CPU cache. If the cache has a modified line, it will overwrite the AGP write at some point. The AGP compliant hardware is not required to force AGP data out of the AGP domain to memory. When an AGP compliant master needs to cause a synchronization event (request an interrupt or set a flag) to occur it uses the FLUSH command to guarantee that previous AGP write operations become visible to the rest of the system.

AGP Compliant Device Ordering Rules:

1) The is no ordering relationship between an AGP operation and a PCI transaction.
2) The AGP compliant Target will return a stream of AGP read data in the same order as requested.
   Example: Reads requested in the order A, B, C, D will return data in the same order as requested: A, B, C, D.
3) AGP write operations are processed by the AGP compliant Target in the order they are requested.
   Example: writes requested in the order A, B where A and B overlap will cause B to overwrite part of A.
4) Read data returned will be coherent with previously issued AGP write requests.
   Example: Requests in the order 'Wa, Wb, Rc, Wd, Re' to the same address—Read data returned for Re will be what was written by Wd. (Reads push writes.)
5) An AGP write operation may bypass previously issued AGP read operations. Read data returned may reflect data associated with a subsequently issued write request. (Writes are allowed to pass reads)
   Example: Requests in the order 'Wa, Wb, Rc, Wd, Re' to the same address. Read data returned for Rc may be either what was written by Wb or Wd. Wd is returned when Wd passes Rc.
6) PCI transactions initiated by an AGP compliant Master or Target must follow the ordering rules specified in the PCI specification.

Explanation of AGP Interface Ordering Rules (explanations correspond to rules with the same number):

1) When an AGP compliant agent is capable of generating both PCI and AGP transactions, the AGP compliant target is not required to maintain any ordering between these two streams. However, the AGP compliant target is required to maintain order within a given stream based on the ordering rules for that stream. For example, a master issues a PCI and an AGP transaction. The order in which the AGP and PCI transactions complete does not matter. These are two different streams of requests and different streams have not ordering relationships.
2) Even though the AGP compliant Target will return a stream of AGP read data in the same order as requested, this does not mean that the read transactions actually occur at the destination in the same order as requested. For example, a master enqueues read x and then read y. Before the read data is returned, a write to location x and then a write to location y occurs. Because of the ordering rules defined above, it is possible for the read to location x to return old or new data and the read to location y to return old or new data. Note that if the read to location x returns new data it does not imply that the read to location y will also return new data. If the read to location x returned old data, it is possible for the read to location y to return new data. The value that is returned is determined by the AGP compliant target after the requests have been enqueued and before data is returned to the master. The ordering rules as described above only require that the data being returned to the master be delivered in the same order as requested. The AGP compliant target is allowed to re-arrange read requests to improve performance, but is never allowed to return data in a different order than requested. Another example is where the master requested read A, B, C and then D. However, the memory controller is allowed to obtain the data C, B D and then A, but is required to return the data in A, B C and then D.
3) This rule means that AGP write data cannot pass previously written AGP data.
4) Read requests will push write data (within the same stream) from an AGP compliant master. An AGP read to a location previously written by an AGP write operation will return the latest copy of the data seen by the AGP interface.
5) This rule means that an AGP write issued after an AGP read is allowed to pass the read request and may cause the read to return the new value of the data even though the write request and data transfer occurred on the bus after the read request occurred. To ensure that the old value is returned, the AGP compliant master must not issue the write transaction until after the read data has returned from the read request or issue a FENCE command (which is discussed in section 3.2.3) between the read and the write.

Implications of Allowing AGP Writes to Pass AGP Reads:

6) A potential problem created by allowing AGP writes to pass AGP reads is that an AGP read may return "old" data from a previous AGP write or "new" data from a following AGP write. An AGP read sandwiched by AGP writes may return data for either write—it is indeterminate. This is shown in the example of FIG. 3-4B. Assume that a 3D Graphics controller Master generates the illustrated sequence of pipelined AGP requests. In this example, the reads are from the frame buffer, texture buffer, and depth buffer respectively, while the writes are to the frame buffer. This example assumes that all frame buffer accesses are to the same address. FIG. 3-4C shows W1c passing R2t. In this case R2c will return "old" data from the W0c write. FIG. 3-4D shows W1c passing R2c. In this case R2c will return "new" data from the W1c write. FIG. 3-4E shows both W1c and W2c passing R2c. In that case R2c will return "new" data from the W2c write. (In this graphics controller example write W2c is dependent on R2c data returning. So in reality the write request W2c will not be generated before the read data for R2c is returned. However if the requests were pipelined deeper it would be possible for several writes to pass a particular read.)

7) PCI transactions generated by a device on the AGP interface follow the same rules as a device that resides on a PCI bus segment. The PCI agent transactions will follow the same rules as described in the PCI bus specification even though it was initiated on the AGP interface. This agent's transactions have no ordering with respect to any AGP transactions that occur.

AGP Compliant Master Implications of Allowing Writes to Pass Reads:

If an AGP compliant Master doesn't care if it gets "old" or "new" data for a given read operation, then no special action needs to be taken. If an AGP compliant master is particular about getting "new" or "old" data, then it is the AGP Compliant Master's responsibility to ensure that it gets the correct data. There are various methods to ensure that this occurs. Some of these methods are discussed below.

If an AGP Compliant Master must get "new" data it may:

Detect that a conflict exists between a read request that has already been generated and an internally pending write request, merge (or substitute) the "new" write data with the "old" read data when it is returned; or Delay the read request behind the write request. Since reads "push" writes per the ordering rules, the read will return the "new" data. Since it is desirable to deeply pipeline the AGP requests, actually determining that a conflict exists between a read and a subsequent write may be difficult (or impossible) to detect. Once a conflict is detected delaying the read may stall the pipeline and impact performance.

If an AGP Compliant Master must get "old" data it may:

Issue a FENCE command between the read and the following write; or

Delay the "new" data write until the "old" read data has been returned. This method has the potential for deadlock. A deadlock occurs when delaying a write causes an AGP Compliant Master's data engine to back-up. If the AGP Compliant Master's read data return buffers are full the stalled data engine can't remove read data from the buffers. The "old" read data can't be accepted and the write will continue to be delayed, creating the deadlock.

3.2.2 Deadlock Avoidance

An AGP Compliant Master can not make the data transfer phase of a previously issued request dependent on the completion of any other AGP or PCI transaction to the device as either a Master or Target.

3.2.3 Flush and Fence Commands

Because of the ordering rules of the AGP interface, the master can not guarantee when write data has reached its final destination. From the AGP compliant master's standpoint, a write transaction appears to have completed but the write data may still be pending in the AGP interface. The master also needs the ability to ensure that certain transactions complete on the AGP interface before other transaction are issued. This result can be accomplished by delaying the issuing of subsequent requests until previous requests complete, but this defeats the use of pipelining to improve system performance. The FLUSH command causes AGP transactions to become visible to the rest of the system so synchronization events may occur. The FENCE command guarantees what order accesses will complete in, without delaying the issuing of subsequent commands. Each will be discussed in more detail in the following paragraphs. The FENCE and FLUSH commands are low priority commands and have no affect on high priority requests.

FLUSH:

Under most conditions the master does not care if its transactions are visible to the system or not. But in those cases when it does matter, the FLUSH command is used by an AGP compliant master. The FLUSH command ensures that its low and high priority write transactions have become visible to the rest of the system. Because of the AGP ordering rules, the master can not cause accesses to become visible to the system by using the memory commands like is possible when using PCI commands. Memory commands can only cause data to be returned in a specific order; they place no requirement on the core logic to make accesses visible to the system. However, the core logic must cause AGP accesses to become visible to the rest of the system when the FLUSH command is issued. The FLUSH command behaves similar to a low priority read command except that a single Qword of random data is returned. The return of the random data is the acknowledgment to the master that all previous low and high priority write transactions have become visible to the system. When the FLUSH command completes, the master may safely cause a synchronization event to occur.

Take the case when the AGP compliant master writes data to memory, but does not use the FLUSH command before generating an interrupt. The driver reads its device and determines that data is valid in memory. When it accesses main memory (from the CPU) it may access stale data because the data is still in the AGP domain. In the PCI domain, this sequence was all that was required to guarantee that the correct data would be accessed. However, for AGP this is not sufficient. Since AGP accesses have no ordering with respect to any other accesses in the system (in this example from the CPU), the AGP interface is not required to flush posted write data before completing a read to the AGP interface. Therefore, the posted write data may still reside in the AGP interface and the driver may access stale data. For PCI transactions, the flush of posted data on any read causes loss of performance in the system and generally is only required in certain cases. The FLUSH command provides a mechanism for the master to ensure that the correct data will be accessed when a synchronization event occurs, but does not force the system to flush buffers when not required.

The FLUSH command occupies a slot in the Transaction Request Queue when issued and is retired from the queue when the associated single Q-word of data is returned. The only limit to the number of outstanding FLUSH requests are the limits of the transaction request queue itself. It is possible to have the Transaction Request Queue full of FLUSH commands.

FENCE:

Because of the AGP ordering rules, the master needs a mechanism that forces writes not to pass previously enqueued read commands. An AGP compliant master uses the FENCE command to demarcate one set of AGP requests from another. The FENCE command affects the order in which they are completed in memory and may not necessarily determine the order in which they complete on the bus. On either side of the demarcation, AGP requests are processed based on the AGP ordering rules. However, all requests generated prior to the FENCE command are processed prior to any request following the FENCE command. AGP write requests generated after a FENCE command may not pass any read requests generated prior to the FENCE command. Read requests issued after the FENCE command may not be combined with or pass any read request issued prior to the FENCE command.

High Priority requests are exceptions and are allowed to pass the demarcation established by the FENCE command. The FENCE command does not occupy a slot in the Request queue of the AGP compliant master or target. An AGP compliant master may generate an unlimited number of FENCE commands.

3.2.4 Access Request Priority

The AGP bus command set supports two levels of access priority. In general, the high priority queue has the highest priority for memory service, and the low priority queue has lower priority than the processor, but generally higher than any other subsystem for memory service. The high priority queue should be used with caution since it causes additional latency to other requests. For example, the high priority queue may be useful for a graphics controller reading display memory or to avoid overflow/underflow in a data stream having real-time deadlines. The high priority queue is intended for very selective use when an AGP request needs immediate processing.

Requests in the high priority queue may bypass all other (low priority or PCI) requests and may be returned out of order with respect to other streams. Only requests that can tolerate re-ordering (with respect to all accesses other than themselves) should be completed using a high priority command. High priority accesses only have order with respect to the same type of request. For example, high priority read requests only have ordering with respect to other high priority read requests. High priority write accesses only have ordering with respect to other high priority write accesses. Unlike low priority operations, there are no ordering requirements between high priority read and high priority write accesses. The sequence, HPR-A, HPW-B, HPR-C and HPW-D will be used in the following discussion. Read data will be returned in the order in which read accesses were requested. In this example, A will always complete before by C. Write data will always complete in the order requested, in this example write B will always complete before write D. There is no order between read and write high priority operations. In this example, the accesses may complete A, C, B and D; A, B, C and D; B, A, D and C; or B, D, A, and C. However, the order can never be C completes before A or D completes before B.

Both read and write requests may be issued as high priority accesses. The AGP protocol designates read replies as part of either the high or low priority stream, enabling the bus master which originated the access to associate the reply with the correct outstanding request. Writes issued as high priority accesses will have transferred the data across the interface within the maximum latency window established for high priority accesses. This does not imply that the data will have been retired to main memory within this latency window.

3.2.5 Flow Control
3.2.5.1 Introduction

Flow control on AGP is different than that of PCI. On PCI, the master and target may delay the transfer of data on any data phase. Before each data phase can complete, both the master and target must agree that data can be transferred by asserting their respective xRDY# signal. When either is not prepared to transfer data, the current data phase is held in wait states. PCI also allows the target to indicate to the master that it is not capable of completing the request at this time (Retry or Disconnect). Only when both agents agree to transfer data does data actually transfer.

On AGP, flow control is over blocks of data and not individual data phases. Flow control will be discussed with respect to Initial Blocks and Subsequent Blocks. Some transactions only have initial blocks; such as when the entire transaction can be completed within four clocks. Transactions that require more than four clocks to complete are comprised of both an Initial Block and one or more Subsequent Blocks. A block is defined as four AGP clocks and is eight-byte aligned, but is not required to be cacheline aligned. Depending on the transfer mode, the amount of data that is actually transferred may change. However, in all cases the number of clocks between throttle points (TPs) is always four in the preferred embodiment. Flow control on AGP refers to the initial or subsequent data block.

Table 3-3 lists the control signals and which agent drives them and which agent receives them. Table 3-3 lists the flow control of initial and subsequent blocks based on transaction type and which agent is allowed to flow control the data movement.

TABLE 3-3

AGP Flow Control Points

| Flow Control Point Transaction Type | Target - Initial Data Block | Target - Subsequent Data Block | Master - Initial Data Block | Master - Subsequent Data Block |
| --- | --- | --- | --- | --- |
| Low Priority Read Data | TRDY# | TRDY# | RBF# | IRDY# |
| High Priority Read Data | TRDY# | TRDY# | None | IRDY# |
| Write Data | GNT#/ST [2::0] | TRDY# | IRDY# | None |

There are essentially three situations in which the transfer of data can be delayed:

1) after the data has been requested but before initial data block is returned;
2) during the initial data block of the transaction; and
3) for subsequent data block(s).

The first case occurs when the master is allowed to delay the return of read data for a low priority transaction by the use of RBF# (Read Buffer Full). This signal implies that the Read Buffer is currently full and that the arbiter is not allowed to attempt to return low priority read data.

The second case occurs for both the master and target. The target is allowed to delay the completion of the first data phase of the initial block of read data by not asserting TRDY#. Since the control and data are moving in the same direction, the master latches the read data and qualifies it with TRDY#. When TRDY# is asserted, the data is valid on each clock until the block completes. The master is not allowed to flow control the initial block of a high priority read transaction. However, as with low priority reads, the master is allowed to flow control high priority reads like low priority reads on Subsequent blocks of data. The master is allowed to delay the first data phase of a write transaction by not asserting IRDY#. The agent receiving data is not allowed to insert wait states on the initial block of data for either read or write transactions. The agent sending data is allowed to delay the initial block of data of either a read or write up to a maximum of one clock from when the transaction was allowed to start.

The third case in which the transfer of data can be delayed is where both the master and target are allowed to insert wait states on subsequent blocks of read data. The master is not allowed to insert wait states on subsequent write transactions, but is allowed to do so on read transactions (both High and Low Priority).

For the throttle point (TP), there is no specified limit to how long IRDY# or TRDY# may be de-asserted. However, the master must realize that inserting even one wait state at any TP of a read transaction may invalidate the latency guarantee of all outstanding high priority requests. If the master inserts a wait state at a TP, it can not make any assumptions about what impact the wait state will have on the latency guarantee. For instance, inserting five wait states at a TP of read A (high or low priority) does not mean that outstanding high priority read request B will complete in x+5 clocks (where x is the latency guarantee provided by the core logic). The target must include any potential TRDY# throttle point wait states in its latency guarantee. The specific latency behavior of a target when a master inserts a wait state is implementation specific.

3.2.5.2 Read Flow Control

Initial Master Flow Control (Low Priority Reads)

RBF# (Read Buffer Full) is an output of the Master and indicates whether it can accept low priority read data or not. What affect the assertion of RBF# has on the data transfers depends on the length of the next transaction and the rate at which data is being transferred. If the master has RBF# de-asserted, it must be able to accept the following transactions assuming that the master asserts RBF# on the clock in which the grant is received:

For transactions that can be completed in four clocks or less, the master is required to accept the entire transaction without wait states regardless of the data transfer mode. When the transaction requires more than four clocks to complete, the master is allowed to insert wait states after each four clocks in which data is transferred.

For 1x data transfers, the master must accept the entire transaction without wait states when the length is less than or equal to 16 bytes. When the transfer length is greater than 16 bytes, the master is allowed to flow control after each 16 byte transfer. When the length is 8 bytes or larger, the master has sufficient time to assert RBF# to prevent the arbiter from initiating the return of more low priority read data.

For 2x data transfers, if a low priority read transaction's length is greater than eight bytes the master must accept only the one low priority read transaction, because the master has sufficient time to assert RBF# to prevent the arbiter from initiating the return of more read data. When the transfer size is greater than 32 bytes, the master is allowed to flow control after the transfer of each 32 byte block.

For 2x data transfers, if the first low priority read transaction's length is equal to eight bytes, the master must accept two low priority read transactions. The first transaction must be accepted without flow control. The master must also accept the entire second transaction without flow control when its length is less than or equal to 32 bytes. When the second transaction's length is greater than 32 bytes, the master must accept the initial 32 bytes of the transaction, but is then allowed to flow control the subsequent 32 byte block(s).

Note: The arbiter must delay the assertion of GNT# for a subsequent read data transfer so that it is sampled asserted on the same clock edge as the last data phase for the previous read transaction when it is greater than eight bytes. In order to allow full performance of eight byte read transfers, the arbiter must pipeline the assertion of GNT# in a back-to-back fashion, otherwise dead clocks will appear on the AD bus. If the arbiter did not delay the subsequent GNT# in this manner the master would need a minimum of 64 bytes of buffering instead of 40 bytes for the 2x transfer mode, for example.

Table 3-4 shows the minimum amount of available data buffering required in the master when RBF# is de-asserted. The table only applies to 2x data transfer mode. For 1x data transfer mode, the amount of data buffering required is simply enough to accept the next data transfer or up to 16 bytes, whichever is greater.

TABLE 3-4

Data Buffering for 2x Transfers

| 1st Read Transaction | 2nd Read Transaction | Buffer space needed to de-assert RBF# |
|---|---|---|
| 8 bytes | 8 ≦ n ≦ 32 bytes | 8 + n bytes |
| 8 bytes | n > 32 bytes | 40 bytes |
| 16 bytes | don't care | 16 bytes |
| 24 bytes | don't care | 24 bytes |
| 32 bytes | don't care | 32 bytes |
| >32 bytes | don't care | 32 bytes |

If the master can't accept the above transaction(s), it asserts RBF#. The AGP compliant arbiter will not assert subsequent grants for low priority read data while RBF# is sampled asserted. In the event that GNT# and RBF# are asserted on the same clock, the master must be able to accept at least 4 clocks worth of data, the amount of data is dependent on the transfer mode. For the 2x mode, at least 32 bytes of data for the next low priority read transaction must be accepted.

Note that the AGP compliant master has many implementation alternatives that can be predicated by buffer budget and complexity. For example the AGP compliant master could restrict itself to generating only 16 byte low priority read transactions. In this case, only 16 bytes of buffering need to be available in order to de-assert RBF#. If an AGP compliant master restricts itself to 8 and 16 byte low priority read transactions, RBF# can be de-asserted whenever 24 bytes of buffering are available when in 2x transfer mode. An AGP compliant master that does not restrict the size of its low priority read requests needs a minimum of 40 bytes of buffering for 2x transfer mode. Optionally this master could dynamically alter the RBF# threshold point based on the size of the next two accesses. It is highly recommended that the master use RBF# only in unusual circumstances in which the target is able to provide data quicker than the master is able to consume it. In normal operations, the master should be able to consume that requested data faster than the target is able to provide it. In the preferred embodiment, the assertion of RBF# to stop the return of data is not part of the "normal" behavior of the master.

Figures 3, 4, 4F:
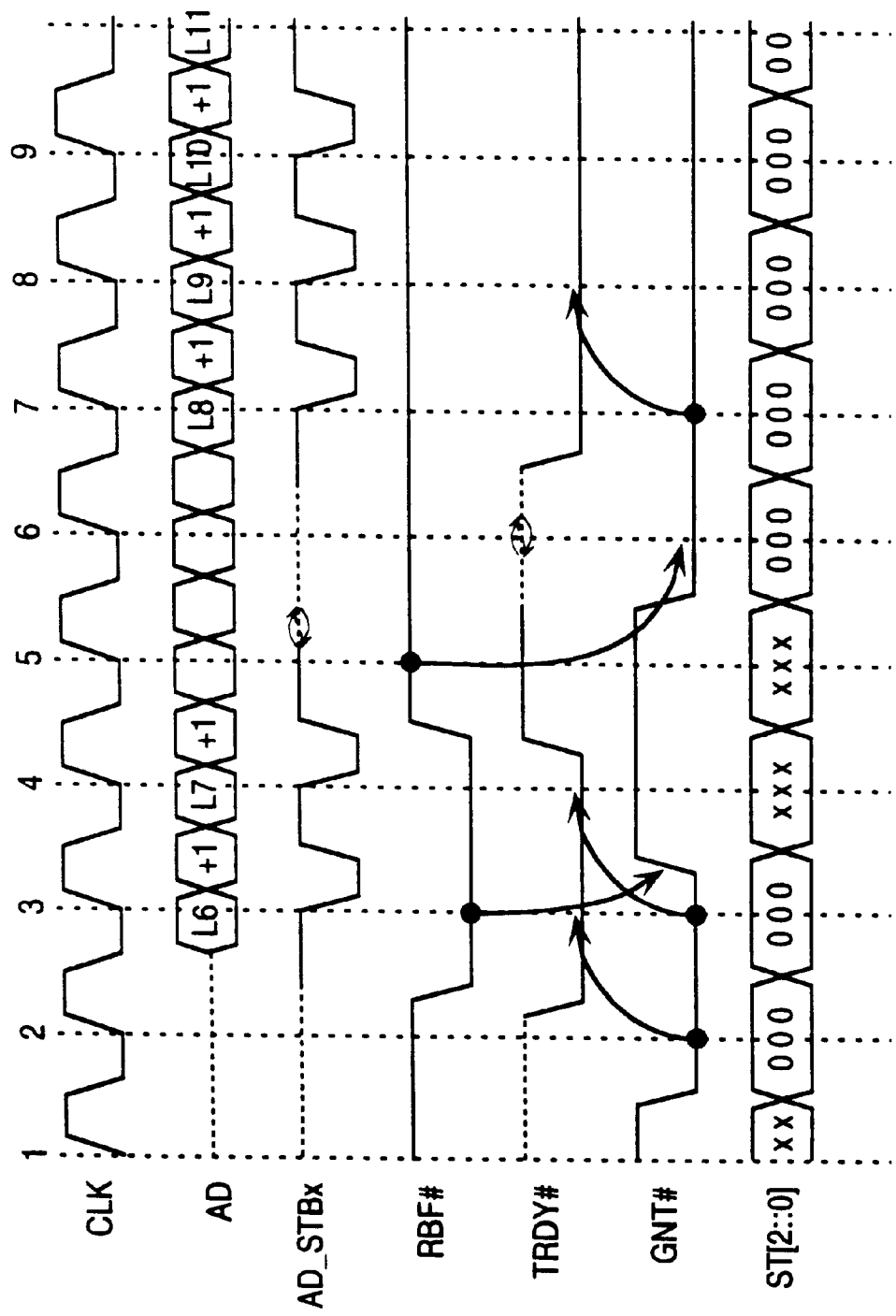

FIG. 3-4F illustrates the enqueuing of two grants before the arbiter detects that RBF# is asserted. Since RBF# is de-asserted on clock (CLK) 1, the AGP compliant arbiter asserts GNT#/ST[2::0] to indicate the return of a low priority read data (D0) for clock 2. Since the first read data being returned is 8 bytes, the AGP compliant arbiter continues asserting GNT#/ST[2::0] for clock 3 to allow the second transfer to occur without dead time on the AD bus between data transfers of D0 and D1. At this point the arbiter has indicated to the master that two transactions worth of data will be returned. Because RBF# is asserted on clock 3, the arbiter is not allowed to initiate the return of any more data after this point until RBF# is sampled de-asserted again. The arbiter asserts GNT# for clock 6, since the master de-asserted RBF# on clock 5 and the arbiter is Ready to return more low priority read data to the master.

The master decodes the initial request (clock 2), determines that sufficient buffer space is not available for a subsequent transaction and asserts RBF#. Since GNT# and RBF# are both asserted on clock 3, the master must accept the second transaction. While the master keeps RBF# asserted, the arbiter is not allowed to initiate the return of any new low priority read data.

However, the arbiter is allowed to return high priority read data, request (high or low priority) write data from the master, or grant the master permission to initiate requests. (See FIG. 3-20.)

Since GNT# is asserted on clock 2 (ST[2::0] indicates the return of low priority read data), the master starts accepting data and qualifies it with TRDY# to determine when it is valid. Note that TRDY# is only asserted on the initial data transfer of this transaction since it will complete within four clocks. Once the initial data transfer completes, the master begins accepting data for the second transaction and qualifies that data with TRDY#. Note that TRDY# must be asserted on the initial data phase of each transaction.

Initial Master Flow Control (High Priority Reads)

The master must always be able to accept read data for all high priority queued transactions that can complete within 4 clocks. When a high priority read request requires more than 4 clocks (multiple blocks) to complete, the master can throttle the transaction (and effectively stall subsequent high priority read data) with IRDY# after each data block transfers (this is discussed in the next section). RBF# does not apply to high priority read data, and IRDY# cannot be used to initially stall the return of high priority read data.

Throttling

Throttling applies uniformly to both low and high priority read data. Both the target and the master have the ability to throttle read data by adding wait states after each block of data transfers. If either the target or the master wants to throttle the transfer of a subsequent block of data, the target must have TRDY# or the master must have IRDY# de-asserted two 1× clocks prior to when the subsequent block would begin to transfer; this point in time is referred to as the throttle point (TP). Data transfer will resume two 1× clocks after both IRDY# and TRDY# are sampled asserted. If throttling is not required by either the master or the target, then both IRDY# and TRDY# will be asserted at the throttle point. A throttle point occurs every 4 clocks. IRDY# and TRDY# have no meaning between throttle points and may be de-asserted. IRDY# and TRDY# also have no meaning on the last throttle point of a transaction that is equal to or less than a block. Note that IRDY# for the master and TRDY# for the target must be actively driven from the first TP until the completion of the last TP. (The xRDY# signal can be actively driven earlier when the transaction will not complete during the initial block. xRDY# is allowed to be de-asserted and tri-stated between TPs, although the timing diagrams do not illustrate this behavior.) Following the last TP, xRDY# must be de-asserted and tri-stated. During a TP for a read data transfer, once xRDY# is asserted it must remain asserted until the current TP completes, which occurs when both IRDY# and TRDY# are asserted.

3.2.5.3 Write Data Flow Control

Initial Target Flow Control

The AGP compliant arbiter will only assert GNT#/ST [2::0] for write data when the target can accept the entire transaction or the initial block. The initial flow control is the same for both high and low priority data write requests.

Initial Master Flow Control

Figures 3, 4, 5:
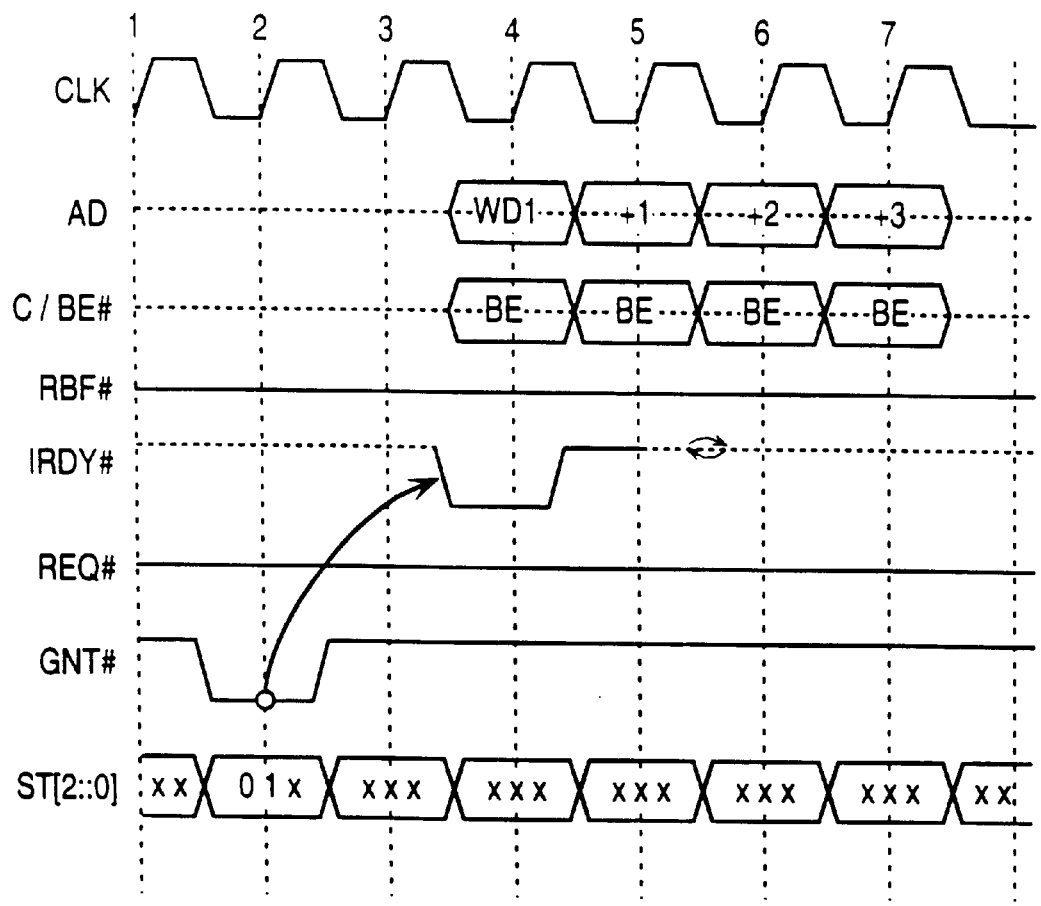
Figures 3, 4, 5, 6:
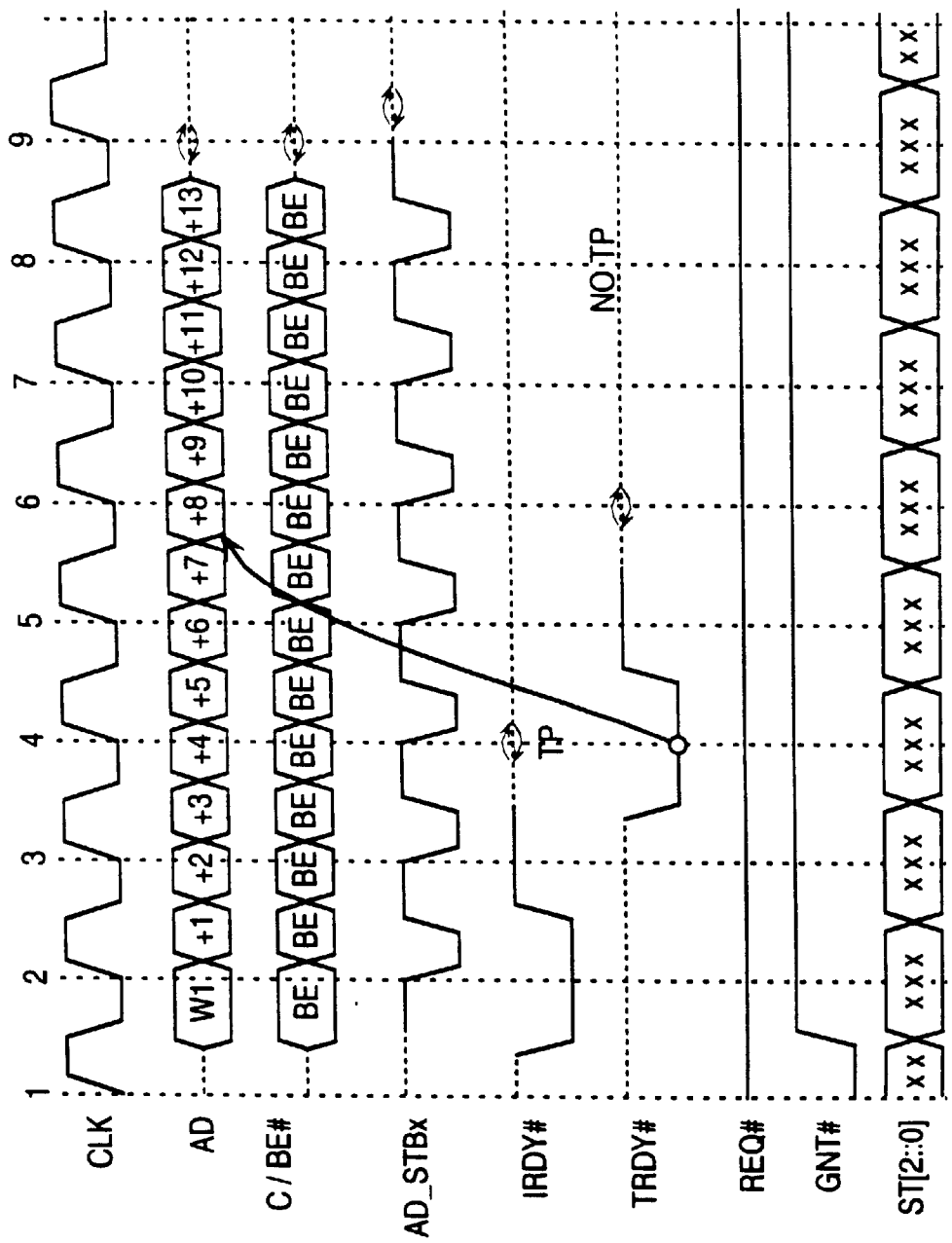
Figures 3, 4, 5, 6, 7:
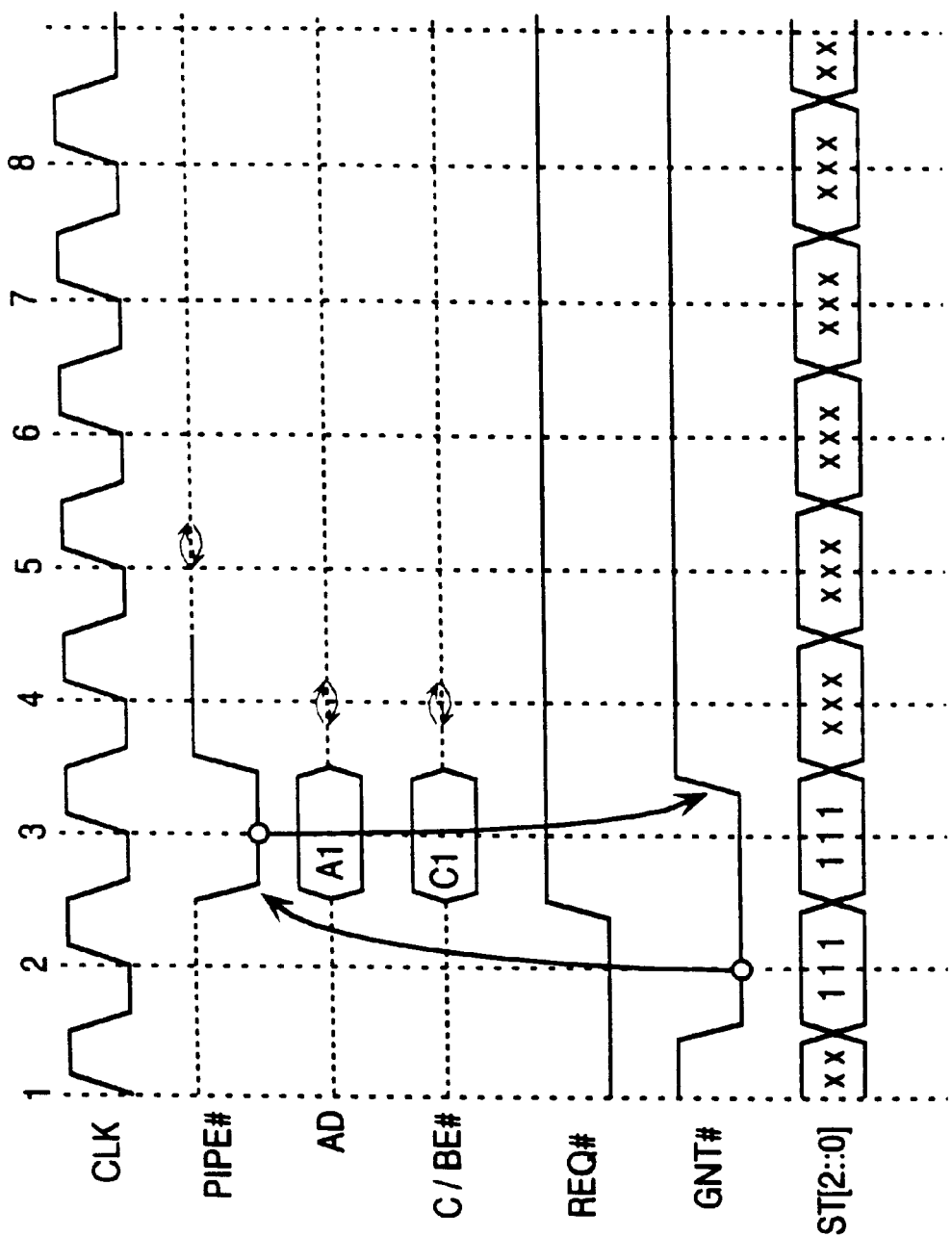
Figures 3, 4, 5, 6, 7, 8:
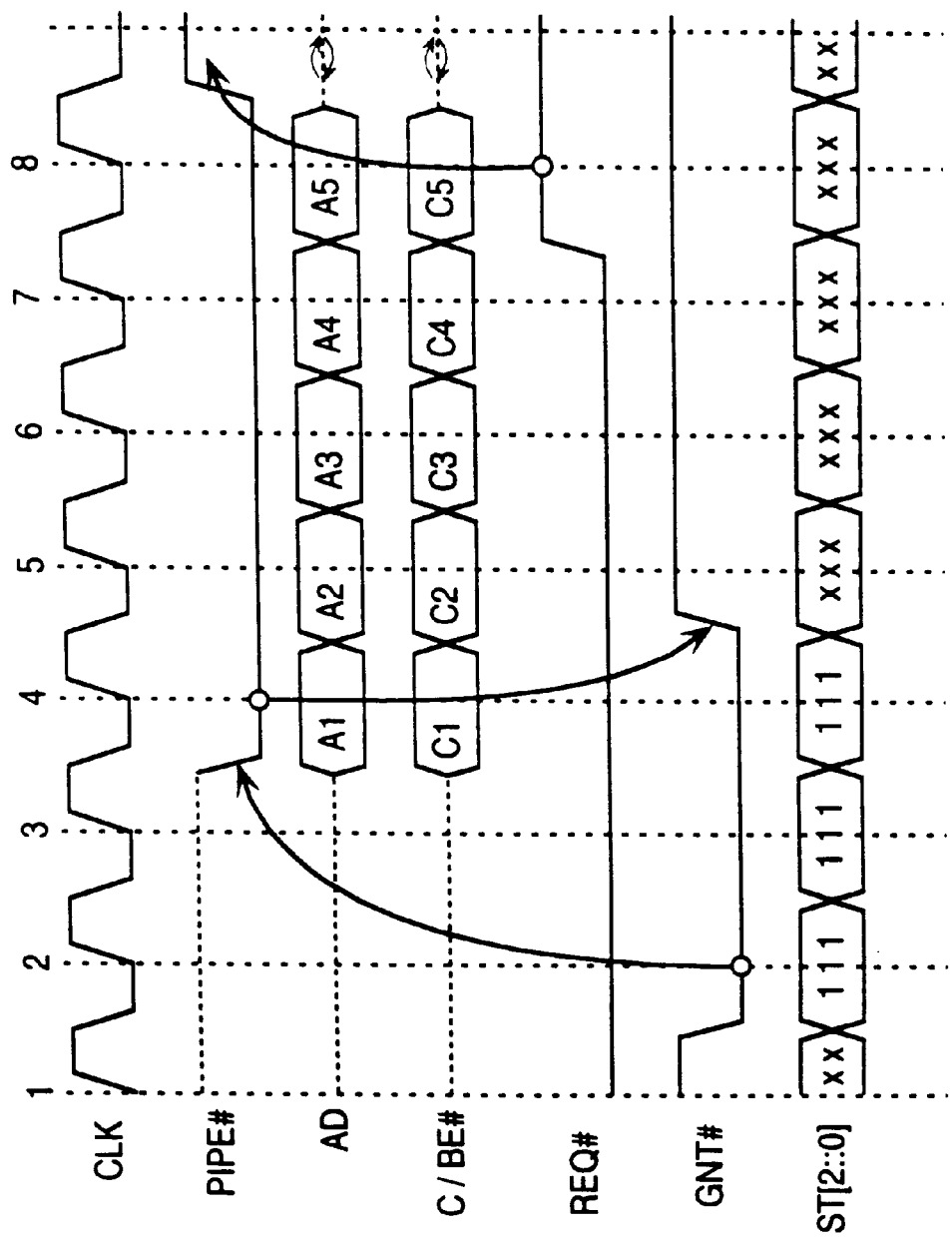
Figures 3, 4, 5, 6, 7, 8, 9:
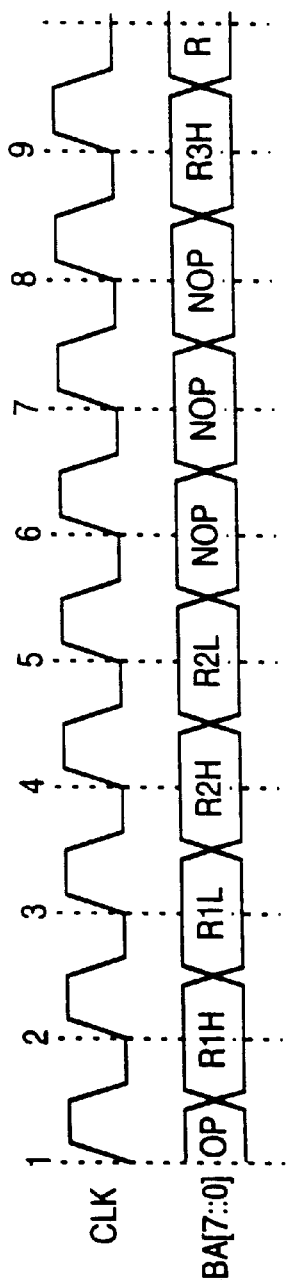
Figures 3, 4, 5, 6, 7, 8, 9, 10:
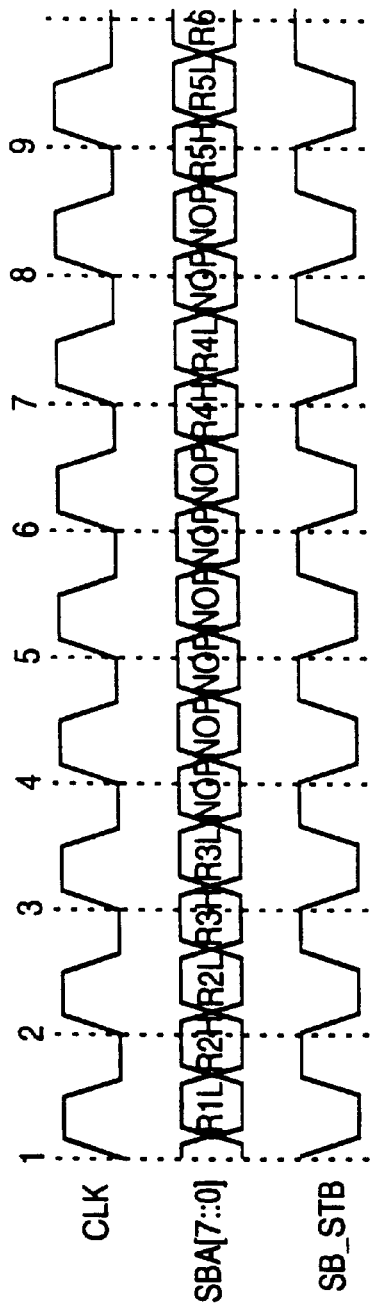
Figures 3, 4, 5, 6, 7, 8, 9, 10, 11:
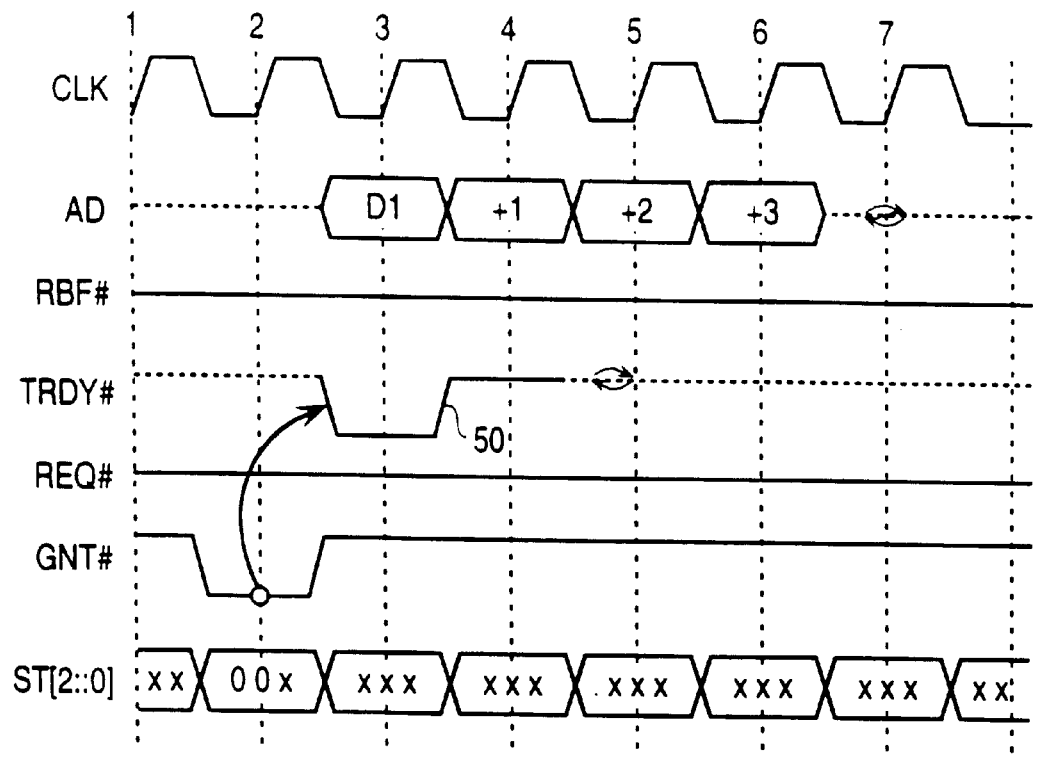
Figures 3, 4, 5, 6, 7, 8, 9, 10, 11, 12:
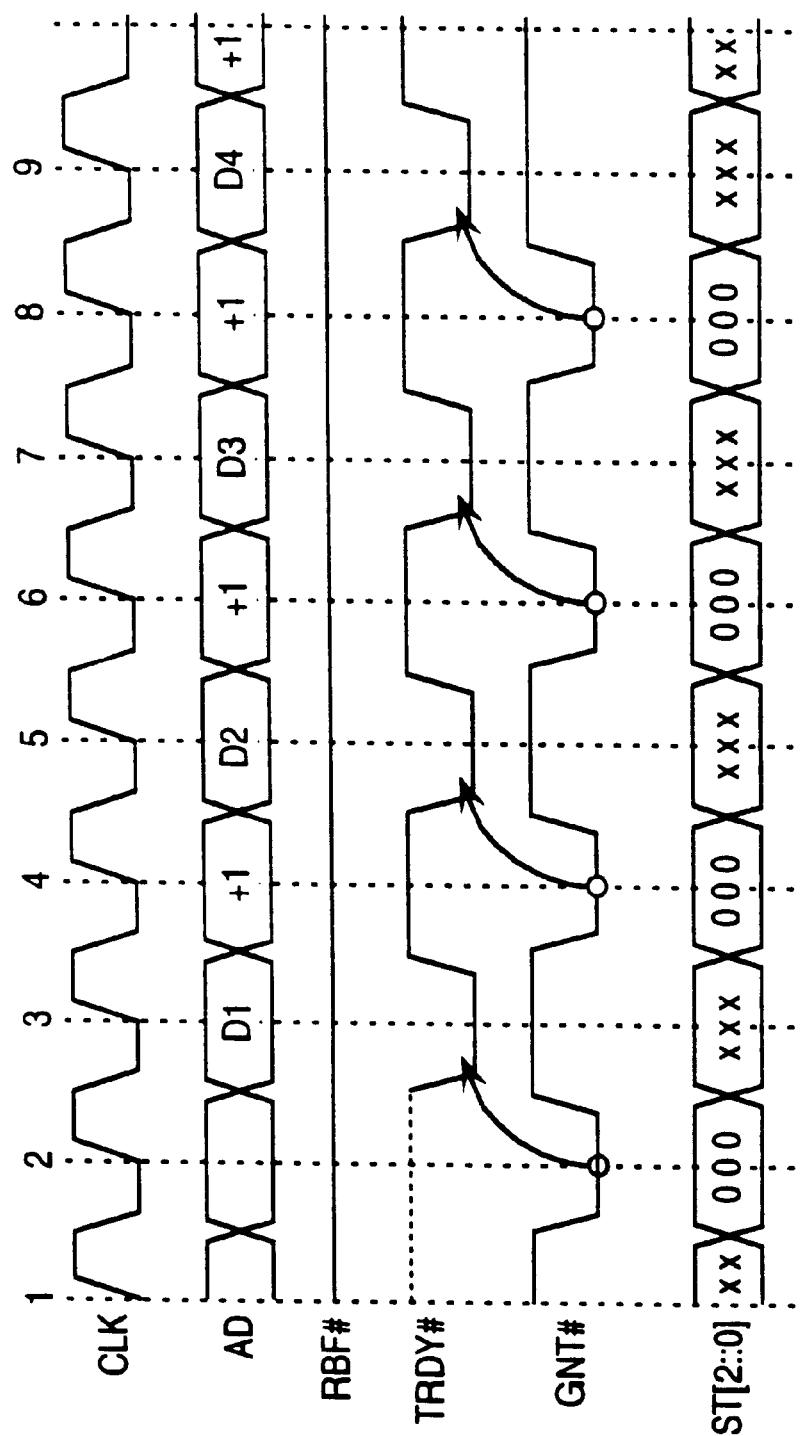
Figures 3, 4, 5, 6, 7, 8, 9, 10, 11, 12, 13:
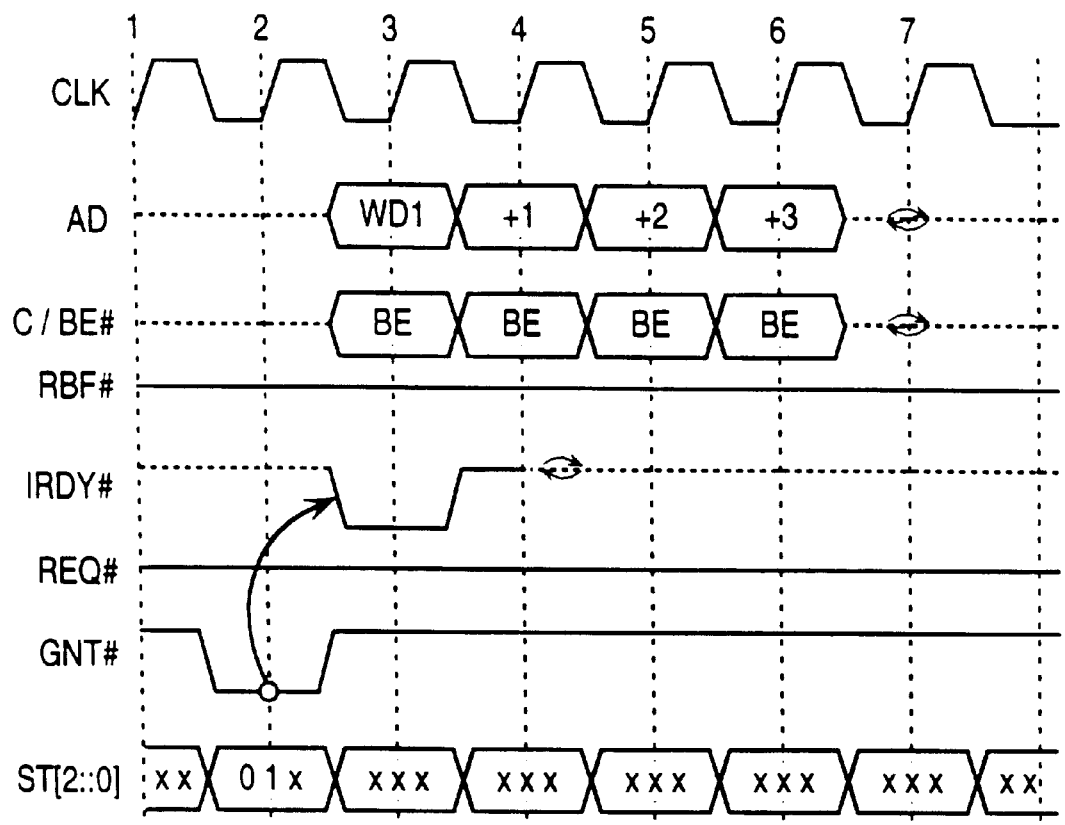
Figures 3, 4, 5, 6, 7, 8, 9, 10, 11, 12, 13, 14:
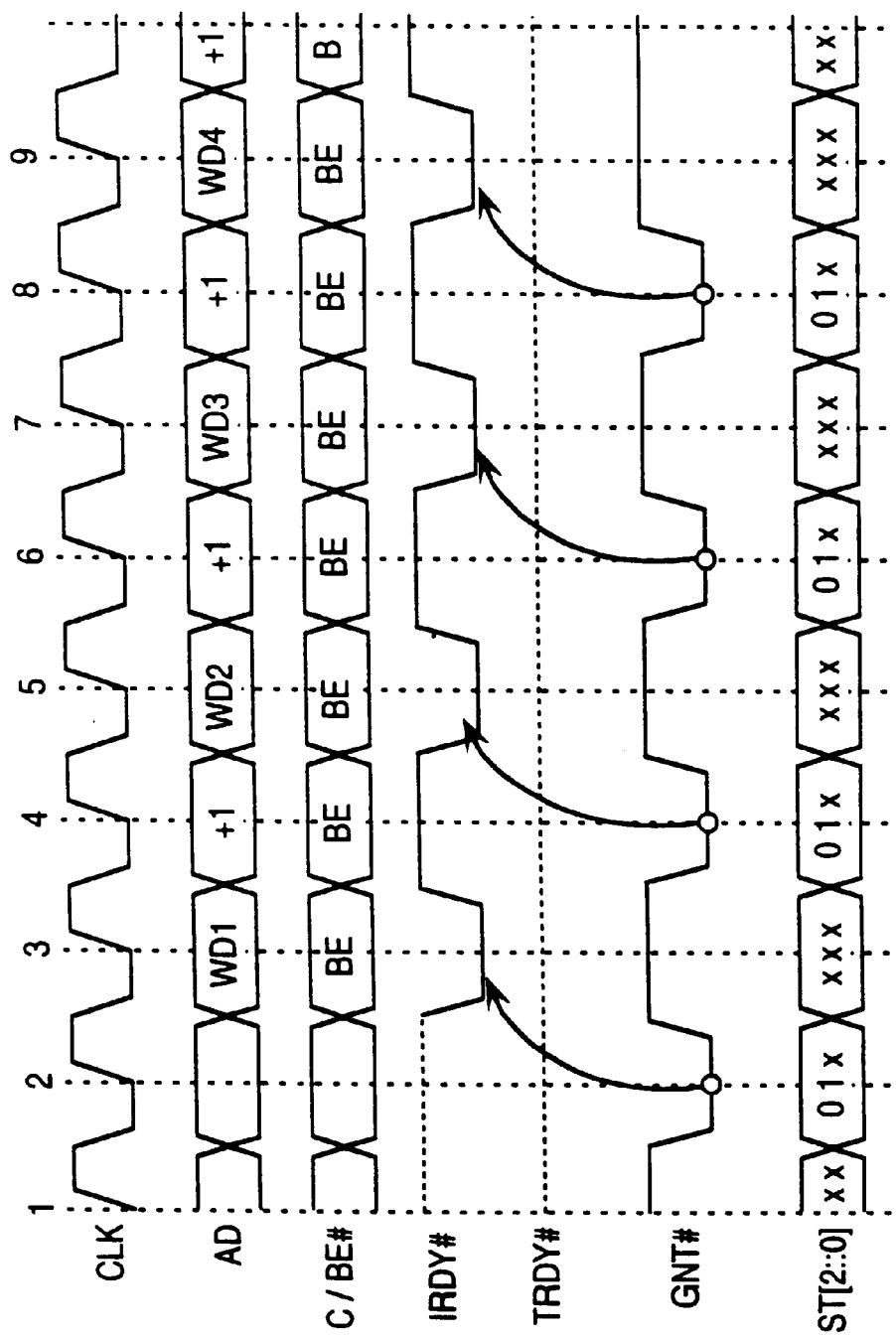
Figures 3, 4, 5, 6, 7, 8, 9, 10, 11, 12, 13, 14, 15:
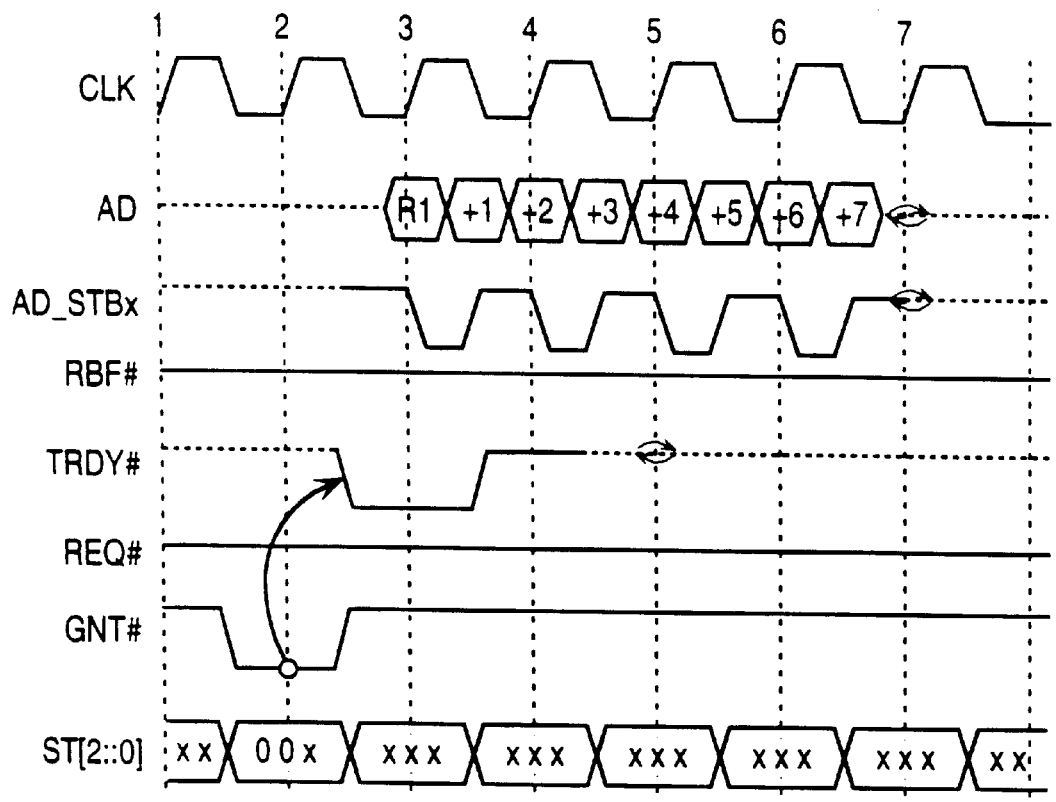
Figures 3, 4, 5, 6, 7, 8, 9, 10, 11, 12, 13, 14, 15, 16:
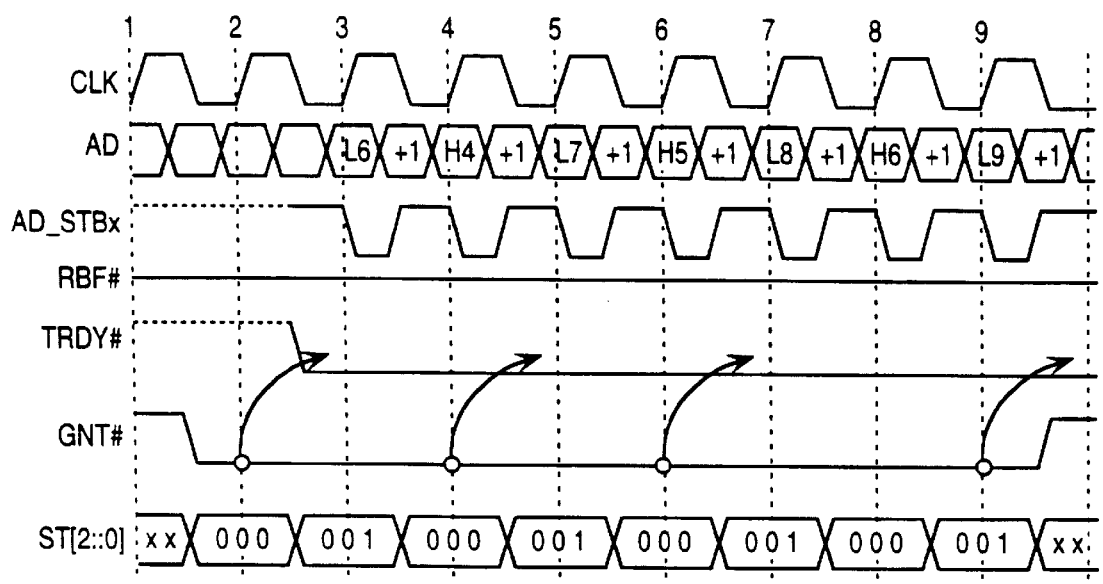
Figures 3, 4, 5, 6, 7, 8, 9, 10, 11, 12, 13, 14, 15, 16, 17:
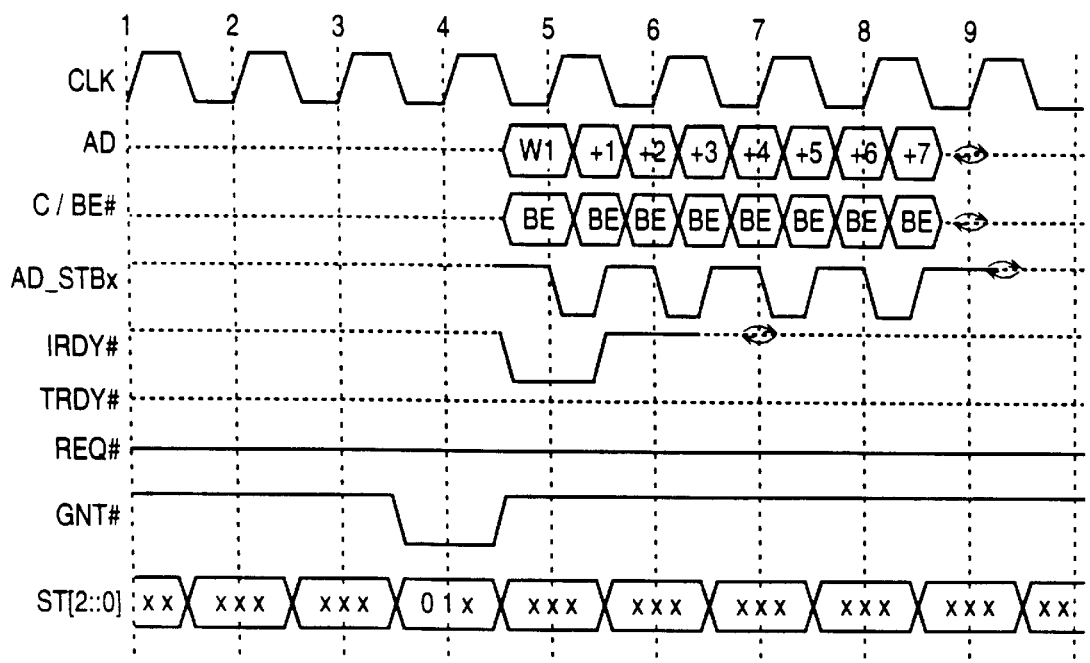
Figures 3, 4, 5, 6, 7, 8, 9, 10, 11, 12, 13, 14, 15, 16, 17, 18:
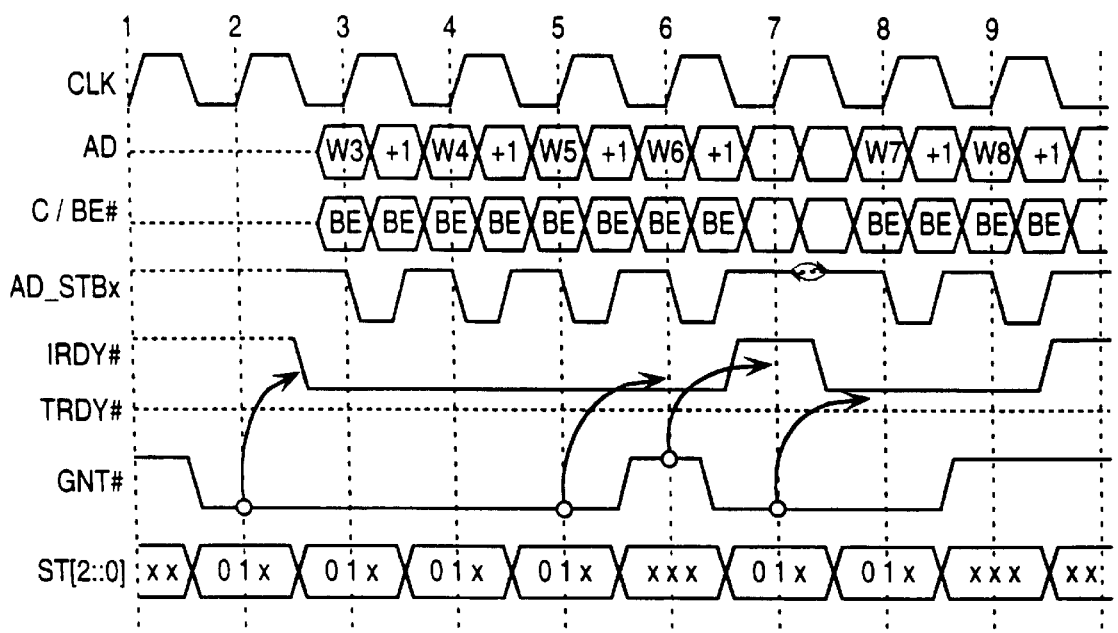
Figures 3, 4, 5, 6, 7, 8, 9, 10, 11, 12, 13, 14, 15, 16, 17, 18, 19:
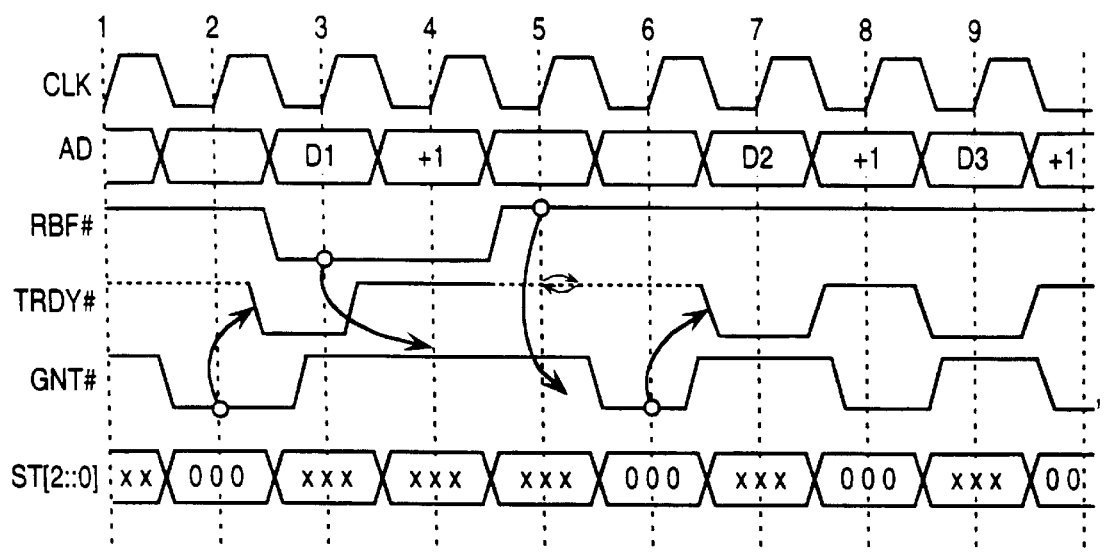
Figures 3, 4, 5, 6, 7, 8, 9, 10, 11, 12, 13, 14, 15, 16, 17, 18, 19, 20:
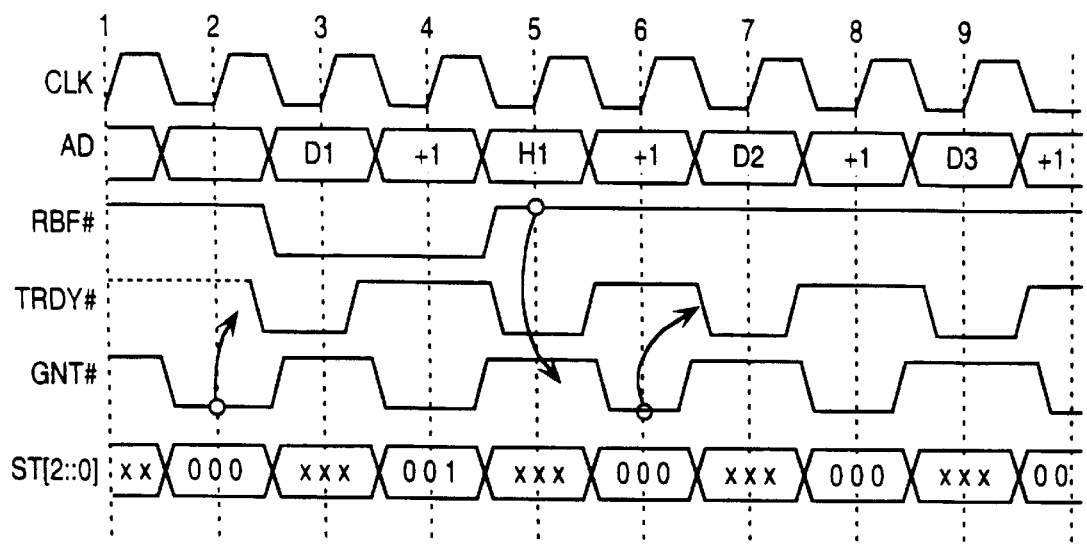
Figures 3, 4, 5, 6, 7, 8, 9, 10, 11, 12, 13, 14, 15, 16, 17, 18, 19, 20, 21:
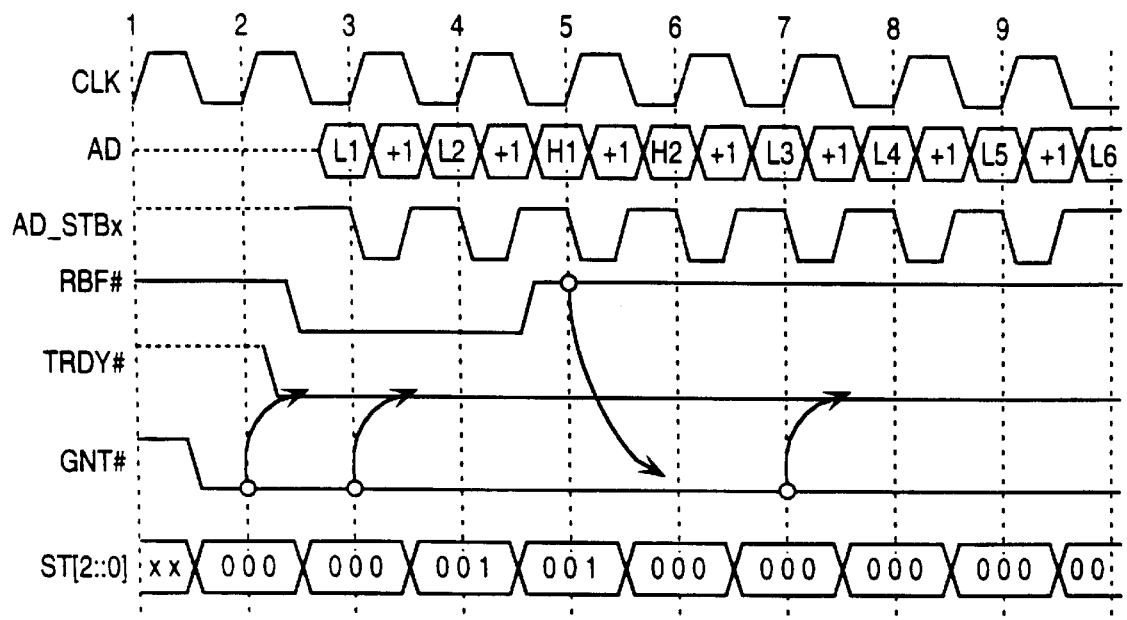
Figures 3, 4, 5, 6, 7, 8, 9, 10, 11, 12, 13, 14, 15, 16, 17, 18, 19, 20, 21, 22:
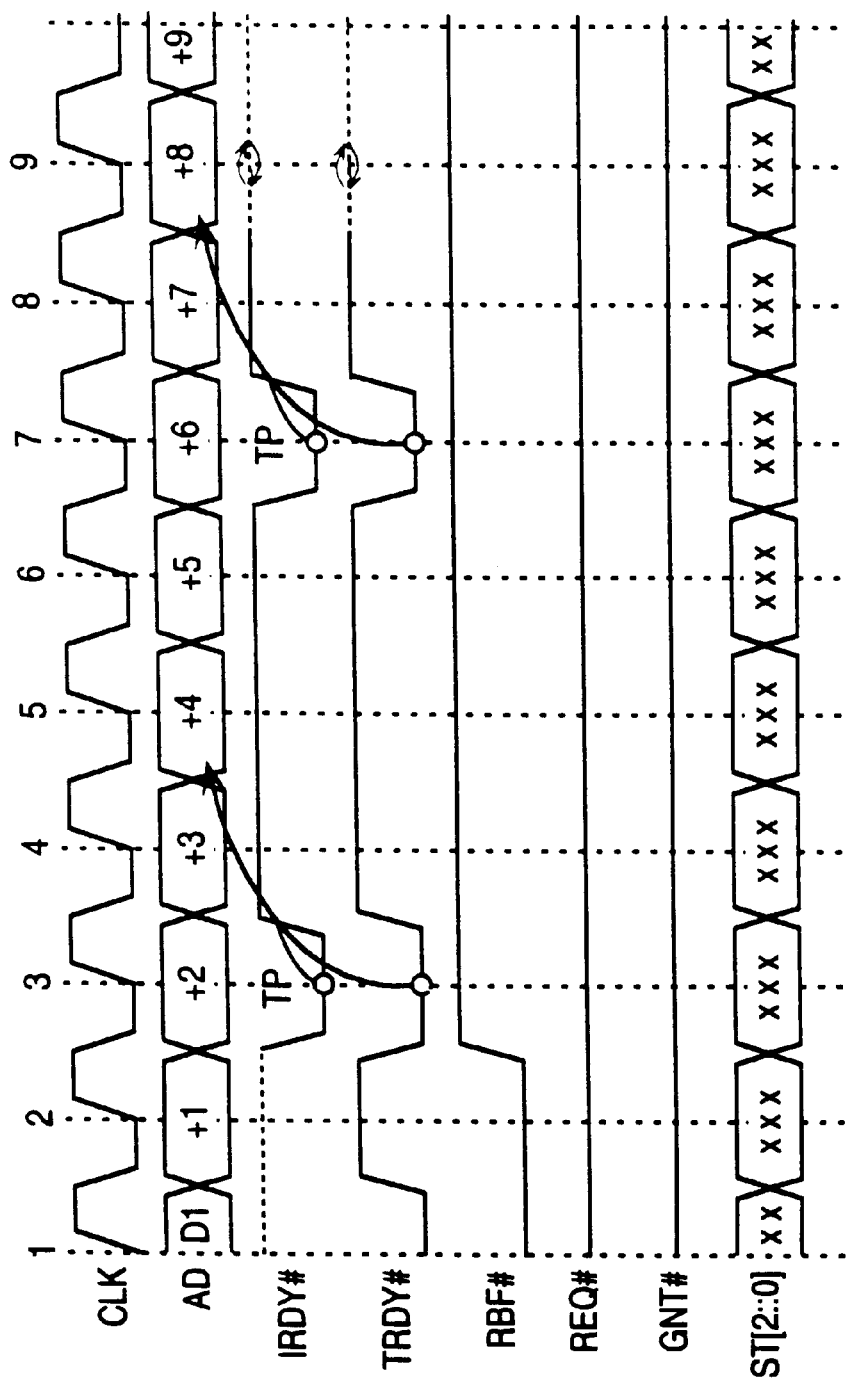
Figures 3, 4, 5, 6, 7, 8, 9, 10, 11, 12, 13, 14, 15, 16, 17, 18, 19, 20, 21, 22, 23:
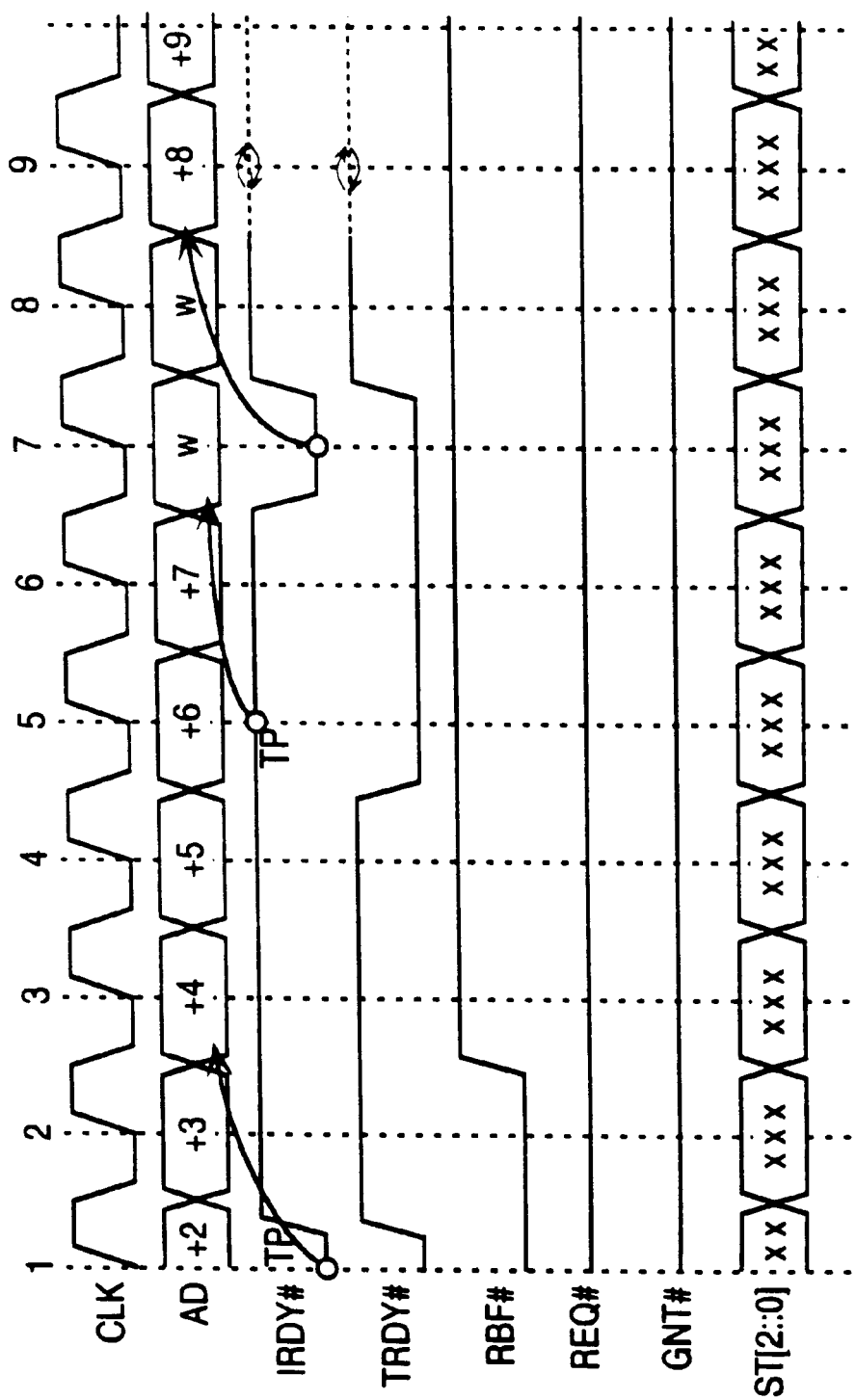
Figures 3, 4, 5, 6, 7, 8, 9, 10, 11, 12, 13, 14, 15, 16, 17, 18, 19, 20, 21, 22, 23, 24:
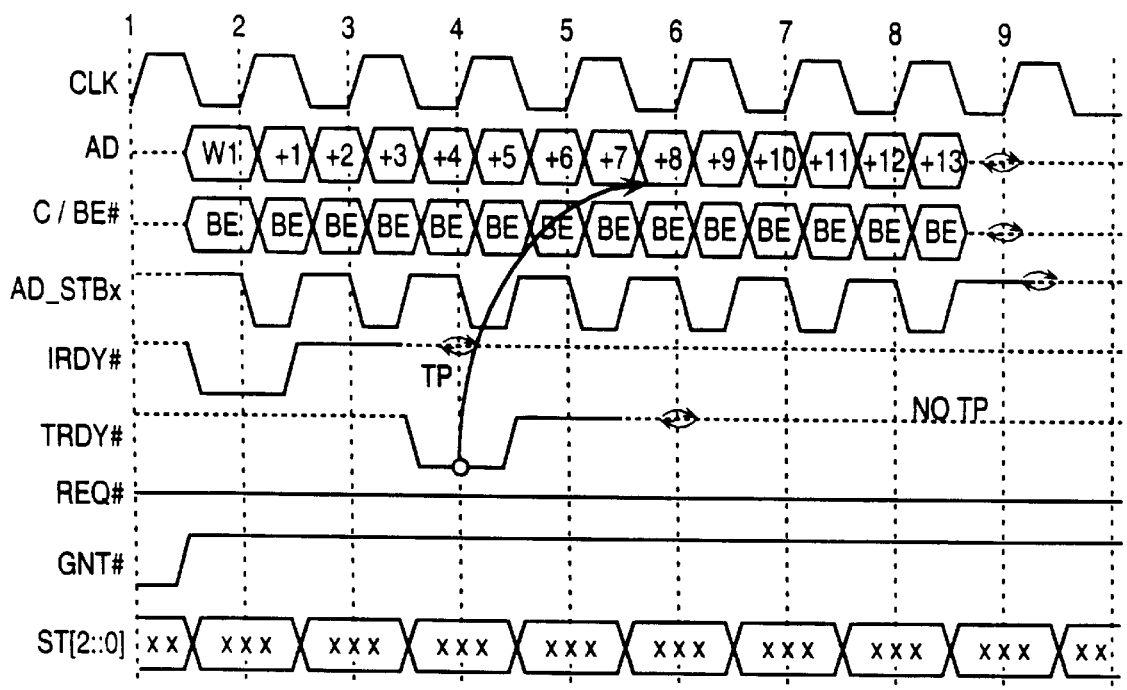
Figures 3, 4, 5, 6, 7, 8, 9, 10, 11, 12, 13, 14, 15, 16, 17, 18, 19, 20, 21, 22, 23, 24, 25:
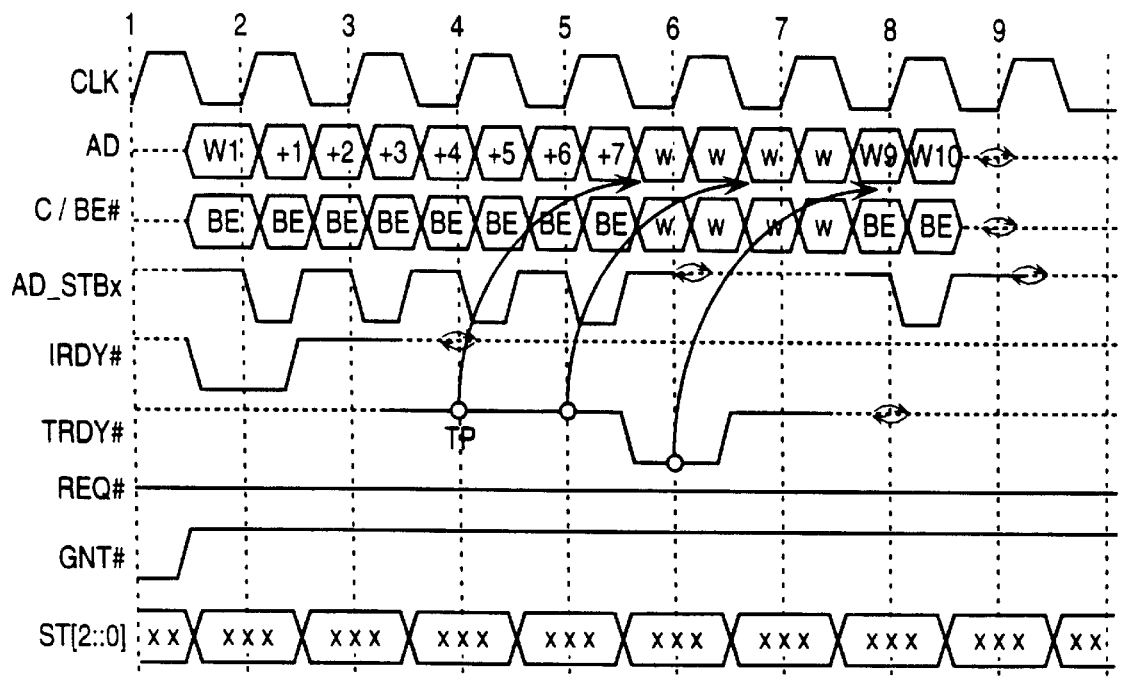
Figures 3, 4, 5, 6, 7, 8, 9, 10, 11, 12, 13, 14, 15, 16, 17, 18, 19, 20, 21, 22, 23, 24, 25, 26:
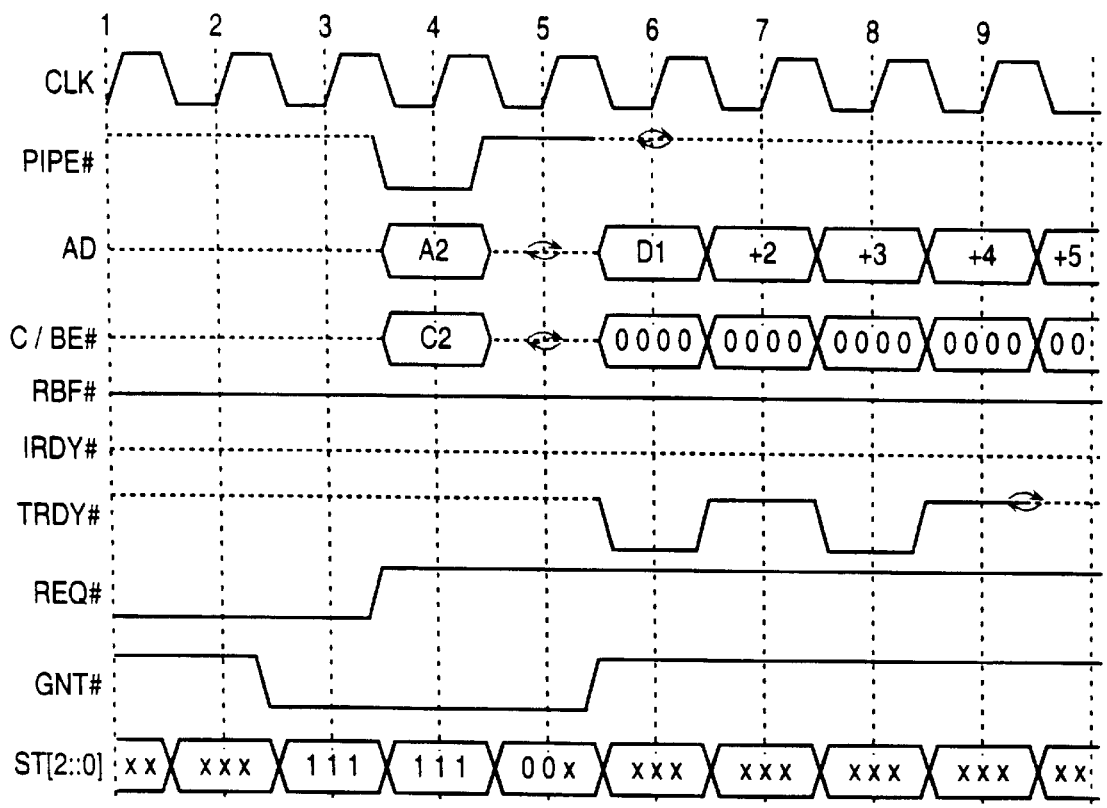
Figures 3, 4, 5, 6, 7, 8, 9, 10, 11, 12, 13, 14, 15, 16, 17, 18, 19, 20, 21, 22, 23, 24, 25, 26, 27:
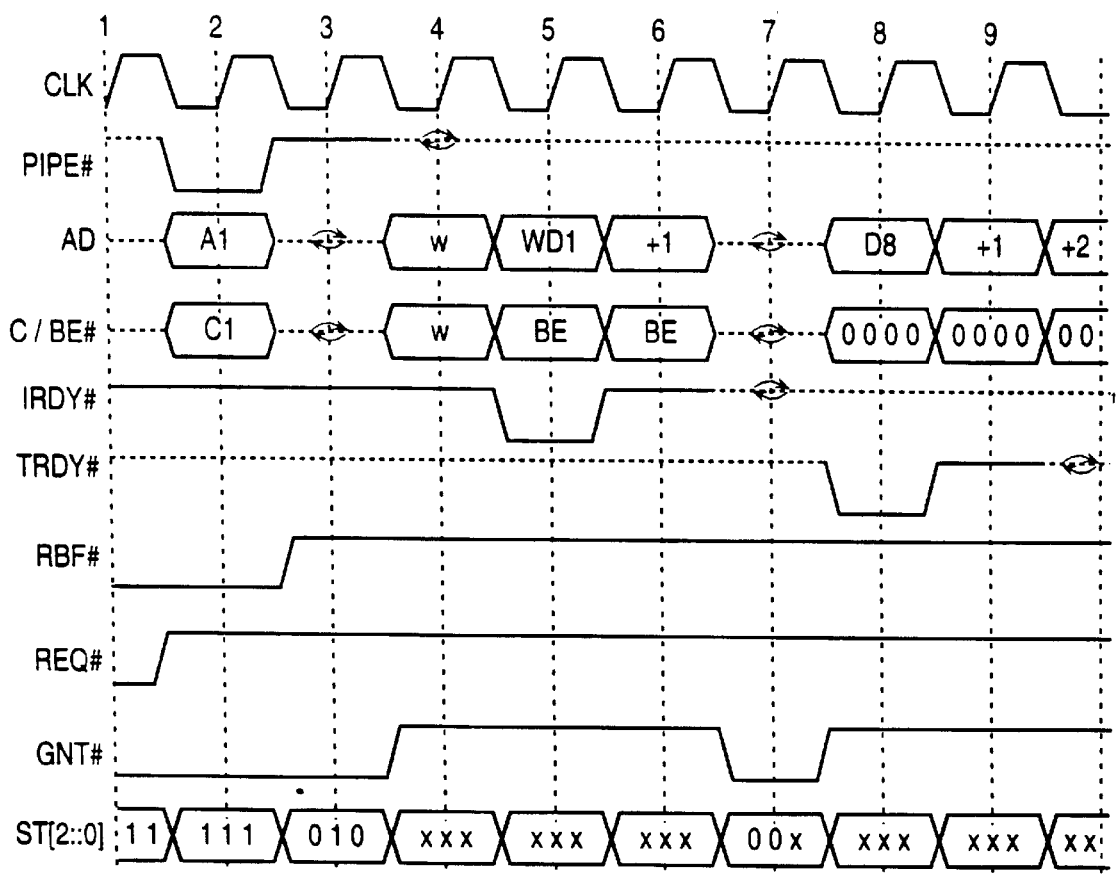
Figures 3, 4, 5, 6, 7, 8, 9, 10, 11, 12, 13, 14, 15, 16, 17, 18, 19, 20, 21, 22, 23, 24, 25, 26, 27, 28:
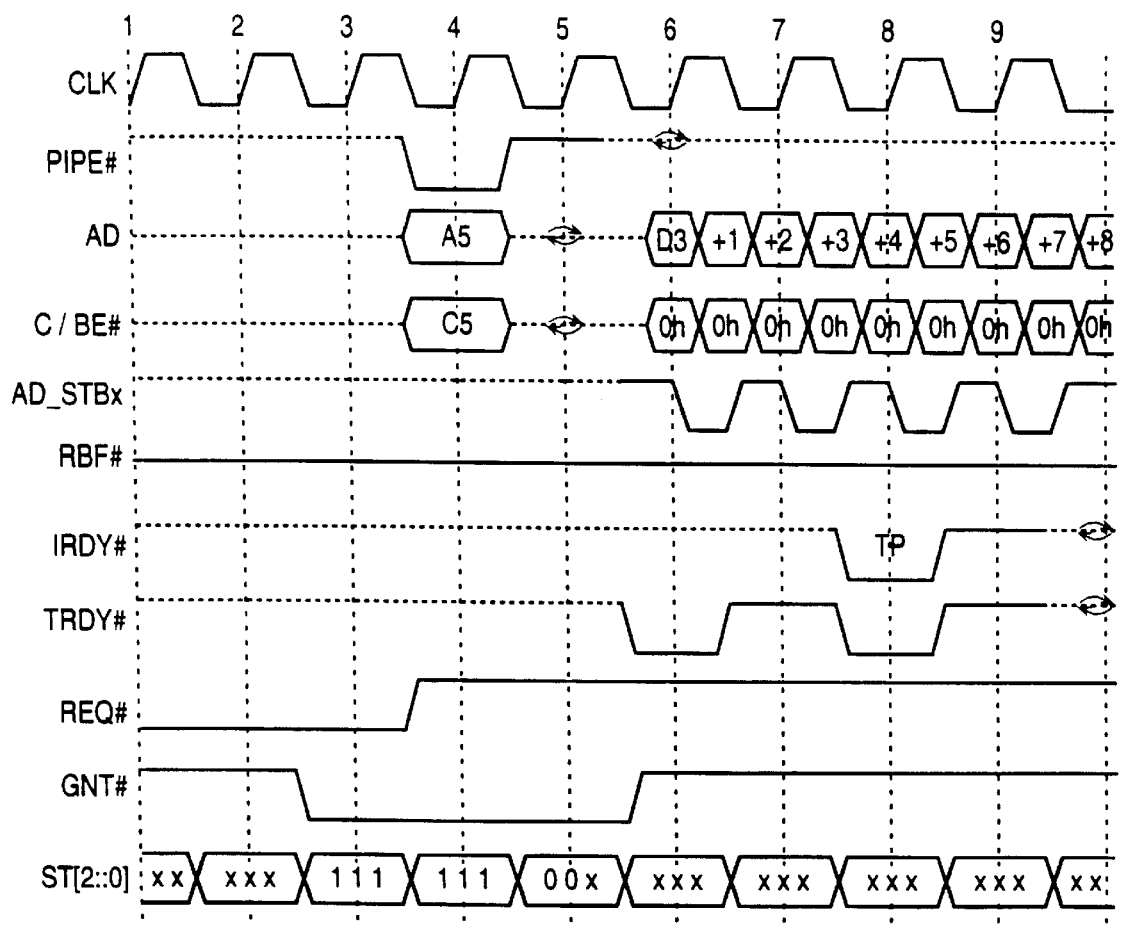
Figures 3, 4, 5, 6, 7, 8, 9, 10, 11, 12, 13, 14, 15, 16, 17, 18, 19, 20, 21, 22, 23, 24, 25, 26, 27, 28, 29:
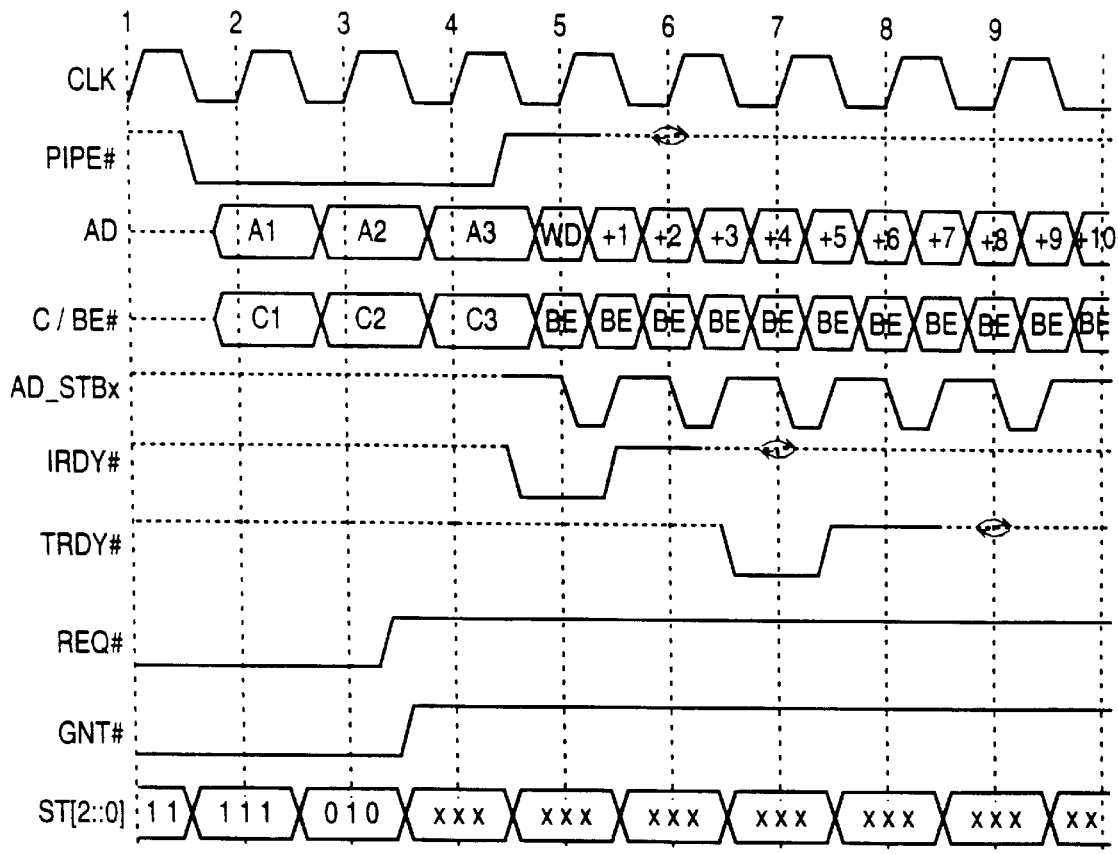
Figures 3, 4, 5, 6, 7, 8, 9, 10, 11, 12, 13, 14, 15, 16, 17, 18, 19, 20, 21, 22, 23, 24, 25, 26, 27, 28, 29, 30:
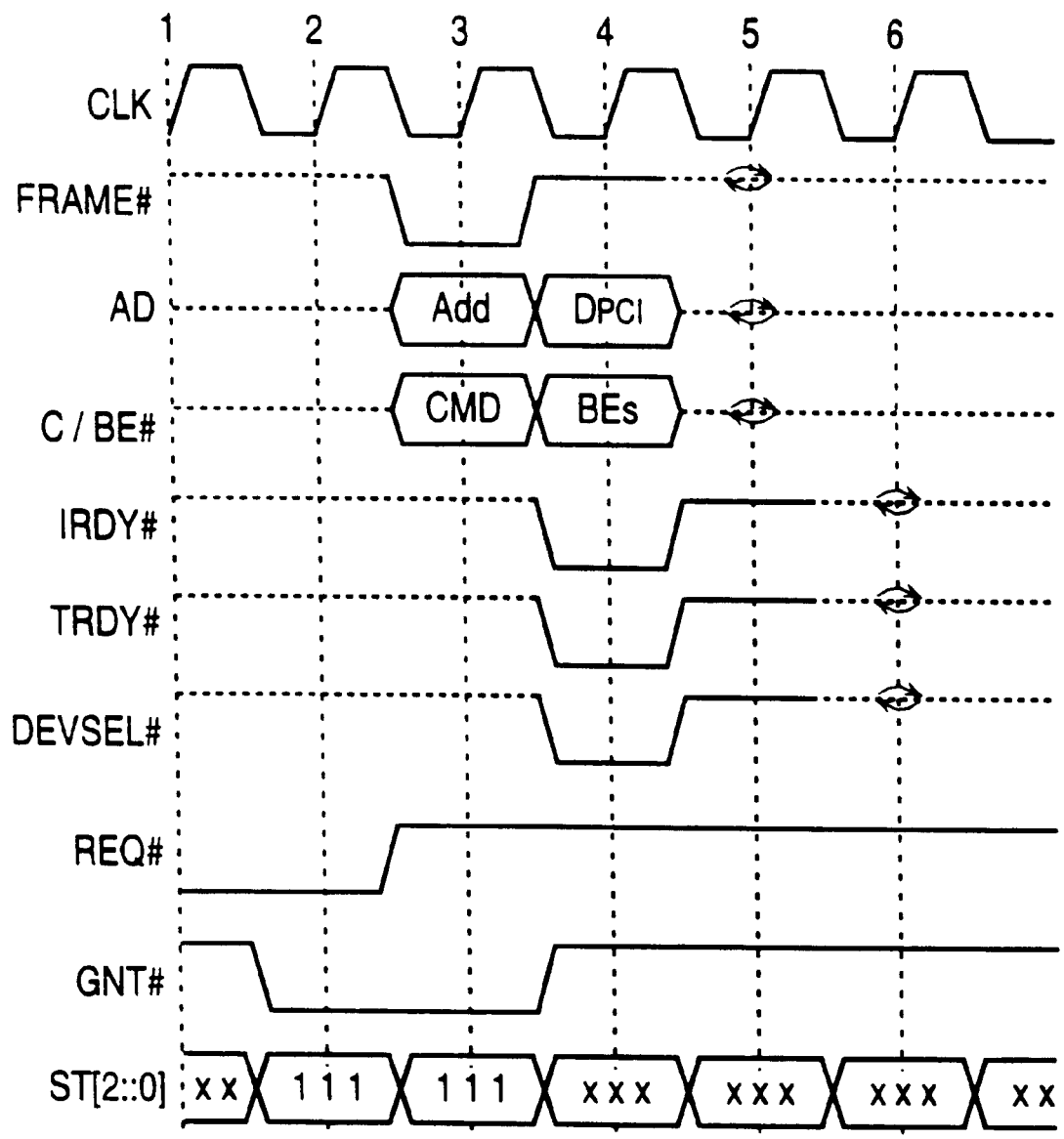
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31:
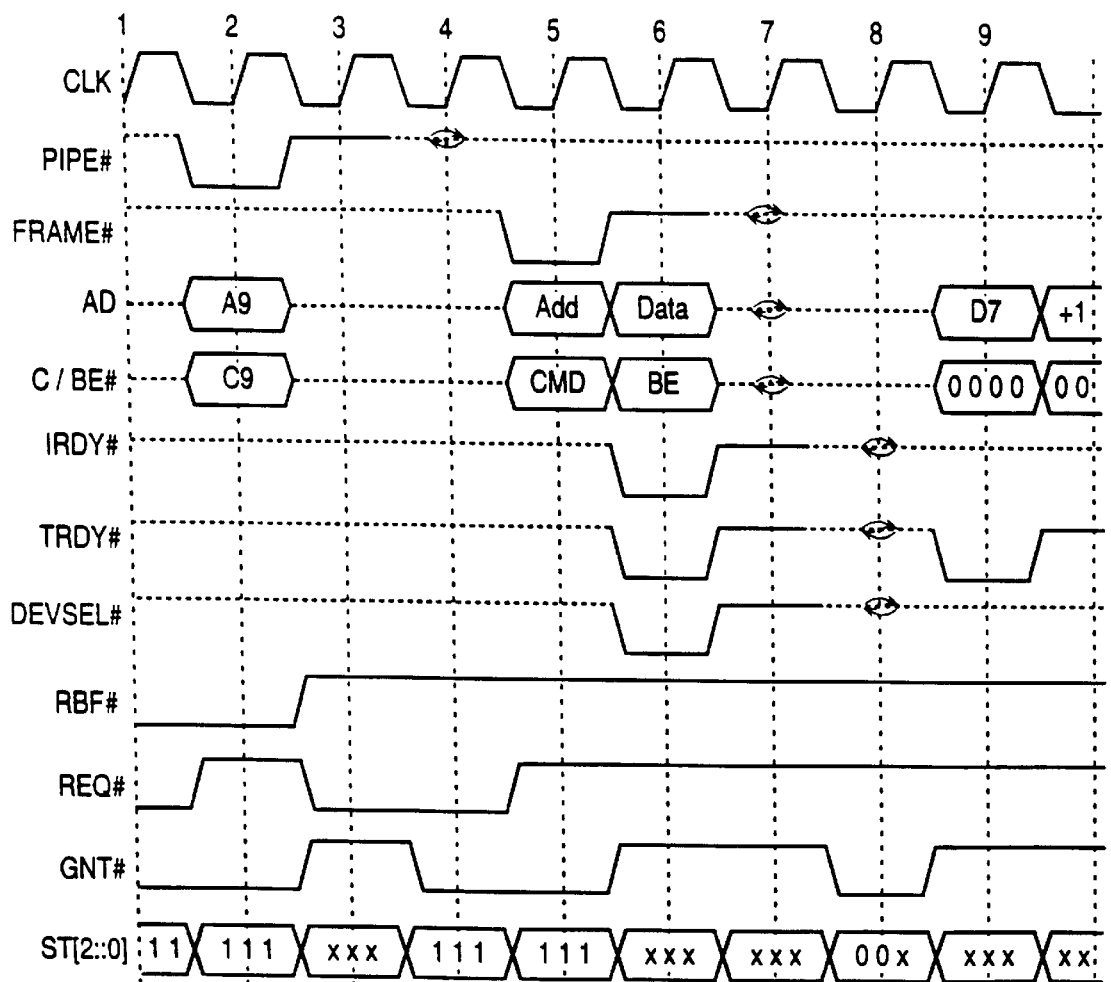

The master samples GNT#/ST[2::0] asserted for write data and asserts IRDY# to begin the write data transfer. The master can delay the beginning of the write data transfer one clock by delaying the assertion of IRDY#. FIG. 3-5 illustrates the maximum delay which a master can take when providing write data. IRDY# must either be asserted on clock 3 (earliest data can be provided) or clock 4 (the latest in which data can be provided). Once the master asserts IRDY# it must transfer all write data associated with the transaction without wait states. Since the master is not allowed to insert wait states on subsequent TP, IRDY# must be de-asserted and tri-stated after it is asserted to start the data transfer. On read transactions, IRDY# is meaningless except during TPs and must be actively driven until the last TP completes, at which time IRDY# must be de-asserted and tri-stated.

Throttling

Since the master is aware of the quantity of data it wants to send and can generate smaller write requests if necessary, the master is not allowed to throttle write data. write data is only allowed to be throttled by the target. The target is only allowed to throttle after each block is transferred. When the target wants to throttle the transfer of a subsequent block of write data, it must have TRDY# de-asserted at the throttle point (TP) which occurs two 1× clocks prior to when the subsequent block would begin to transfer. The transfer of the subsequent block of data will resume two 1× clocks after TRDY# is sampled asserted. If throttling is not required by the target, TRDY# will be asserted at the throttle point. TRDY# is meaningless (it may be asserted, de-asserted or tri-stated) between throttle points but must be actively driven during a TP. (When tri-stated, it must have been driven de-asserted before being tri-stated since this is a sustained tri-state signal.) When the last TP completes TRDY# must be de-asserted and tri-stated. TRDY# also has no meaning on the last throttle point of a transaction that less than or a multiple of a block. For example, if less than 4 clocks are required to complete the transaction, then the next TP does not occur. In FIG. 3-6, the first TP occurs on clock 4 and since the transaction completes before dock 10, the subsequent TP which would otherwise occur on clock 8, is not required and therefore does not exist. In FIG. 3-6, the TP on clock 4 is the last TP, and TRDY# must be de-asserted on clock 5 and tri-stated on clock 6.

3.2.5.4 1 and 2 Clock Rule for IRDY# and TRDY#

For initial write data, IRDY# must be asserted by the master one or two clock edges after GNT# is sampled asserted when the AD bus is free and is one clock in duration. In the case where GNT# is pipelined to the master, IRDY# must be asserted on the first or second clock edge when the AD bus becomes free to complete the data transfer.

For initial read data, TRDY# must be asserted by the target one or two clocks after GNT# is sampled asserted when the AD bus is free and is one clock in duration. The target cannot assert TRDY# on the same clock that it asserts GNT#. In the case where GNT# is pipelined, the one or two clock rule starts from the earliest time that TRDY# could be asserted.

3.2.5.5 Other Flow Control Rules

The agent receiving data should assert its flow control signal independent of the sender's flow control. For example, for low priority read data, the master must assert RBF# for the initial data block transfer and IRDY# for subsequent block data transfers independently of the assertion of TRDY#. On transfers of subsequent blocks of read data (where both IRDY# and TRDY# need to be asserted to continue), once xRDY# is asserted in a TP, it must remain asserted until both IRDY# and TRDY# are asserted on the same clock, which then completes the TP. Outside of the TP, the state of xRDY# is meaningless.

3.2.6 Source Throttling Address Flow Control

Address flow control for AGP request is source controlled. This means that the AGP compliant master is responsible for not enqueuing more requests than the target is capable of handling. System software reads the RQ field in the AGP compliant target status register (see section 4, below) to learn the maximum number of requests that the target is capable of supporting. Software can also learn the maximum number of request slots supported by the master by reading RQ field in the AGP compliant master status register (see section 4). Software then writes the master's RQ_DEPTH register in the command register with the value of the number of requests that the master can have outstanding. When the value is more than the master requested, the master limits the number of outstanding requests by design. When the value is less than the master requested, the master is not allowed to enqueue more requests than the maximum value programmed. This guarantees that the AGP compliant target's request queue will never overflow.

The AGP compliant master must track the number of outstanding requests it has issued. A slot in the master's request queue is considered "used" whenever a read, write, or FLUSH command is issued to the target. The request queue slot becomes available again for another request when data associated with that request starts to transfers across the bus. Since a FLUSH command is treated like a low priority read, it consumes a slot until the dummy read data is returned. When the number of outstanding requests reaches the allocated limit the master is not allowed to generate further read, write, or FLUSH requests until a slot is freed.

3.3 Pin Description

Sixteen new interface signals are defined for the AGP. The AGP compliant target is required to support all 16 signals. The number of AGP signals required by the master determines the performance of the master. There are essentially two independent choices the master makes to determine its performance level: 1) how requests are transferred to the core logic, and 2) at what rate will data transfer.

All AGP compliant devices are required to support four new signals (ST[2::0] and RBF#). The following table lists which other AGP signals are required by the master based on AGP functionality supported. The core logic is required to support all 16 signals.

TABLE 3-5A

AGP Signals

| | Address Queuing on AD Bus | Address Queuing on SBA Port |
|---|---|---|
| 1x Data Transfer Rate | ST[2::0], RBF#, PIPE# | ST[2::0], RBF#, SBA[7::0] |
| 2x Data Transfer Rate | ST[2::0], RBF#, PIPE#, AD_STB0, AD_STB1 | ST[2::0], RBF#, SBA[7::0], AD_STB0, AD_STB1, SB_STB |

In addition to the new AGP signals, all AGP enabled components must have the PCI pin complement on the AGP port as described in Table 3-10. The AGP signals follow the signal type definitions and naming convention used in the PCI Specification.

The signal type definitions in Table 3-5B are from the viewpoint of an AGP compliant target.

TABLE 3-5B

Signal Types

| | |
|---|---|
| in | Input is a input-only signal. |
| out | Totem Pole Output is an active driver. |
| t/s | Tri-State is a bi-directional, tri-state input/output pin. |
| s/t/s | Sustained Tri-State is an active low tri-state signal owned and driven by one and only one agent at a time. The agent that drives a s/t/s pin low must drive it high for at least one clock before letting it float. A new agent cannot start driving a s/t/s signal any sooner than one clock after the previous agent tri-states it. A pull-up is required to sustain the inactive state until another agent drives it, and must be provided by the AGP compliant target. |

Table 3-6 lists the signal names in the first column, signal types in the second column and the signal descriptions in the third column. In the second column, the direction of a t/s or s/t/s signal is from the viewpoint of the core logic and is represented in parentheses "( )". For example, PIPE# is a sustained tri-state signal (s/t/s) that is always an input for the core logic. The tables below describe their operation and use, and are organized in four groups: Addressing, Flow Control, Status and Clocking.

TABLE 3-6

AGP Addressing

| Name | Type | Description |
|---|---|---|
| PIPE# | s/t/s (in) | Pipelined request is asserted by the current master to indicate a full width request is to be enqueued by the target. The master enqueues one request each rising edge of CLK while PIPE# is asserted. When PIPE# is deasserted no new requests are enqueued across the AD bus.<br>PIPE# is a sustained tri-state signal from a master (graphics controller) and is an input to the target (the core logic). |
| SBA[7::0] | in | Sideband Address port provides an additional bus to pass address and command to the target from the master. SBA[7::0] are outputs from a master and an input to the target. This port is ignored by the target until enabled (see section 4.1.9). |

Table 3-6 contains two mechanisms to enqueue requests by the AGP compliant master. The master chooses one mechanism at design time or during the initialization process and is not allowed to change during runtime. When PIPE# is used to enqueue addresses the master is not allowed to enqueue addresses using the SBA port. When the SBA port is used PIPE# can not be used.

TABLE 3-7

AGP Flow Control

| Name | Type | Description |
|---|---|---|
| RBF# | in | Read Buffer Full indicates if the master is ready to accept previously requested low priority read data or not. When RBF# is asserted the arbiter is not allowed to initiate the return of low priority read data to the master. |

Table 3-7 contains the additional Flow Control required beyond the required PCI flow control. If the master is always ready to accept return data, the AGP compliant master is not required to implement this signal, and the corresponding pin on the target is tied (internally pulled up) in the de-asserted state.

TABLE 3-8

AGP Status Signals

| Name | Type | Position |
|---|---|---|
| ST[2::0] | out | Status bus provides information from the arbiter to a Master on what it may do. ST[2::0] only have meaning to the master when its GNT# is asserted. When GNT# is de-asserted these signals have no meaning and must be ignored.<br>000 Indicates that previously requested low priority read or flush data is being returned to the master.<br>001 Indicates that previously requested high priority read data is being returned to the master.<br>010 Indicates that the master is to provide low priority write data for a previous enqueued write command.<br>011 Indicates that the master is to provide high priority write data for a previous enqueued write command.<br>100 Reserved (Arbiter must not issue. May be defined in the future.)<br>101 Reserved (Arbiter must not issue. May be defined in the future.)<br>110 Reserved (Arbiter must not issue. May be defined in the future.)<br>111 Indicates that the master has been given permission to start a bus transaction. The master may enqueue AGP requests by asserting PIPE# or start a PCI transaction by asserting FRAME#.<br>ST[2::0] are always an output from the Core logic and an input to the master. |

Table 3-8 describes the status signals, their meaning and indicate how the AD bus will be used for subsequent transactions. The AD bus can be used to enqueue new requests, return previously requested read data, or request the master to provide previously enqueued write data. The ST[2::0] are qualified by the assertion of GNT#.

TABLE 3-9

AGP Clock list

| Name | Type | Description |
|---|---|---|
| AD_STB0 | s/t/s (in/out) | AD Bus Strobe 0 provides timing for 2x data transfer mode on the AD[15::00]. The agent that is providing data drives the signal. |
| AD_STB1 | s/t/s (in/out) | AD Bus Strobe 1 provides timing for 2x data transfer mode on the AD[31::16]. The agent that is providing data drives this signal. |

TABLE 3-9-continued

AGP Clock list

| Name | Type | Description |
|---|---|---|
| SB_STB | s/t/s (in) | SideBand Strobe provides timing for SBA[7::0] and is always driven by the AGP compliant master (when supported). |
| CLK | t/s (in) | Clock provides timing for AGP and PCI control signals. |

3.4 AGP Semantics of PCI signals

PCI signals, for the most part, are redefined when used in AGP transactions. Some signals have slightly different semantics. FRAME#, IDSEL, STOP#, and DEVSEL# are not used by the AGP protocol. The exact role of all PCI signals during AGP transactions are described in Table 3-10.

TABLE 3-10

PCI signals in relation to AGP

| | |
|---|---|
| FRAME# | Not used. FRAME# remains de-asserted by its own pull up resistor. |
| IRDY# | New meaning. IRDY# indicates the AGP compliant master is ready to provide all write data for the current transaction. Once IRDY# is asserted for a write operation, the master is not allowed to insert wait states. The assertion of IRDY# for reads, indicates that the master is ready to transfer a subsequent block of read data. The master is never allowed to insert a wait state during the initial block of a read transaction. However, it may insert wait states after each block transfers. (There is no FRAME# -- IRDY# relationship for AGP transactions.) |
| TRDY# | New meaning. TRDY# indicates the AGP compliant target is ready to provide read data for the entire transaction (when transaction can complete within four clocks)a block) or is ready to transfer a (initial or subsequent) block of data, when the transfer requires more than four clocks to complete. The target is allowed to insert wait states after each block transfers on both read and write transactions. |
| STOP# | Not used by AGP. |
| DEVSEL# | Not used by AGP. |
| IDSEL | Not used by AGP. |
| PERR# | Not used by AGP (Optional for PCI operation per exceptions granted by PCI 2.1 specification.) |
| SERR# | Same meaning as on PCI. (May be used by an AGP compliant master to report a catastrophic error when the core logic supports a SERR# pin for the AGP port. These can be tied to the PCI INTx# signals since these are o/d signals and are level sensitive.) |
| REQ# | Same meaning as in PCI. (Used to request access to the bus to initiate a PCI or an AGP request.) |
| GNT# | Same meaning as in PCI but additional information is provided on ST[2::0]. The additional information indicates that the master is the recipient of previously requested read data (high or low priority), it is to provide write data (high or low priority), for a previously enqueued write command or has been given permission to start a bus transaction (AGP or PCI). |
| RST# | Same meaning as on PCI. |
| AD[31::00] | Same meaning as on PCI. |
| C/BE[3::0]# | Slightly different meaning than on PCI. Provides command information (different commands than PCI) by the master when requests are being enqueued using PIPE#. Provides valid byte information during AGP write transactions and is driven by the master. The target drives to "0000" during the return of AGP read data and is ignored by the AGP compliant master. |
| PAR | Not used by AGP. |
| LOCK# | Not supported on the AGP interface for either AGP or PCI transactions. |
| INTA#, INTB# | Interrupt request signals are the same as on PCI and follow the same usage. (They must be level sensitive |

TABLE 3-10-continued

PCI signals in relation to AGP and shareable.) INTA# for a single function device, INTB# for a two function device. INTC# and INTD# are not supported on the AGP connector.

3.5 Bus Transactions 3.5.1 Address Transactions

As described above, there are two ways to enqueue requests: using the AD bus or the SBA port. If the master chooses the SBA port, it is not allowed to asserted PIPE# for any transactions. If the master uses PIPE# to enqueue requests, it is not allowed to use the SBA port. The following description will first focus on the enqueuing of addresses on the AD bus and then on the SBA port.

3.5.1.1 AD Bus

The master requests the permission from the core logic to use the AD bus to initiate an AGP request or a PCI transaction by asserting REQ#. The arbiter grants permission by asserting GNT# with ST[2::0] equal to "111" hereafter referred to as "START". When the master receives START it is required to start the bus operation within two clocks of when the bus becomes available. For example, when the bus is in an idle condition when START is received, the master is required to initiate the bus transaction on the next clock and the one following. When a transaction is currently active on the bus when START is received, the master is required to start the bus operation within 2 clocks of when the bus becomes available. For example, when the current transaction is an AGP read (from target to master), a turnaround cycle is required between the last data phase of the read and the start of the request or assertion of PIPE# or FRAME#. In this example, the master is required to start the request either two or three clocks from the completion of the last data. The next clock after is not allowed since a turnaround cycle is required when ownership of the AD bus changes. Once this has occurred the master is required to start the transaction either on the next clock or the one thereafter. For a write transaction, the turnaround cycle is not required and therefore the master must initiate the transaction the clock following the completion of the last data phase or the clock after. Each of these relationships is described in section 3.6.

FIG. 3-7 illustrates a single address being enqueued by the master. Sometime before clock 1, the master asserted REQ# to gain permission to use the AD bus. The arbiter grants permission by indicating START on clock 2. A PCI only master is not required to start the transaction within 2 clocks. It is a violation of the AGP protocol if an AGP compliant master delays starting a request (assertion of PIPE# or FRAME#) by more than 2 clocks. A new request (address, command and length) are enqueued on each clock in which PIPE# is asserted. The address of the request to be enqueued is presented on AD[31::03], the length on AD[2::0] and the command on C/BE[3::0]#. In this figure, only a single address is enqueued since PIPE# is asserted for only a single clock. The master indicates that the current address is the last it intends to enqueue when PIPE# is asserted and REQ# is de-asserted which occurs in the figure on clock 3. Once the arbiter detects the assertion of PIPE# or FRAME# (which occurs on clock 3), it de-asserts GNT# (on clock 4).

FIG. 3-8 illustrates the enqueuing of five requests by a master, where the first request is delayed by the maximum allowed delay, which is two clocks from the indication of START. In this case, START is indicated on clock 2, but the master does not assert PIPE# until clock 4. FIG. 3-7 illustrates the earliest the master could start its request and FIG. 3-8 illustrates the latest in which the master is allowed to start the request when the bus is idle. Note that REQ# remains asserted on clock 7 to indicate that the current request is not the last one. The fact that REQ# is de-asserted on clock 8 with PIPE# still asserted indicates that the current address is the last one to be enqueued during this transaction. PIPE# must be de-asserted on the next clock when REQ# is sampled de-asserted. If the master desired to enqueue more requests during this bus operation, it would simply continue asserting PIPE# until all of its requests are enqueued or until the master has filled all the available request slots provided by the core logic.

The master is not allowed to insert any wait states while enqueuing requests and the target has no mechanism to stop an address from being enqueued. Once PIPE# is asserted, every rising edge of CLK enqueues a new request. The target has no mechanism to stop or delay the master from enqueuing more requests once the arbiter has indicated START. The clock following the last address, the master is required to tri-state the AD and C/BE# buses, unless the master is to provide write data (as indicated by GNT# and ST[2::0]) associated with a previously enqueued write request.

3.5.1.2 SBA Port

An AGP compliant master may choose to use SBA port to enqueue requests instead of using PIPE# and the AD bus. The SBA port is always driven by the master, and if not enqueuing new requests, the master must drive the NOP command on the port which is signaled by driving SBA [7::0] to "1111 1111" (or FFh) for 1× data transfers and "1111 1111 1111 1111" (or FFFFh) for 2× data transfers. The target ignores the SBA port until enabled to decode it. All commands on the SBA port always come in pairs except for the NOP case when 1× data transfer is done. In this case, a NOP is a single clock in duration. Unlike the enqueuing requests on the AD bus, the master does not request use of the port, but simply sends the request at anytime (when a request slot is available). If a subsequent command is near a previous command then only the lower address bits and length need to be transferred. The target will use previous upper address bits and command to initiate a new memory access. With this abbreviated addressing, the AD bus can be completely utilized transferring small pieces of data that are in close to each other. In the diagrams, the notion of "R1H and R1L" indicate that this is request 1 high and request 1 low. High refers to the upper 8 bits (where the OP code resides) and Low refers to the lower 8 bits. A request can be a Type 1, Type 2 or a type 3 command as described in section 3.1.3.

FIG. 3-9 illustrates sideband addressing in the 1× transfer mode. In FIG. 3-9, the master sends the NOP encoding on clock 1 and sends the high bits of the of a Type 1, 2 or 3 on clocks 2, 4 and 9 and the low order bits on clocks 3 5, and 10. The master send NOPs on clocks 6, 7 and 8 to indicated that the SBA port does not contain a new request. There is no specific sequence in which Type 1, 2 or 3 encodings are required to transfer the SBA port. In FIG. 3-9, every non-NOP time could be a Type 1 or only Type 3 commands. Recall that memory accesses are only initiated when a Type 1 encoding is decoded by the target. A Type 2 simply stores updated middle addresses and command in the Type 2 register of the target. A Type 3 encoding updates the upper address bit in the Type 3 register. Only when a Type 1 command is received does the target reconstruct an address by using the Type 3 and Type 2 registers with the Type 1 value and enqueues it to the memory controller.

FIG. 3-10 illustrates the SBA port operating in 2× transfer mode. In this mode, a new address is transferred across the SBA port each CLK. This figure is the same as FIG. 3-9, except that both pieces of the encoding (the high and low portions) transfer across the port during a single CLK period.

3.5.2 Basic Data Transactions

As described earlier, data transfers across the AGP as independent transactions from the request that initiated the data movement. The following description will discuss data movement of 1× and 2× transfer modes, as applied to both basic read and write data transfers.

3.5.2.1 1× Data Transfers

Read Data

FIG. 3-11 illustrates the returning of read data that was previously requested by the AGP master. The bus is in an idle condition and the arbiter indicates to the master that the next transaction to appear on the AD bus is read data for the master. This is indicated by the assertion of GNT# with the ST[2::0] being 00x. To signal Low Priority read data returning, the ST encoding would be "000", and High Priority read data being indicated by "001". In the diagrams where the ST encoding is 00x, the data being moved could be low or high priority data. In those cases, that it makes a difference to the type of read data being returned the ST encodings will be either "000" or "001>"

The master is informed that the read data is coming when GNT# is asserted and ST[2::1] equals "00," which occurs on clock 2. The master knows that the next time TRDY# is asserted, that the AD bus contains valid data. Once GNT# has been asserted for read data, the master starts latching the AD bus on each rising clock edge and qualifies the data with TRDY#. When TRDY# is de-asserted, the data is not valid. The entire transaction will complete without wait states, once TRDY# is sampled as asserted and the transaction completes within four clocks. In FIG. 3-11, only 16 bytes of data are being transferred to the master. Notice that TRDY# is a single pulse and that there is no IRDY# handshake as is done on PCI. When the transfer size of the read data can complete within four clocks, neither the master nor the target are allowed to do flow control (wait states) on the transaction. The C/BE# bus does not contain valid byte enables since the smallest addressable size of memory is eight bytes and all eight bytes are always returned. The C/BE# bus is driven by the AGP compliant target to "0000", and the byte enables are ignored by the master. Once TRDY# has been asserted, it must be de-asserted by the following clock (unless it will be asserted again) and tri-stated. This is shown in this FIG. 3-11 by a solid line 50 being driven high, then on the next clock the signal is tri-stated. The signal is held in this state by a pull-up. This signal is referred to as a sustained tri-state signal and is the same as TRDY# as defined by PCI.

FIG. 3-11 illustrates the earliest the target can return data to the master once GNT# has been asserted indicating a read data transfer. Note that there is no PIPE# or SBA port in FIG. 3-11—the transaction in which data is returned to the master is the same no matter how the request was transferred to the target.

FIG. 3-12 illustrates a stream of 8-byte read operations being returned to the master. FIG. 3-12 shows that the arbiter is indicating to the master that read data is being returned on every clock. Recall that the minimum transfer size is 8 bytes, and in 1× transfer mode, two clocks are required to return the data. Therefore enqueuing GNT#'s earlier accomplishes nothing. The arbiter will not assert GNT# for a new transaction until the last clock of the current read transaction.

FIG. 3-13 shows a basic write data transfer. The arbiter indicates to the master that write data should be provided to the core logic, which is indicated by the assertion of GNT# and ST[2::0] being "010" or "011" ("010" indicating a low priority write data and "011" indicating a high priority write data). In this example, the signaling is the same; therefore the "01x" value is used. The master is required to provide the write data within 2 clocks of the indication from the arbiter. In this example, the master provides the data immediately because the bus was idle. The assertion of IRDY# is for a single pulse and goes with the first piece of data to indicate to the target that data is valid. Once IRDY# has been asserted, data transfers four bytes per CLK until the transaction has completed (for transactions that complete within four clocks). In this example the transaction is 16 bytes and completes in 4 clocks. The master is required to de-assert and then tri-state IRDY# after it was asserted. The data is transferred on the AD bus while the C/BE[3::0]# provide the byte enables. The byte enables indicate which byte lanes carry meaningful data. The target is not allowed to delay the movement of write data (initial data block) after GNT# and ST bus indicate a write data transfer.

FIG. 3-14 illustrates an example of back-to-back write data transfers. Each of these transactions is eight bytes and could be either high priority or low priority write data transfer. On clock 2, the arbiter indicates to the master to provide previously requested write data to the core logic. Since these are small transfers, the arbiter provides a GNT# on every other clock. Since a new transaction begins on clock 3, 5, 7 and 9, the master asserts IRDY# on these clocks to indicate that the first piece of data of each transaction is valid on the AD bus.

3.5.2.2 2× Data Transfers

This section discusses 2× data transfers. 2× data transfers are essentially the same as 1× clocking, except that an entire eight bytes are transferred during a single CLK period. This requires that two 4-byte pieces of data are transferred across the AD bus per CLK period. First read data transfers will be discussed and then write transfers.

Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32:
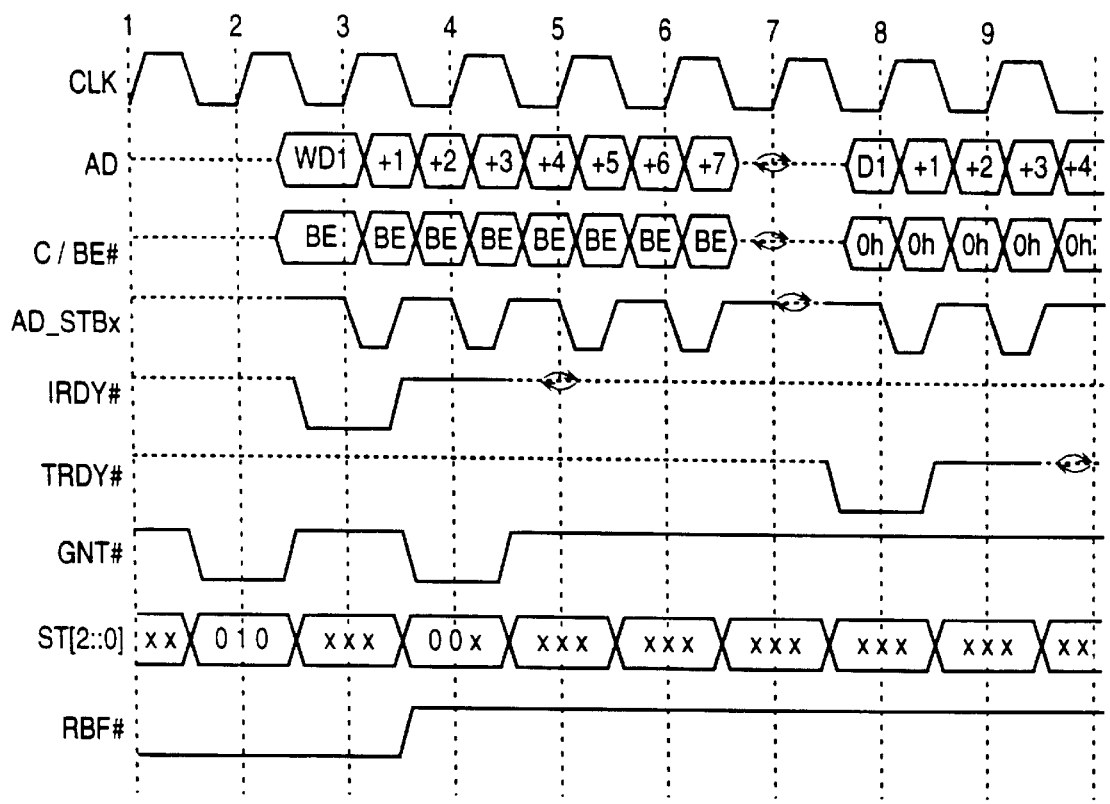
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33:
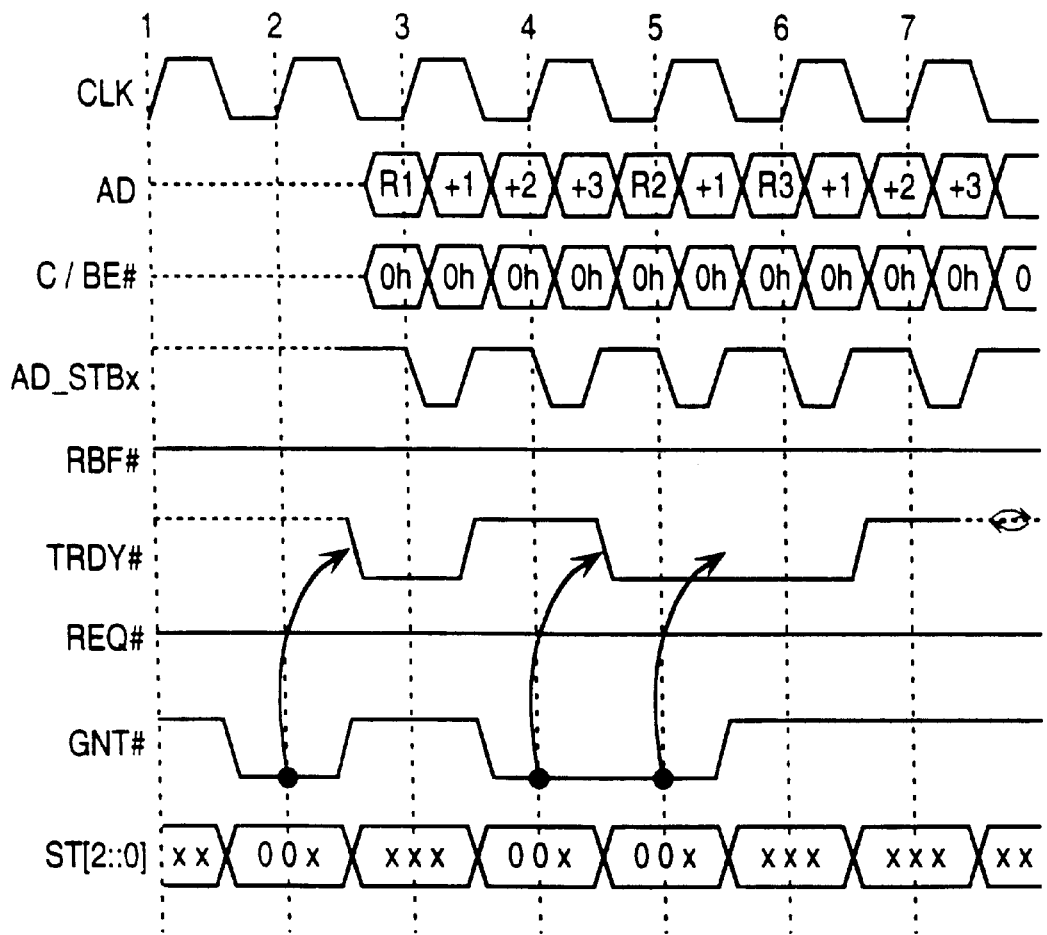
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34:
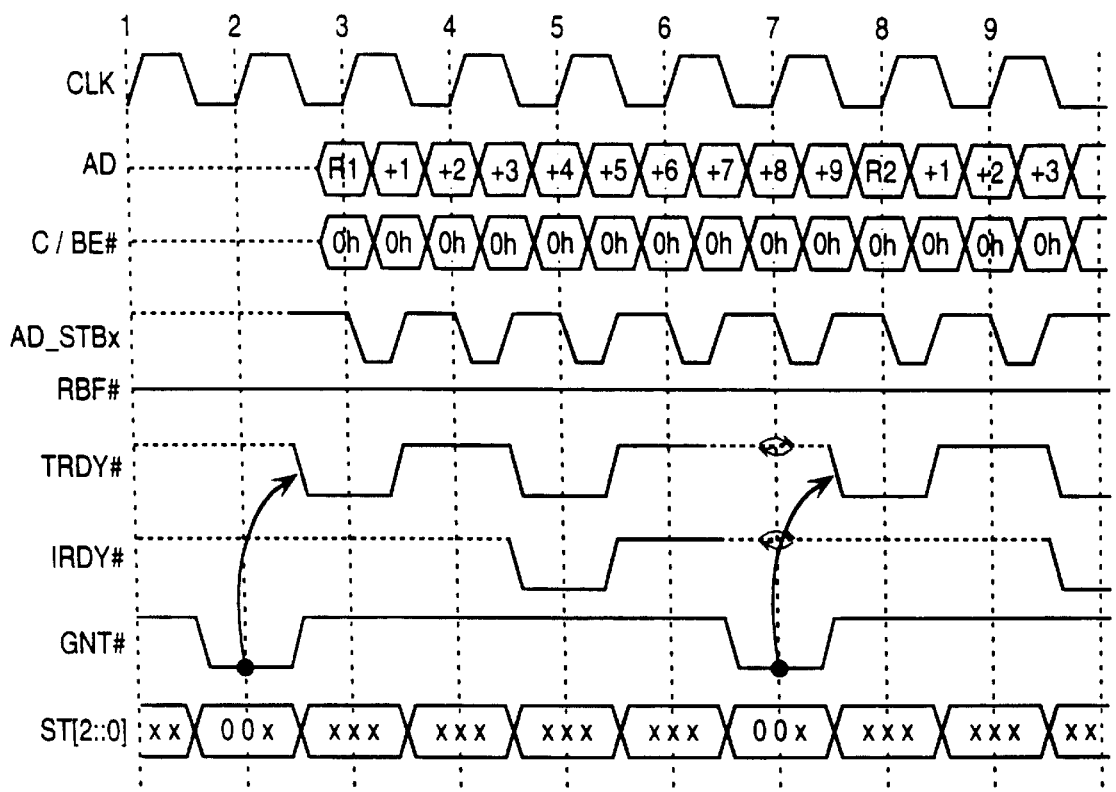
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35:
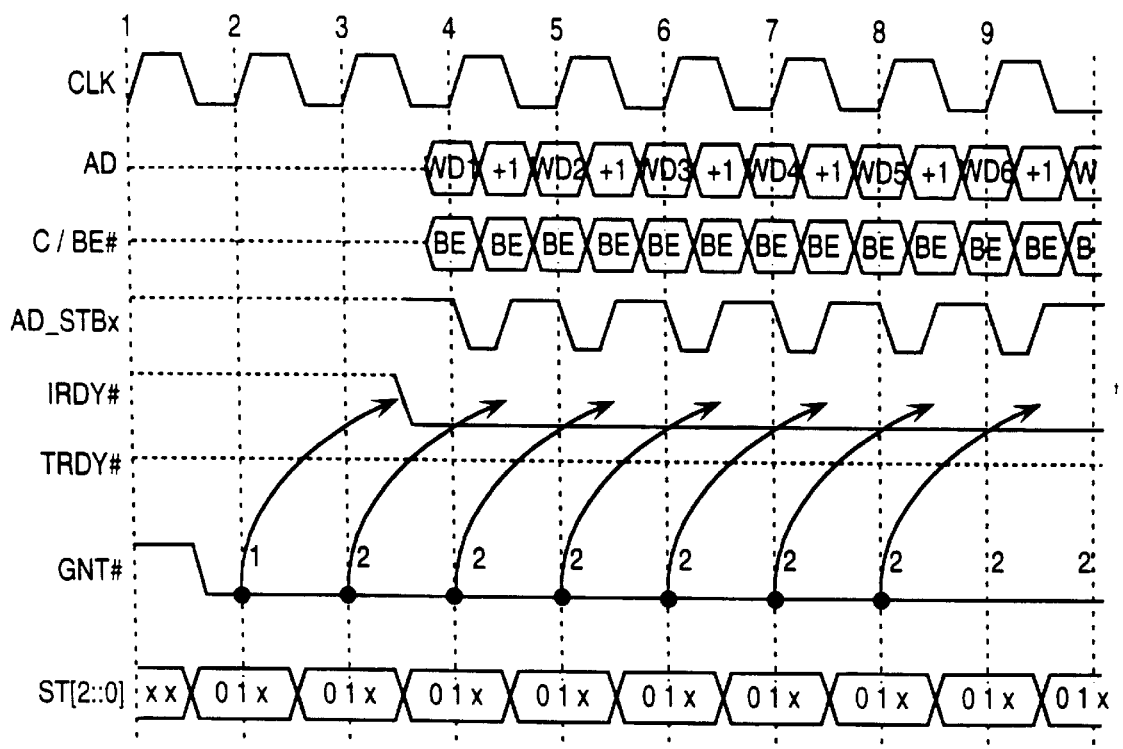
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36:
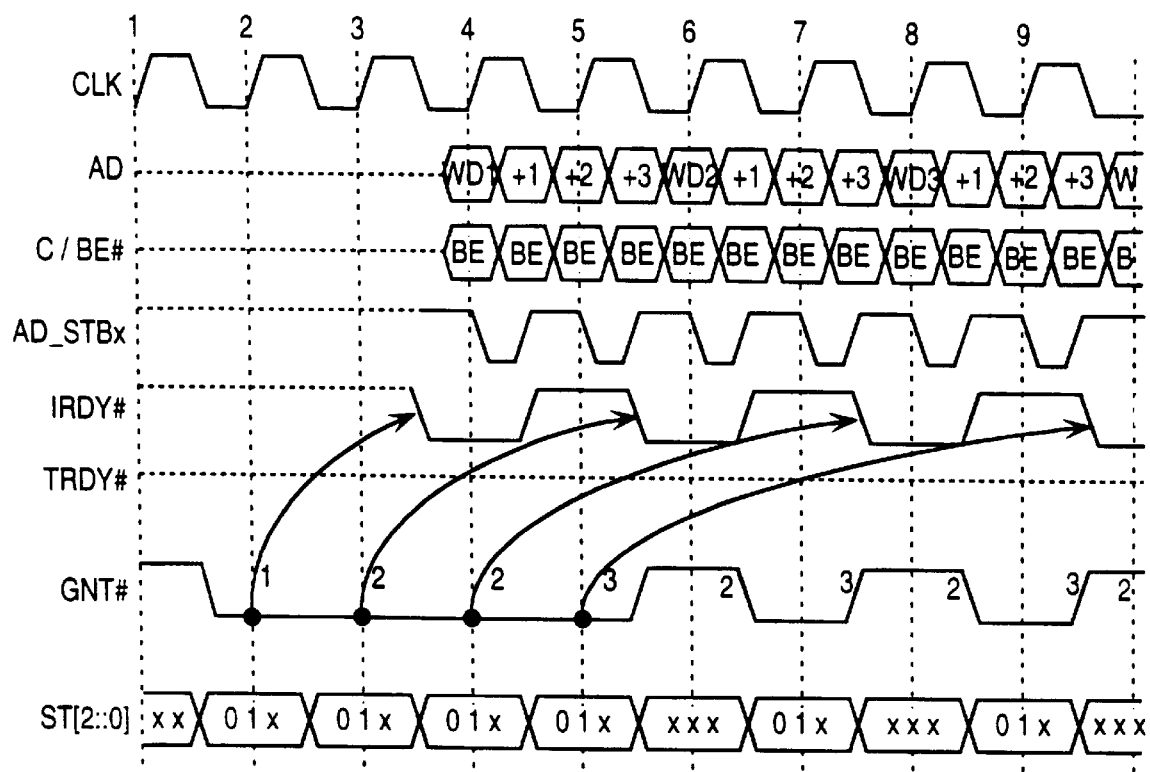
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37:
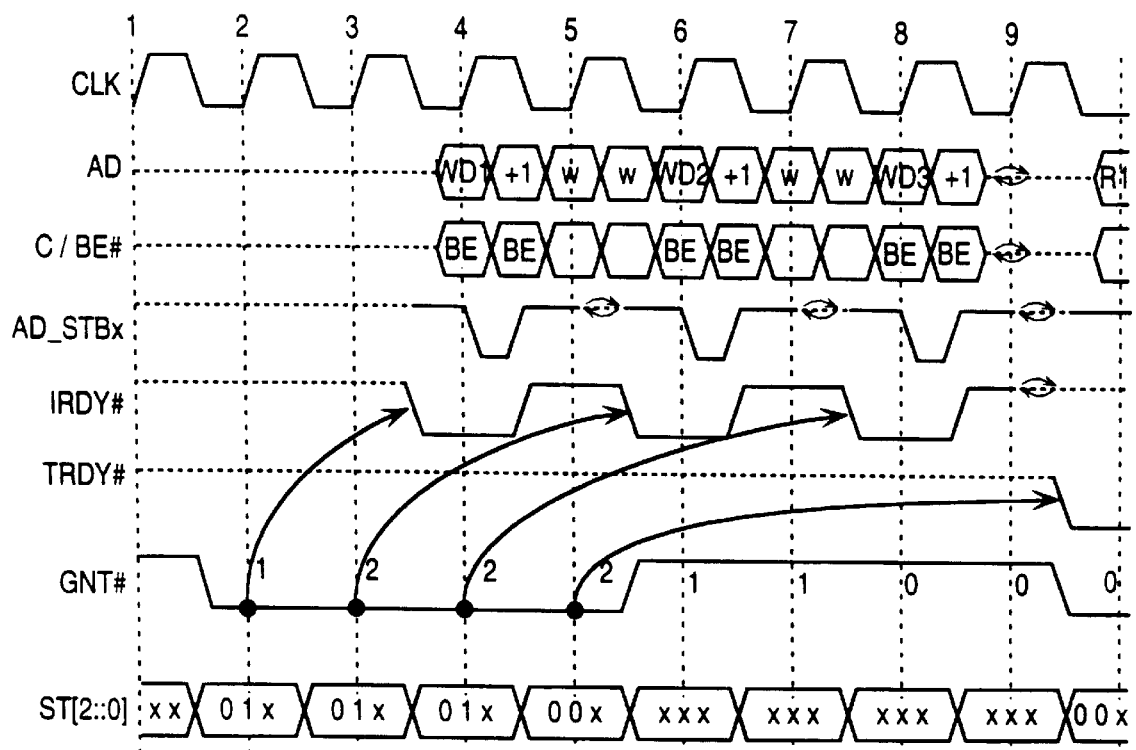
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38:
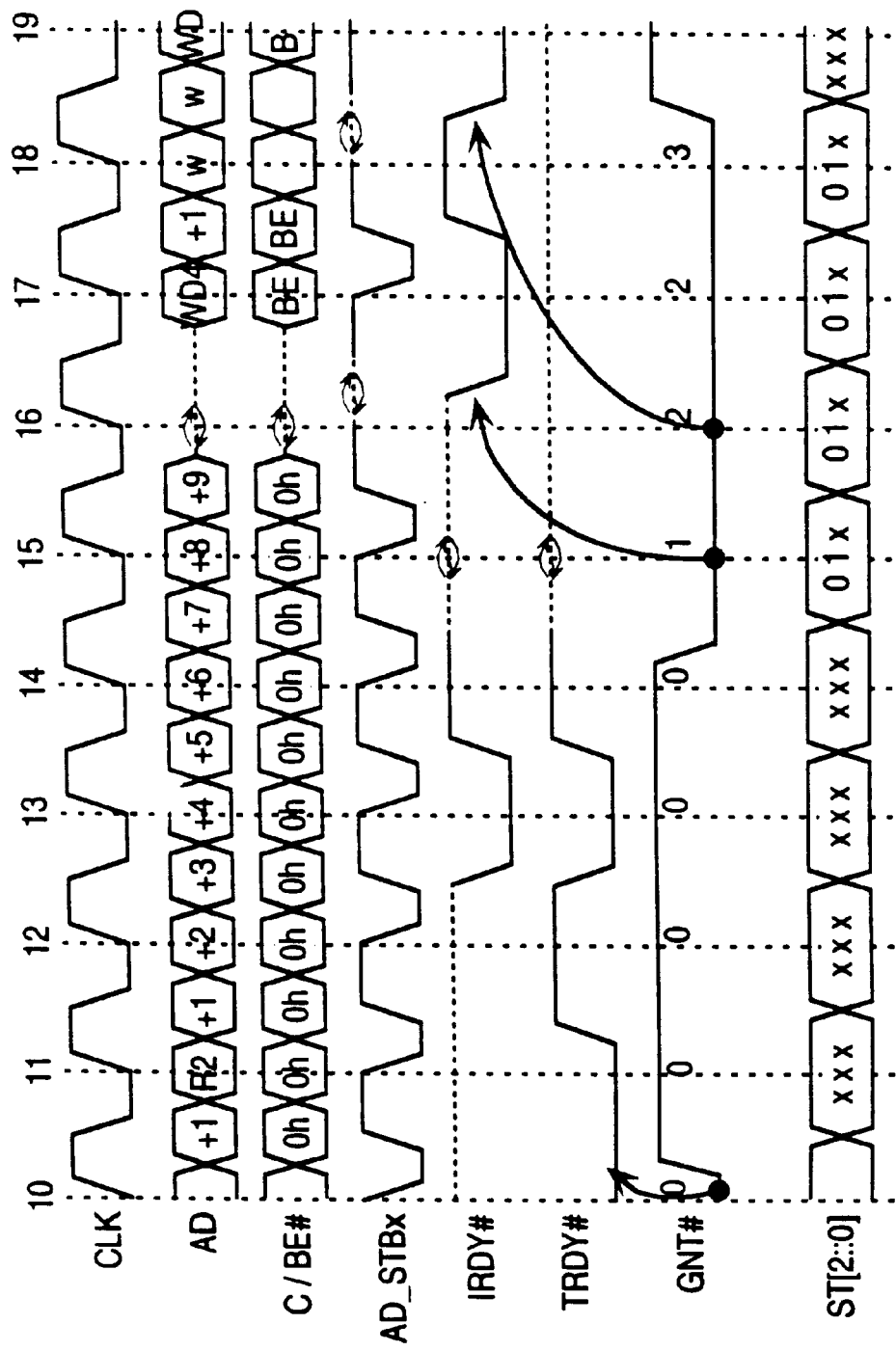
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39:
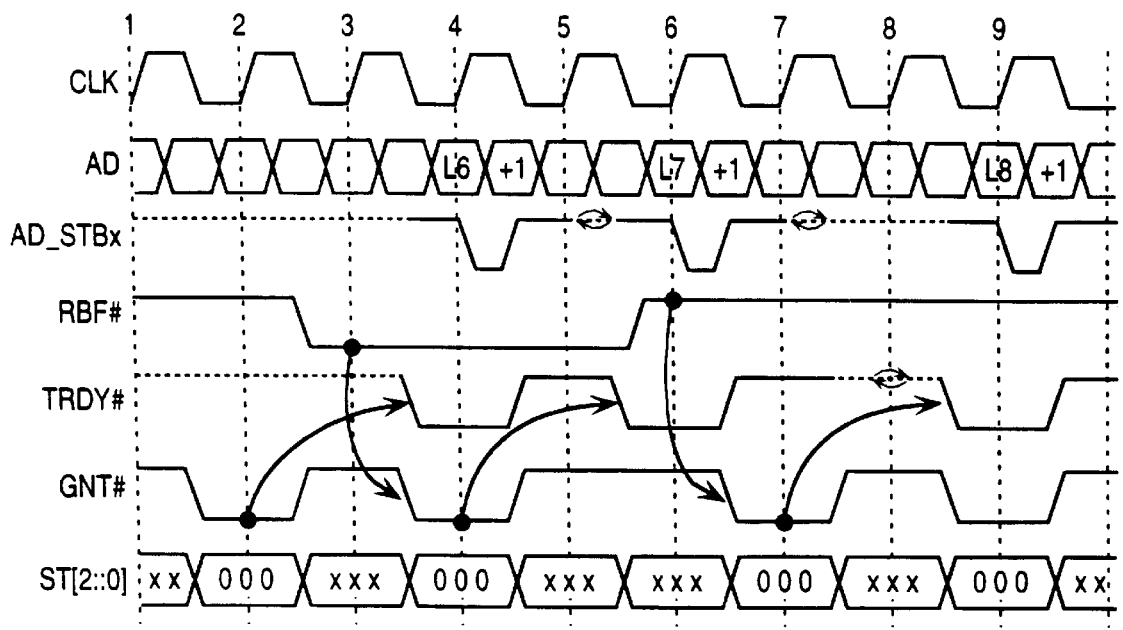
Figures 1, 4:
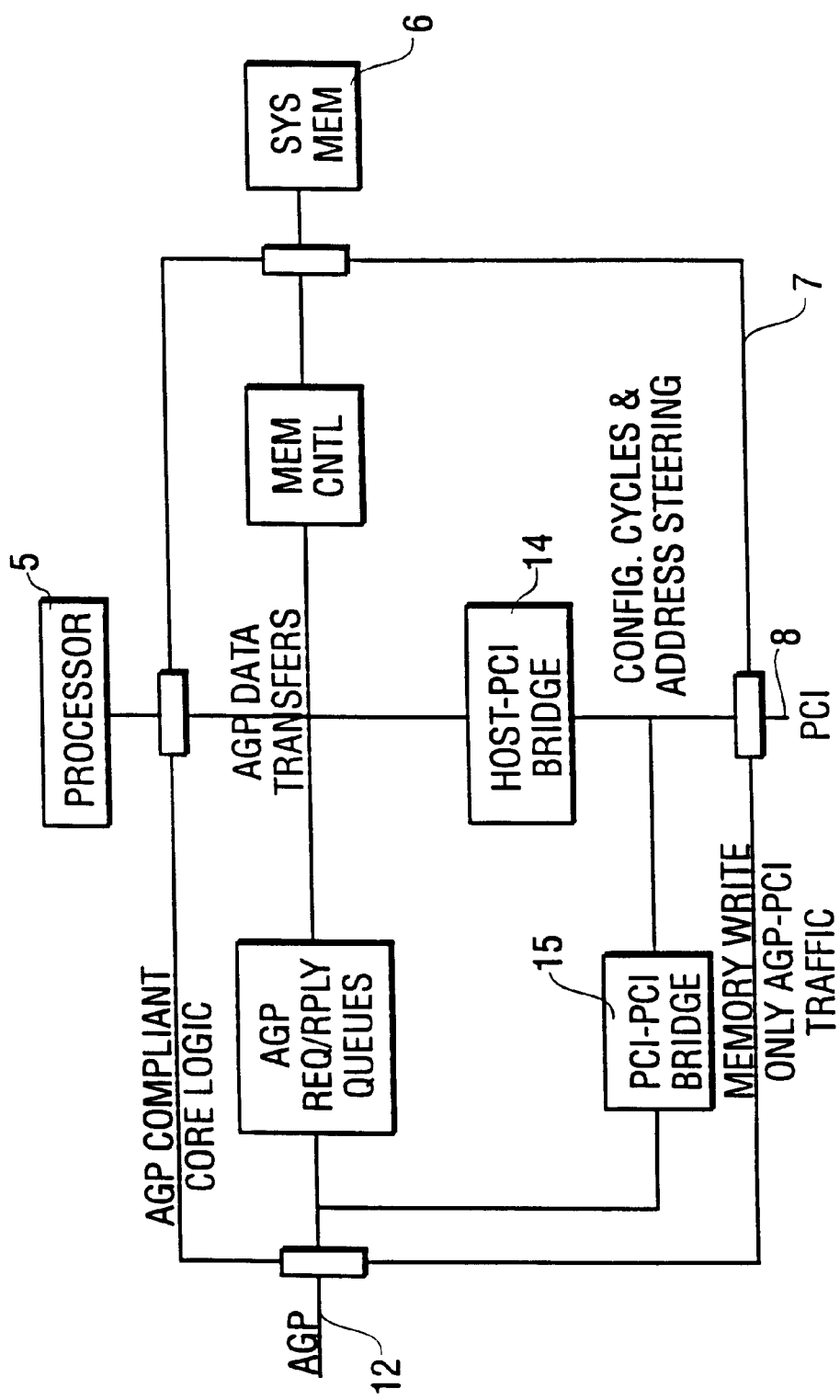
Figures 2, 4:
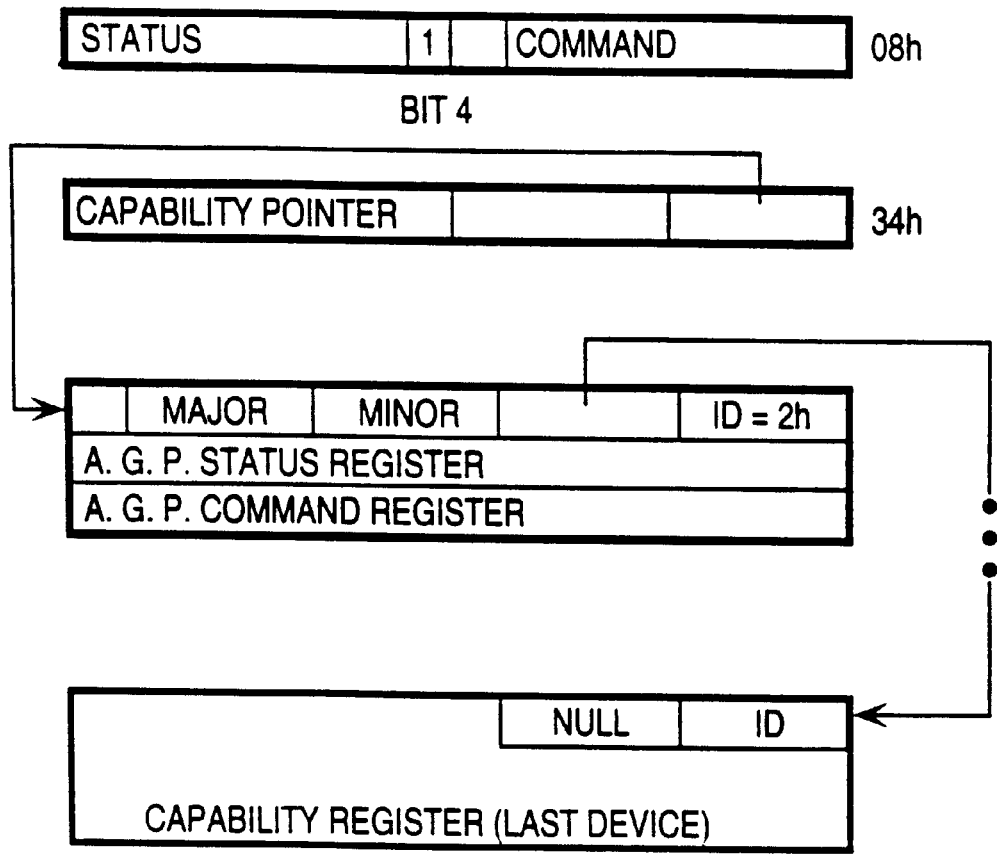

FIG. 3-15 is essentially the same as FIG. 3-11, except that 16 bytes are transferred in four clocks, while in this figure 32 bytes are transferred during the same four clocks. The control signals are identical. The AD_STBx signal has been added when data is transferred at 8 bytes per CLK period. AD_STBx represents AD_STB0 and AD_STB1, which are used by the 2× interface logic to know when valid data is present on the AD bus. The control logic (TRDY# indicates when data can be used by the internal consumer of the FIG. 3-16 shows back to back 8-byte read transactions. The ST[2::0] is shown as toggling between "000" and "001" to illustrate that these boots are actually changing. However, they are not required to change between high priority and low priority in order to do back-to-back transactions. In this diagram, TRDY# must be asserted on each clock since a new transaction starts on each clock.

FIG. 3-17 shows a basic write transaction that transfers data at the 2× rate. Note that FIG. 3-17 is essentially the same as FIG. 3-13 (1× basic write), and there is no difference in the control signals—only more data is moved. The normal control signals determine when data is valid or not. FIG. 3-17 shows 32 bytes of data being moved in the same time that 16 bytes are moved in the example of FIG. 3-13.

FIG. 3-18 illustrates multiple 8-byte write operations, as opposed to a single transfer with 32 bytes of data. When the transactions are short, the arbiter is required to give grants on every clock; otherwise, the AD bus will not be totally utilized. In this example, a new write is started on each rising clock edge except clock 7, because the arbiter de-asserted GNT# on clock 6. Since a new transaction is started on each CLK, the IRDY# signal is only de-asserted on clock 7.

3.5.3 Flow Control 3.5.3.1 Initial Data Block

FIG. 3-19 shows a case in which the master indicates to the target that it can accept the current transaction, but currently has no buffer available for any additional transactions. This is indicated by the master by asserting RBF# on clock 3. In FIG. 3-19, the master asserts RBF# at the clock following the assertion of GNT# to prevent the arbiter from returning additional low priority read transactions. As illustrated in FIG. 3-18, the arbiter only asserts GNT# on every other clock at 1× data rates, because that is all that is required to keep the AD bus 100% busy. Enqueuing the GNT# earlier only causes the master to provide more buffering for the return of read data and does not improve performance or efficiency of the bus.

FIG. 3-20 is essentially the same as FIG. 3-19, except that the arbiter returns high priority read data when the master indicates that it is not capable of accepting read data by asserting RBF#. The target is allowed to return high priority data at any time, including when the master is not able to accept low priority read data. RBF# only applies to low priority read data and not to high priority read data. The master indicates that it is ready to continue accepting low priority read data on clock 5 by de-asserting RBF#. The arbiter indicates that high priority read data is being returned on clock 4 by asserting GNT# and ST[2::0] are "001". The data transfer for a high priority read is the same as a read data, with TRDY# being asserted on the initial data phase.

FIG. 3-21 shows the master asserting RBF# indicating to the target that the master's read data buffer is full and it is not capable of accepting any new data. In order to ensure that 8-byte read operations can occur without delays on the AD bus, the arbiter must enqueue a new grant on each clock. In this case, the master must be able to accept two transactions worth of data because the arbiter is driving the second grant on the same clock in which the master is driving RBF#. Therefore, the master must provide a minimum of buffer for two transactions, eight bytes for the initial transaction and up to 32 bytes for the second transaction. In general, the master for read transactions must provide up to 40 bytes of buffering when the initial transaction is eight bytes and the second transaction is longer than four cocks. Less buffering is needed when eight-byte transactions are not utilized (see Table 3-4 for details). The 40 bytes of buffering is based on the assumption that the master is capable of asserting RBF# the clock following the assertion of GNT#. If the master delays the assertion of RBF# or desires to minimize the frequency in which it stalls the return of read data (RBF# asserted), more buffering should be provided. FIG. 3-21 shows interleaved high priority read data when the master indicates that it cannot accept any more low priority read data. If high priority data was not pending, the AD bus would have been dead on clocks 5 and 6.

If the master delays the assertion of RBF# or desires to minimize the frequency in which it stalls the return of read data, more buffering should be provided. FIG. 3-21 shows the interleaving of high priority read data when the master indicates that it can not accept any more low priority read data. If high priority data was not pending, the AD bus would have been dead on clocks 5 and 6.

3.5.3.2 Subsequent Data Block

For a transaction that requires more than four clocks to complete, both the master and target are allowed to insert wait states. Again, this point in time is referred to as a throttle point (TP). After every four clocks that data transfers, both the master and target are allowed to delay the next block of data from being transferred. Neither agent can cause the subsequent block from transferring, but can only delay it. In FIG. 3-22, the first TP point occurs on clock 3, while the second TP occurs on clock 7. The TP point always occurs two clocks before the subsequent block of data would start to transfer. Another way to describe this point for the 1× data transfers, is that the TP occurs on the clock in which the $9^{th}$–$12^{th}$ bytes transfer for the first TP and $25^{th}$–$28^{th}$ bytes for the second TP.

FIG. 3-23 illustrates the TP where the target indicated that it is ready to transfer data while the master delays the transfer by two clocks. When both IRDY# and TRDY# are asserted, which occurs on clock 7, the subsequent block of data begins to transfer two clocks later. Note that once TRDY# is asserted it must remain asserted until IRDY# is asserted, at which point both must be deasserted. A wait state is inserted on the bus on clocks 7 and 8, because IRDY# was not asserted on clocks 5 and 6. The TP starts on clock 5 and ends on clock 7. xRDY# must be actively driven during the entire TP.

FIG. 3-24 illustrates a write transaction that requires more than four clocks to complete and therefore has a subsequent block on data. FIG. 3-24 shows the transaction completing without wait states, because the target was ready for the subsequent block of data by asserting TRDY# for clock 4. Since the transaction does not cross into a second subsequent block, the throttle point which would occur on clock 8 is meaningless. Only the target is allowed to flow control a write once it has started to transfer data.

FIG. 3-25 is essentially the same as FIG. 3-24, except that the target is not ready in this case. Because TRDY# was de-asserted on clocks 4 and 5, wait states are inserted on clocks 6 and 7. Because TRDY# was asserted on clock 6, the first data phase of the second block is transferred on clock 8. The "w"'s on clocks 6 and 7 indicate that data could be driven or not driven but must be valid on dock 8. The master is not required to drive meaningful data for clocks 6 and 7, since TRDY# indicates that the target will not accept the data until clock 8.

FIG. 3-26 illustrates the earliest that read data can be returned to a master following the enqueuing of an address by the master, according to the preferred embodiment. A turnaround cycle is required when ownership of the AD bus occurs. The data being returned on clock 6 was requested sometime ago and is not related to the address being enqueued on clock 4. Clock 5 is the earliest the master can be informed of the return of read data.

Again notice that TRDY# is only asserted for a single clock. Once GNT# has been asserted indicating the return of read data, the master watches for the assertion of TRDY# to indicate that the data for the first data phase is valid. Subsequent data phases complete one per clock for the entire transaction when the transaction completes within four clocks. For transactions that require more than four clocks to complete, a subsequent block is required, and a TP is valid which occurs on clock 8.

FIG. 3-27 shows the sequence of enqueuing a single address, followed by write data being transferred, followed by read data being transferred. A turnaround cycle is required on the bus each time ownership of the AD bus changes. The turnaround on clock 3 occurs because the master did not know until clock 3 that it is to provide write data. If more requests had been enqueued then the turnaround access could have been avoided. The master delayed the write data by one clock.

FIG. 3-28 shows the earliest that read data can be returned following a request being enqueued, according to the preferred embodiment. One turnaround clock is required, since ownership of the AD bus occurs. Even without the turnaround cycle, the arbiter is not able to give a grant to start the read data transfer, because the ST bus must be held until the transaction starts (which occurs on clock 4). The arbiter then changes the encoding for clock 5.

FIG. 3-29 illustrates how combining the process of enqueuing new requests and then moving write data eliminates a turnaround cycle on the bus. GNT# is asserted on clock 3 to indicate that the master should provide write data immediately after the requests have been enqueued. Therefore, the master does not tri-state the AD or C/BE buses, but starts driving write data. The assertion of IRDY# indicates that the write transaction has started and valid write data will appear on each clock. The target indicates that it is ready to accept the second block of data on clock 9 by asserting TRDY# on clock 7.

As already mentioned, standard PCI transactions can be performed on the AGP interface. FIG. 3-30 illustrates a basic PCI transaction on the AGP interface. If the PCI agent is a non AGP compliant master, it ignores the ST[2::0] signals and the AGP appears to the agent to be a PCI bus. For those masters that are APG-aware, then the ST bus indicates that permission to use the interface has been granted to initiate a request and not to move AGP data.

FIG. 3-31 shows the AGP compliant master enqueuing a request, performing a PCI transaction, and then starting the return OD read data. Two clocks are required between the completion of the AGP request and the start of a PCI transaction, this is required because the AGP REQ# line must be de-asserted when PIPE# is asserted to indicate that the current request is the last to be enqueued. The earliest the AGP compliant master can request a PCI transaction is on clock 3, and the earliest the arbiter can grant permission is on clock 4, which allows the PCI compliant master to initiate its request on dock 6. The two clocks between the PCI transaction and the read data is caused because of potential contention on TRDY#. This can occur when the PCI compliant master is the core logic and the target is the AGP compliant master.

3.6 Arbitration Signaling Rules

3.6.1 Introduction

This section describes the rules that the AGP compliant master's REQ# signal and the AGP compliant arbiter's GNT# signal need to follow for correct AGP operation according to the preferred embodiment. These rules are a necessary part of the AGP protocol of the preferred embodiment. However, it must be recognized that different rules might be substituted, such as for alternative embodiments, while still remaining within the scope of the present invention.

The rules associated with the master's REQ# output signal provide an early indication to the AGP compliant arbiter as to when an access request transaction will complete. The arbiter may take advantage of this fact to eliminate idle bus clocks between transactions. The rules associated with the GNT# signal minimize the amount of read data buffering that is required in the master while allowing back-to-back 8-byte transactions without idle bus clocks. In order to achieve back-to-back data transactions, the arbiter may pipeline grants. Accordingly, the master must be able to accept them. Note that some of the rules in this section are used to limit the number of pipelined transactions that can be outstanding.

3.6.2 AGP Compliant Master's REQ#

The AGP compliant master asserts its REQ# signal when it wants to issue either a PCI cycle or enqueue requests using PIPE#. The master will de-assert REQ# depending on the type of access request. When issuing an AGP access request over the AD bus using PIPE#, the master must keep its corresponding REQ# asserted until one clock prior to de-asserting PIPE#. PIPE# asserted and REQ# de-asserted on the same clock edge is an early indication that the current access request transaction is the last and PIPE# will be de-asserted one clock later. The arbiter may utilize this indication to avoid idle bus clocks when asserting GNT# for a subsequent transaction. This rule implies that REQ# will be de-asserted for at least one clock between back-to-back PIPE# access request transactions. The master should concatenate as many address requests as possible into a single PIPE# access request transaction.

When an AGP compliant master or a pure PCI compliant master issues a PCI transaction using FRAME# (and no other access requests are pending), the master will de-assert REQ# when it asserts FRAME#. If another access request is pending, the master will keep its REQ# asserted.

The above rules are summarized in Table 3-11.

TABLE 3-11

AGP Arbitration Rules

| | PCI using FRAME# | AGP using PIPE# |
|---|---|---|
| PCI | Keep REQ# asserted. | De-assert REQ# one clock prior to de-asserting PIPE#. |
| AGP | Keep REQ# asserted | De-assert REQ# one clock prior to de-asserting PIPE#. Concatenate if possible. |
| None | De-assert REQ# when asserting FRAME#. | De-assert REQ# one clock prior to de-asserting PIPE#. |

Refer once again to FIG. 3-8, which shows an access request using PIPE#. The master de-asserts REQ# one clock prior to de-asserting PIPE#. Simultaneous sideband and AD access request generation is not allowed. An AGP compliant master that is configured to issue commands over the sideband signals is not allowed to generate commands with PIPE# over the AD bus.

3.6.3 GNT# and ST[2::0]

The AGP compliant arbiter will assert GNT# to initiate PCI or AGP (non-sideband) activity. The ST[2::0] signals are only meaningful while GNT# is asserted and are used to communicate the type of PCI or AGP activity being initiated. The ST[2::0] encodings are shown in Table 3-8 AGP Status Signals.

3.6.4 GNT# for Single Transactions

For PCI and AGP access requests, GNT# will stay asserted until the arbiter samples either FRAME# or PIPE# asserted. The AGP compliant master must drive either PIPE# or FRAME# so that it is asserted either one or two clocks after the clock during which GNT# is sampled asserted. Therefore GNT# will be asserted to an AGP compliant master for a minimum of two clocks and a maximum of three clocks (for a single access request when the bus is idle). If the AGP compliant master does not assert PIPE# or FRAME# from either the same clock that GNT# is first sampled asserted or the following clock, the arbiter may de-assert GNT# and consider the master inoperative. A pure PCI compliant master (i.e., a PCI 2.1 master that does not generate AGP transactions) on the AGP bus may take longer to assert FRAME# after sampling its GNT# asserted. A pure PCI compliant master may be considered inoperative if it doesn't drive FRAME# within 16 idle bus clocks after GNT# is asserted.

For read and write data transfers, GNT# will be asserted along with the corresponding ST[2::0] signals for one clock cycle per transaction. This rule is summarized in Table 3-12.

TABLE 3-12

| AGP Transaction Type | GNT# Duration |
|---|---|
| PCI Cyde | Until FRAME# sampled asserted |
| AD Access Request | Until PIPE# sampled asserted |
| Read Data | One 1x clock period per transaction |
| Write Data | One 1x clock period per transaction |

FIG. 3-31 shows an AGP compliant master asserting REQ# to run a PCI cycle. The master samples GNT# asserted on clock edge 4 with ST[2::0] encoding of '111' indicating permission to generate either a PCI cycle or an AGP request. The master is allowed to take one or two clocks to assert FRAME#. In this example, the master asserts FRAME# one clock after sampling GNT# asserted. Since no subsequent access request is pending the master de-asserts REQ# at the same time it asserts FRAME#. The arbiter samples FRAME# asserted on clock edge 3 and de-asserts GNT# clock 6. In this case GNT# is asserted for two clocks. If the master would have taken an additional clock to assert FRAME#, the arbiter would have asserted GNT# for three clocks. Once the arbiter asserts GNT# (ST=111), the arbiter will continue driving it until either PIPE# or FRAME# are sampled asserted.

Refer again to FIG. 3-11, which shows a read data transaction. The arbiter asserts GNT# for a single clock with an ST[2::0] encoding of '00x' indicating permission for the target to drive either high or low priority read data. Both the master and the target sample GNT# as asserted on clock edge 2. The master must be ready to accept data on the next clock edge. The target is allowed to take one or two clocks to assert TRDY# and begin driving read data. In this example the target asserts TRDY# and begins driving read data one clock after sampling GNT# asserted. GNT# is only asserted for one clock since this is a single read transaction consisting of four data phases.

FIG. 3-32 shows a 32-byte write followed by a read. The arbiter asserts GNT# on clock edge 2 for a single clock with an ST[2::0] encoding of '010', indicating permission for the master to drive low priority write data. Both the master and the target sample GNT# asserted on clock edge 2. The target must be able to accept write data on the next clock. The master is allowed to take one or two clocks to assert IRDY# and begin driving write data. In this example the target asserts IRDY# and begins driving write data one clock after sampling GNT# asserted. GNT# is only asserted for one clock since this is a single write transaction consisting of eight data phases.

3.6.5 GNT# Pipelining

In order run back-to-back 8-byte data transactions (in 2x data transfer mode) without idle bus clocks between transactions, the arbiter must pipeline GNT#s. The arbiter limits the number of outstanding GNT#s resulting from pipelining, to minimize the master's GNT# tracking logic. The master must be able to support the same number of outstanding pipelined GNT#s. The rules associated with attaining these goals are set forth in this section.

When GNT#s are pipelined, the new bus driver is responsible for correctly sequencing from the current transaction to the next. If an idle bus clock is required between transactions to allow for bus turnaround, the new bus driver is responsible for guaranteeing the turnaround bus clock.

If GNT# is pipelined for an access request or for write data, the master is responsible for correctly sequencing from the previous transaction to the next.

When GNT# is pipelined for read data, the target is responsible for correctly sequencing from the previous transaction to the next.

The rules governing the earliest point that GNT# may be pipelined for the next transaction are solely dependent on the current transaction type. If the current transaction is read data, the arbiter must wait to drive GNT# for the next transaction, such that GNT# is first sampled asserted on the last data phase of the current read. The last data phase is defined as the last rising 1x clock edge of the data transaction. This rule (along with proper use of the RBF# signal) minimizes the amount of low priority read data buffering required in the master. For a sequence of back-to-back 8-byte data transactions (in 2x data transfer mode), GNT# will be asserted on every 1x clock edge since, by definition, every 1x clock edge is the last data phase of a transaction.

If the current transaction is write data, GNT# for the next transaction can be asserted on the clock immediately following the GNT# for the current write data, while there are less than four outstanding write data GNT#s. The arbiter tracks the number of outstanding write data GNT#s and will only assert a GNT# for a subsequent transaction if there are less than four outstanding write data GNT#s. The arbiter increments its write data GNT# counter when it asserts GNT# for write data and decrements the counter when it samples IRDY# asserted by the master for a write data transaction. (Note that the count is 4 when a latched version of IRDY# is used to decrement the number of outstanding grants. Since the target could use either a latched or unlatched version, the target is required to handle four outstanding pipelined transactions.)

The master must be able to handle five pipelined GNT#s (this assumes that a master doesn't consider a GNT# "canceled" until the data transaction has finished, one request currently being handled and four more enqueued). This rule allows back-to-back 8-byte write data transactions to proceed when the master takes two clocks to assert the initial IRDY# after sampling GNT# asserted.

If the current transaction is a PIPE# request, GNT# for a data transaction can be asserted immediately following the GNT# for the current access request. Since REQ# will stay asserted (but doesn't indicate another request) until one clock prior to PIPE# de-assertion, it is impossible to pipeline a GNT# for another PCI or PIPE# access request if the current transaction is a PIPE# access request. Note that a GNT# for a PIPE# access request could immediately be followed by up to four GNT#s for write data transfers (or three writes and one additional transaction). The master's GNT# pipeline logic must be able to handle this case.

If the current transaction is a PCI cycle, GNT# for the next transaction can be asserted immediately following the GNT# for the current PCI cycle. Note that a GNT# for a PCI cycle could immediately be followed by up to four GNT#s for write data transfers (or three writes and one additional transaction). The master's GNT# pipeline logic must be able to handle this case. An AGP pipelined transaction is not allowed to start (after a PCI transaction) until the bus is IDLE (FRAME# and IRDY# de-asserted) for one clock. Table 3-13 entries refer to the earliest clock edge off which the arbiter can drive GNT# asserted for the next cycle.

TABLE 3-13

| | Current/Next AD Activity | | | |
|---|---|---|---|---|
| | PCI | AGP Command | Read Data | Write Data |
| PCI or AGP Command | FRAME# of current transaction sampled asserted. | REQ# sampled asserted after being de-asserted. | Second to last data phase of current transaction. | Immediately following GNT# for current write while < for outstanding GNT#s. |
| Read Data | FRAME# of current transaction sampled asserted. (Depends on RBF#) | PIPE# of current transaction sampled asserted. (Depends on RBF#) | Second to last data phase of current transaction to allow max. of 40 bytes of buffering in master. See section describing RBF# signal. (Depends on RBF#) | Immediately following GNT# for current write (Depends on RBF#) while <four outstanding GNT#s. |
| Write Data | FRAME# of current transaction sampled asserted. | PIPE# of current transaction sampled asserted. | 2nd to last data phase of current transaction. <four outstanding | Immediately following GNT# for current write while <four outstanding GNT#s. |

Refer once again to FIG. 3-16, which shows a sequence of back-to-back 8 byte read data transactions in 2× data transfer mode. The target samples GNT# asserted on clock edge 2 and responds by asserting TRDY# and driving read data L6 on the following clock. The arbiter can assert the GNT# for the second read data transaction H4 on clock edge 3, since that is the last data phase of the L6 read data transaction. GNT# is asserted on every clock edge so that an 8 byte read data transaction can occur on every clock edge.

FIG. 3-33 shows a sequence of 2× read data transactions. GNT# for the second read transaction R2 is asserted on the dock edge 4 which is the last data phase of the R1 read transaction. GNT# for the third read transaction R3 is asserted on clock edge 5 which is the last data phase of the R2 read transaction.

FIG. 3-34 illustrates a 40-byte read transaction followed by another read transaction in 2× data transfer mode. GNT# for the second read data transaction R2)is asserted on clock edge 7 which is the last data phase of read transaction R1.

FIG. 3-35 shows back-to-back 8-byte write data transactions in 2× data transfer mode. The following figures show that a maximum of three transactions are outstanding and will transfer data. The reason that it is only three transactions and not four is that these diagrams assume that the arbiter is not using the latched version of IRDY#. When the latched version is used, then all the number of grants outstanding are increased by one, since the arbiter delays the decrement. However, the arbiter can have four actually outstanding otherwise dead clocks can occur on the bus.

The master samples GNT# asserted on clock edge 2 and asserts IRDY# and drives write data W1 two clocks after sampling (clock edge 4). On clock edge 2 the arbiter increments its write GNT# counter to 1. Since the GNT# counter is less than three the arbiter asserts GNT# for write data W2 on clock edge 3 and the arbiter increments the write GNT# counter to 2. Since the GNT# counter is still less than three the arbiter asserts GNT# for write data W3 on clock edge 4. Even though GNT# is asserted on clock edge 4 the write GNT# counter does not increment since IRDY# for W1 is sampled asserted on clock edge 4. The arbiter continues asserting GNT# on every clock edge sustaining the back-to-back 8-byte transfers, since the write GNT# counter is always less than three.

FIG. 3-36 shows a sequence of 16-byte write data transactions in 2× data transfer mode. The master asserts IRDY# and drives write data W1 two clocks after sampling GNT# asserted on clock edge 2. On clock edge 2, the arbiter increments its write GNT# counter to 1. Since the GNT# counter is less than three, the arbiter asserts GNT# for write data W2 on clock edge 3, and the arbiter increments the write GNT# counter to 2. Since the GNT# counter is still less than three, the arbiter asserts GNT# for write data W3 on clock edge 4. Even though GNT# is asserted on clock edge 4, the write GNT# counter does not increment since IRDY# for W1 is sampled asserted on clock edge 4. Since the write GNT# counter is still less than three, the arbiter asserts GNT# for write data W4 on clock edge 5. Since there is no IRDY# asserted on clock edge 5, the write GNT# counter increments to three and the arbiter is prohibited from asserting GNT# for W5 on clock edge 6. IRDY# for W2 is asserted on clock edge 6, decrementing the write GNT# counter to two. This allows the arbiter to assert GNT# for W5 on clock edge 7. This again increments the write GNT# counter to three and prohibits GNT# assertion for W6 on clock edge 8. Note that on clock edge 5 four GNT# have been pipelined to the master and the first transaction is still underway. This is the worst case scenario that the master's GNT# pipeline logic needs to account for.

FIG. 3-37 shows the first half of a long sequence of write data transactions mixed with read data transactions, and FIG. 3-38 shows the conclusion of the transaction. FIGS. 3-37 and 3-38 should be viewed as a single figure for the following discussion. The first three GNT#s are for write data transactions. The master inserts a wait state between the write data transactions. The GNT# asserted on clock edge 5 is for read data transaction R1. Note that the GNT# for R1 on clock edge 5 did not cause the write GNT# counter to increment from two to three. The write GNT# counter only increments for GNT#s associated with write data transactions. The arbiter de-asserts GNT# on clock edge 6 and waits to assert GNT# for read data R2 on clock edge 10 which is the last data phase of read data transaction R1. Note that by this time, the write GNT# counter decremented to zero by sampling IRDY# asserted on clock edges 6 and 8. Note also that the write GNT# counter does not increment on clock edge 10 since the GNT# is for a read data transaction. The target is responsible for inserting the idle clock for bus turnaround between transactions W3 and R1. Read data transaction R2 is a 40-byte transaction, so the next GNT# assertion is delayed by the arbiter until clock edge 15, which is the last data phase of R2. The GNT# on clock edges 15 is for write data transaction W4. This causes the write GNT# counter to increment. The master is responsible for inserting the idle clock for bus turnaround between transactions R2 and W4. The arbiter asserts GNT# for W5, W6 and W7 on clock edges 16,17 and 18# respectively. The arbiter is prohibited from asserting GNT# on clock edge 19 for another transaction since the write GNT# counter is at three.

3.6.6 GNT# Interaction with RBF#

The AGP compliant arbiter will not assert GNT# for a low priority Read data transaction if the RBF# signal is asserted. In the case where RBF# is asserted on the same clock edge as GNT# is asserted, the master is required to accept that transaction. The arbiter must de-assert GNT# immediately upon sampling RBF# asserted so that no further low priority Read data transactions are signaled. RBF# only prohibits GNT# from being asserted for low priority Read data transactions. GNT# assertion for high priority Read data, write data, and access requests can still be generated even though RBF# is asserted.

FIG. 3-39 shows the master asserting the RBF# signal indicating that it can't accept further low priority Read data. The master samples GNT# asserted on clock edge 2 with ST[2::0], indicating a low priority Read data transaction. The master asserts RBF# on clock edge 3, because it doesn't have sufficient buffer space to take the next two low priority Read transactions. The arbiter has already asserted GNT# on clock edge 3 which is the last data phase of L6. The master must accept the GNT# on clock edge 3 for Read data transaction L7. The arbiter samples RBF# asserted on clock edge 3 and de-asserts GNT# until it samples RBF# de-asserted on clock edge 5. Note that if the arbiter didn't de-assert GNT# immediately upon sampling RBF# asserted on clock edge 3, then GNT# would be asserted on clock edge 4. This would increase the minimum amount of low priority Read data buffering required in the master.

4. System Configuration and AGP Initialization

AGP configuration and initialization operations are of three general types:

1) Power On Startup Test (POST) code allocates resources to all devices in the system(BIOS);
2) The operating system activates AGP features (not BIOS); and
3) The final runtime memory management activity is carried out by DirectDraw, which is a product of Microsoft Corporation of Redmond, Wash.

4.1 POST-time Initialization

Conventional bus enumeration software in the Power On Sartup Test (POST) code identifies all system devices (includes AGP compliant devices), creates a consistent system address map and allocates system resources to each device. An AGP compliant device must provide all required fields in the device's PCI configuration header, including Device ID, Vendor ID, Status, Command, Class code, Revision ID and Header type. (See Section 4.1 of the PCI 2.1 specification for more detail.) By supporting the PCI header, this allows conventional bus enumeration software to function correctly while being completely unaware of AGP features.

4.1.1 AGP Compliant Master Devices

AGP compliant master devices have a certain amount of memory resources that must be placed somewhere in the system memory address map using a PCI base address register. These memory resources fall into two categories, Prefetchable and Non-prefetchable address regions. Prefetchable memory space is where the Linear Framebuffer is mapped to provide performance improvements. Non-prefetchable memory space is where control registers and FIFO-like communication interfaces are mapped. Each of these address regions should have their own base address register. Refer to page 196 of the PCI 2.1 specification for a description of PCI base address registers.

4.1.2 AGP Compliant Target Devices

AGP compliant target devices require a certain amount of address space for AGP memory that must be placed somewhere in the system address map using a PCI base address register. Non-prefetchable control registers, when supported by the target, are provided by a second base address register.

FIG. 4-1 is a logical view of an AGP compliant target. In this example, the core logic 7 includes ports to the system memory 6, processor 5, the PCI bus 8, and the AGP 12. The two main functions in the core logic 7 are the Host Bus Bridge 14 and the PCI-to-PCI Bridge 15. The Host Bus Bridge 14 is the interface that exists in all core logic that spawn a PCI bus segment. The PCI-to-PCI Bridge function 15 facilitates the configuration of the AGP I/O port of the core logic 7 without requiring new enumeration code. With the core logic 7 presenting the interface (required to follow the PCI-to-PCI Bridge Architecture Specification (Rev. 1.0)), this provides a way to determine what device resides on the AGP port, what system resources it requires, and the mechanism to allocate those resources. A benefit of this, is that the host bridge obtains the mapping information (without special software) to route requests to the correct destination (i.e., PCI, AGP or main memory).

Note that the PCI-to-PCI Bridge function in FIG. 4-1 is not a complete and fully functional PCI-to-PCI Bridge. This implementation does not allow all access types to transverse between the AGP and PCI segments. Only Memory write transactions (PCI commands Memory write and Memory write and Invalidate) that initiate on AGP are forwarded to the Primary PCI bus segment and on Primary PCI bus are forwarded to AGP segment. All other PCI commands are not allowed to cross the interface. When one of these commands is issued and has destination on the other interface, the core logic 7 can treat this condition as a programming error. How it completes the access is chipset-specific; one option would be to have the core logic 7 (acting as a PCI compliant target) simply ignore the request and allow it to terminate with Master-abort.

The AGP compliant target's base address registers should reside in the Host-to-PCI bridge because the Windows operating system can load a Host-to-PCI bridge driver, whereas there is no provision for loading a driver for a PCI-to-PCI bridge.

4.1.3 Boot-time VGA Display Device(s)

Most AGP graphics accelerators will have a VGA display device. This means some systems may have more than one VGA device. Conventional BIOS codes select one VGA device by first searching the ISA bus, then PCI add-in card slots (includes AGP connector), then motherboard devices (includes motherboard AGP compliant devices).

4.1.4 Operating System Initialization

The operating system (OS) initializes AGP features by performing the following operations:

1) Allocate memory for the AGP remapping table;
2) Initialize the AGP compliant target's address remapping hardware;
3) Set the AGP compliant target and master data transfer parameters;
4) Set host memory type for AGP memory; and
5) Activate policy limiting the amount of AGP memory.

An AGP chipset driver API will be used for the second item. The appropriate device driver interface kit should be referred to for details.

The third item requires access to configuration registers defined later in this description. Setting bit 4 (Status Register) at offset 6 indicates the device implements a "New Capabilities" mechanism as described by PCI. The New Capabilities structure is implemented as a linked list of registers containing information for each function supported by the device. AGP status and command registers are included in the linked list. The structure for the AGP specific ID and structure is illustrated in FIG. 4-2.

Configuration registers are used by the OS to initialize AGP features. These features must be supported by both AGP compliant master and target devices in the following five registers: PCI status register, capabilities pointer register, capability identifier register, AGP status register, and AGP command register. Table 4-1 describes the PCI status register. Table 4-2 describes the capabilities pointer register. Table 4-3 describes the capability identifier register. Table 44 describes the AGP status register. Table 4-5 describes the AGP command register.

TABLE 4-1

PCI Status Register

| Bit | Field | Description |
| --- | --- | --- |
| 31:5 | | See PCI 2.1 specification |
| 4 | CAP_LIST | If the CAP_LIST bit is set, the device's configuration space implements a list of capabilities. This bit is Read -Only register. |
| 3:0 | | See PCI 2.1 specification |

The capabilities pointer register gives the location of the first item in the list, which, in this example, is for the AGP compliant device. Device capabilities may appear in any order in the list. The capabilities pointer register and the capability identifier register are read-only, with reserved fields returning 0 when read.

| Bits | Field | Description |
| --- | --- | --- |
| 31:8 | Reserved | Always returns 0 on read, write operations have no effect |
| 7:0 | CAP_PTR | This field contains a byte offset into the device's configuration space containing the first item in the capabilities list and is a Read -Only register. |

Table 4-2. Capabilities Pointer Register-(offset 34 h)

The first byte of each list entry in the capability identifier register is the capability ID. The AGP has been assigned an ID of 02 h by the PCI Special Interest Group. The NEXT_PTR field contains a pointer to the next item in the list. The NEXT_PTR field in final list item must contain a NULL pointer.

TABLE 4-3

Capability Identifier Register (Offset = CAP_PTR)

| Bits | Field | Description |
| --- | --- | --- |
| 31:24 | Reserved | Always returns 0 on read; write operations have no effect. |
| 23:20 | MAJOR | Major revision number of AGP interface specification this device conforms to. |
| 19:16 | MINOR | Minor revision number of AGP interface specification this device conforms to. |
| 15:8 | NEXT_PTR | Pointer to next item in capabilities list. Must be NULL for final item in list. |
| 7:0 | CAP_ID | The value 02h in this field identifies the list item as pertaining to AGP registers. |

The AGP status register is a read-only register. Writes have no effect, and reserved or unimplemented fields return 0 when read.

TABLE 4-6

AGP status register (offset CAP_PTR + 4)

| Bits | Field | Description |
| --- | --- | --- |
| 31:24 | RQ | The RQ field contains the maximum number of AGP command requests this device can manage. |
| 23:10 | Reserved | Always returns 0 when read, write operations have no effect |
| 9 | SBA | If set, this device supports side band addressing. |
| 2:8 | Reserved | Always returns 0 when read, write operations have no effect |
| 1:0 | RATE | The RATE field indicates the data transfer rates supported by this device. AGP compliant devices must report all that apply. <Bit 0: 1X, Bit 1: 2X> Note: The RATE field applies to AD and SBA buses. |

The AGP command register is a read/write register, with reserved fields returning zero when read and writes having no affect. All bits in the AGP command register are initialized to zero at reset.

| Bits | Field | Description |
| --- | --- | --- |
| 31:24 | RQ_DEPTH | Master: The RQ_DEPTH field must be programmed with the maximum number of pipelined operations the master is allowed to enqueue in the target. Value set in this field must be equal to or less than the value reported in the RQ field of target's status register. Target: The RQ_DEPTH field is reserved. |
| 23:10 | Reserved | Always returns 0 when read, write operations have no effect |
| 9 | SBA_ENABLE | When set, the side address mechanism is enabled in this device. |
| 8 | AGP_ENABLE | Master: Setting the AGP_ENABLE bit allows the master to initiate AGP operations. When cleared, the master cannot initiate AGP operations. Target: Setting the AGP_ENABLE bit allows the target to accept AGP operations. When cleared, the target ignores incoming AGP operations. Notes: 1. The target must be enabled before the master. 2. The AGP_ENABLE bit is cleared by AGP_RESET. |
| 7:3 | Reserved | Always returns 0 when read, write operations have no effect |
| 2:0 | DATA_RATE | One (and only one) bit in the DATA_RATE field must be set to indicate the desired data transfer rate. <Bit 0: 1X, Bit 1: 2X>. The same bit must be set on both master and target. Note: The DATA_RATE field applies to AD and SBA buses |

Table 4-5. AGP command register—(offset CAP_PTR+8)

Thus, a high-throughput interconnect which has both pipelined and non-pipelined bus transaction modes has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of communicating data on a bus in a processing system, the method comprising:

performing transactions on the bus using a pipelined communication mode, the transactions including a plurality of requests for communication of data on the bus;

suspending said performing of transactions in the pipelined communication mode to perform a transaction on the bus using a non-pipelined communication mode; and resuming said performing of transactions in the pipelined communication mode, including communicating data requested but not communicated prior to said suspending, without issuing another request for said data.

2. A method according to claim 1, wherein said performing transactions on the bus using the pipelined communication mode comprises using a bus master to transmit a plurality of requests to a target, the bus master having previously received an indication of a maximum pipeline depth from the target, the bus master limiting the transmitting so as not to exceed the maximum pipeline depth.

3. A method according to 2, further comprising switching from the pipelined communication mode to the non-pipelined communication mode when said using the bus master to transmit results in the maximum pipeline depth being reached.

4. A method according to claim 1, wherein the non-pipelined communication mode is a Peripheral Component Interconnect (PCI) communication mode.

5. A method according to claim 1, wherein the transactions comprise memory access operations.

6. A method according to claim 1, wherein the pipelined communication mode is characterized by the ability to enqueue a plurality of requests for data on the bus before receiving data requested by any of the plurality of requests, and wherein the non-pipelined communication mode is characterized by the inability to enqueue a plurality of requests for data on the bus before receiving data requested by any of the plurality of requests.

7. A method of performing transactions on a bus between a master and a target in a computer system, the method comprising:

performing transactions on the bus using a pipelined transfer mode, each transaction including a request for data and a transfer of data, each request including an address, the pipelined transfer mode characterized by a pipeline having a state, the state characterized by one or more addresses enqueued on the bus;

suspending said performing of transactions in the pipelined transfer mode to perform a transaction on the bus using a non-pipelined transfer mode while maintaining the state of the pipeline; and resuming said performing of transactions in the pipelined transfer mode, including transferring data corresponding to a request pending at the time of suspension of performing transactions in the pipelined transfer mode, without retransmitting any part of the pending request, using the maintained state of the is pipeline.

8. A method according to claim 7, wherein said performing transactions on the bus using the pipelined transfer mode comprises transmitting a plurality of requests from the master to the target, the master having previously received an indication of a maximum pipeline depth from the target, the master limiting the transmitting so as not to exceed the maximum pipeline depth.

9. A method according to 8, further comprising switching from the pipelined transfer mode to the non-pipelined transfer mode when the transmitting results in the maximum pipeline depth being reached.

10. A method according to claim 7, wherein the non-pipelined communication mode is a Peripheral Component Interconnect (PCI) communication mode.

11. A method according to claim 7, wherein the transactions comprise memory access operations.

12. A method according to claim 7, wherein the pipelined communication mode is characterized by the ability to enqueue a plurality of requests for data on the bus before receiving data requested by any of the plurality of requests, and wherein the non-pipelined communication mode is characterized by the inability to enqueue a plurality of requests for data on the bus before receiving data requested by any of the plurality of requests.

13. A method according to claim 7, wherein the device is a graphics accelerator.

14. In a computer system including a memory and a device capable of accessing the memory through a bus, a method of accessing the memory through the bus, the method comprising:

performing memory accesses over the bus using a pipelined transfer mode, each memory access including a request and a corresponding data transfer, each request including an address, wherein the pipelined transfer mode is characterized by the ability to enqueue a plurality of requests for data on the bus before receiving data requested by any of the plurality of requests, the plurality of enqueued requests representing a pipeline state;

suspending said performing of memory accesses in the pipelined transfer mode to perform a memory access on the bus using a non-pipelined transfer mode, including maintaining the pipeline state, wherein the non-pipelined transfer mode is characterized by the inability to enqueue a plurality of requests for data on the bus before receiving data requested by any of the plurality of requests; and resuming said performing of memory accesses in the pipelined transfer mode, including transferring data corresponding to a request pending at the time of suspension of performing transactions in the pipelined transfer mode, without retransmitting an address associated with the pending request, based on the maintained pipeline state.

15. A method according to claim 14, wherein said performing memory accesses on the bus using the pipelined transfer mode comprises transmitting a plurality of requests from a master to a target, the master having previously received an indication of a maximum pipeline depth from the target, the master limiting the transmitting so as not to exceed the maximum pipeline depth.

16. A method according to 15, further comprising switching from the pipelined transfer mode to the non-pipelined transfer mode when the transmitting results in the maximum pipeline depth being reached.

17. A method according to claim 14, wherein the non-pipelined communication mode is a Peripheral Component Interconnect (PCI) communication mode.

18. A device capable of communicating data with a second device across a bus in a processing system, the device comprising:

first circuitry configured to perform transactions on the bus using a pipelined communication mode, the transactions including a plurality of requests for communication of data on the bus; and second circuitry coupled to the first circuitry, the second circuitry configured to suspend performing of transactions in the pipelined communication mode to perform a transaction on the bus using a non-pipelined communication mode;

wherein the first circuitry is further configured to resume performing transactions in the pipelined communication mode after performing the transaction in the non-pipelined communication mode, including communicating data requested but not communicated prior to said suspending, without issuing another request for said data.

19. A device according to claim 18, wherein the non-pipelined communication mode is a Peripheral Component Interconnect (PCI) compliant communication mode.

20. A device according to claim 18, wherein the transactions comprises memory access operations.

21. A device according to claim 18, wherein the pipelined communication mode is characterized by the ability to enqueue a plurality of requests for data on the bus before receiving data requested by any of the plurality of requests, and wherein the non-pipelined communication mode is characterized by the inability to enqueue a plurality of requests for data on the bus before receiving data requested by any of the plurality of requests.

22. A device according to claim 18, the device comprising a graphics accelerator.

23. A device according to claim 18, the device comprising a memory controller for accessing a main memory.

24. An apparatus operable to access a memory in a processing system, the apparatus comprising:
means for communicating memory access transactions over a bus using a pipelined transfer mode, including means for communicating a plurality of pipelined addresses over the bus, each request for requesting a data transfer over the bus;
means for suspending communication of memory access transactions in the pipelined transfer mode;
means for communicating memory access transactions over the bus using a non-pipelined transfer mode during suspension of communication of memory access transactions in the pipelined transfer mode; and
means for resuming communication of transactions in the pipelined transfer mode, including means for transferring data requested but not transferred prior to suspension of communications in the pipelined transfer mode, without retransmitting a request for said data requested but not transferred prior to suspension of communications in the pipelined transfer mode.

25. An apparatus according to claim 24, wherein the means for communicating memory access transactions using the pipelined transfer mode comprises means for limiting transmission of requests for data to avoid exceeding a maximum pipeline depth.

26. An apparatus according to claim 25, further comprising means for switching from the pipelined transfer mode to the non-pipelined transfer mode when transmission of requests for data results in the maximum pipeline depth being reached.

27. An apparatus according to claim 24, wherein the apparatus operates as a bus master.

28. An apparatus according to claim 24, wherein the operates as a bus target.

29. A system comprising:
a processor;
a first device coupled to the processor;
a second device;
a bus coupling the first device to the second device for communication of data and corresponding requests for the data between the first and second device, the first and second device each operable to perform transactions on the bus in either a non-pipelined transfer mode or a pipelined transfer mode, such that transactions on the bus in the pipelined transfer mode can be suspended to allow a transaction to be performed on the bus in the non-pipelined transfer mode, and such that transactions on the bus in the pipelined transfer mode can be resumed after performing a transaction on the bus in the non-pipelined transfer mode, by transferring data corresponding to a request that was pending when the pipelined transfer mode was suspended, without reissuing another request for the data corresponding to said pending request.

30. A system according to claim 29, wherein the non-pipelined transfer mode is a Peripheral Component Interconnect (PCI) compliant transfer mode.

31. A system according to claim 29, wherein the requests for data comprise memory access requests.

32. A system according to claim 29, wherein the second device is a graphics accelerator.

33. A system according to claim 29, further comprising a memory coupled to the first device, wherein the first device comprises core logic for enabling the processor to access the memory.

34. A system according to claim 29, further comprising a memory coupled to the first device, wherein the first device comprises core logic for enabling the processor to access the memory, and wherein the second device comprises a graphics accelerator.

35. A computer system comprising:
a processor;
a main memory;
core logic coupling the main memory to the processor;
a bus coupled to the core logic;
a graphics accelerator coupled to the bus and operable to perform memory access operations on the bus to access the main memory, the memory access operations including requests for data and corresponding transfers of data, the graphics accelerator operable to perform memory access operations on the bus in either a non-pipelined transfer mode or a pipelined transfer mode, such that memory access operations on the bus in the pipelined transfer mode can be suspended to allow a memory access operation to be performed on the bus in the non-pipelined transfer mode, and such that memory access operations on the bus in the pipelined transfer mode can be resumed after performing a memory access operation on the bus in the non-pipelined transfer mode, by transferring data corresponding to a request pending when the pipelined transfer mode was suspended, without reissuing an address associated with said pending request.

* * * * *

UNITED STATES PATENT AND TRADEMARK OFFICE
CERTIFICATE OF CORRECTION

PATENT NO. : 6,317,803 B1
DATED : November 13, 2001
INVENTOR(S) : Rasmussen et al.

It is certified that error appears in the above-identified patent and that said Letters Patent is hereby corrected as shown below:

Column 10,
Line 24, after "address,", insert -- read --.

Column 22,
Line 53, delete "dock", insert -- clock --.

Column 30,
Line 47, after "TRDY#", insert -- this case) --.
Line 49, after "the", insert -- data. --.

Column 32,
Line 38, delete "dock", insert -- clock --.

Column 33,
Line 38, delete "dock", insert -- clock --.

Column 37,
Line 13, delete "<for", insert -- <four --.
Line 41, delete "dock", insert -- clock --.

Signed and Sealed this

Ninth Day of July, 2002

*Attest:*

JAMES E. ROGAN
*Attesting Officer*  *Director of the United States Patent and Trademark Office*